US008596146B2

(12) United States Patent
Ono et al.

(10) Patent No.: US 8,596,146 B2
(45) Date of Patent: Dec. 3, 2013

(54) SENSOR-EQUIPPED BEARING FOR WHEEL

(75) Inventors: Yujiro Ono, Iwata (JP); Kentarou Nishikawa, Iwata (JP); Koji Kametaka, Iwata (JP); Takayuki Norimatsu, Iwata (JP); Kentaro Ikki, Iwata (JP); Toru Takahashi, Iwata (JP)

(73) Assignee: NTN Corporation, Osaka (JP)

( * ) Notice: Subject to any disclaimer, the term of this patent is extended or adjusted under 35 U.S.C. 154(b) by 254 days.

(21) Appl. No.: 13/067,053

(22) Filed: May 4, 2011

(65) Prior Publication Data

US 2011/0209562 A1   Sep. 1, 2011

Related U.S. Application Data

(63) Continuation of application No. PCT/JP2009/005735, filed on Oct. 29, 2009.

(30) Foreign Application Priority Data

| Nov. 5, 2008 | (JP) | 2008-284079 |
| Nov. 27, 2008 | (JP) | 2008-302296 |
| Dec. 10, 2008 | (JP) | 2008-314164 |
| Dec. 22, 2008 | (JP) | 2008-324965 |
| Feb. 3, 2009 | (JP) | 2009-022215 |

(51) Int. Cl.
*G01L 1/22* (2006.01)
*F16C 32/00* (2006.01)

(52) U.S. Cl.
USPC ................... 73/862.045; 384/448

(58) Field of Classification Search
USPC ............... 73/862.041–862.046, 862.322
See application file for complete search history.

(56) References Cited

U.S. PATENT DOCUMENTS

| 6,729,769 | B2 * | 5/2004 | Yamashita et al. ............ 384/537 |
| 6,948,856 | B2 | 9/2005 | Takizawa et al. |
| 7,497,131 | B2 * | 3/2009 | Sentoku .................. 73/862.322 |
| 7,762,128 | B2 * | 7/2010 | Ozaki et al. ................ 73/117.01 |
| 8,028,589 | B2 * | 10/2011 | Takahashi et al. ......... 73/862.322 |
| 8,167,497 | B2 * | 5/2012 | Ozaki et al. .................... 384/448 |
| 8,434,947 | B2 * | 5/2013 | Isobe et al. .................... 384/448 |

(Continued)

FOREIGN PATENT DOCUMENTS

| JP | 05-42749 | 6/1993 |
| JP | 9-61268 | 3/1997 |

(Continued)

OTHER PUBLICATIONS

Japanese Office Action issued Nov. 13, 2012 in corresponding Japanese Patent Application No. 2008-302296.

(Continued)

*Primary Examiner* — Harshad R Patel
*Assistant Examiner* — Octavia D. Hollington

(57) ABSTRACT

A wheel support bearing assembly includes rolling elements interposed between double row rolling surfaces of outer and inner members, which are opposed to each other. Electronic components including a plurality of the sensor units, a signal processing IC for processing respective sensor output signals thereof and a signal cable for transmitting the processed output signal to the outside of the bearing assembly are arranged inwardly of an annular protective covering to provide an annular sensor assembly. The sensor assembly is fitted to a peripheral surface of a stationary member in a fashion coaxial with the stationary member.

15 Claims, 50 Drawing Sheets

(56) References Cited

U.S. PATENT DOCUMENTS

| | | |
|---|---|---|
| 2002/0012484 A1 | 1/2002 | Salou et al. |
| 2002/0054719 A1 | 5/2002 | Takizawa et al. |
| 2002/0061148 A1 | 5/2002 | Salou et al. |
| 2009/0097791 A1 | 4/2009 | Ozaki et al. |
| 2009/0324152 A1 | 12/2009 | Ozaki et al. |
| 2010/0135604 A1 | 6/2010 | Ozaki et al. |
| 2010/0262383 A1 | 10/2010 | Isobe et al. |

FOREIGN PATENT DOCUMENTS

| | | |
|---|---|---|
| JP | 10-146013 | 5/1998 |
| JP | 2002-098138 | 4/2002 |
| JP | 2002-162300 | 6/2002 |
| JP | 2002-206528 | 7/2002 |
| JP | 2003-530565 | 10/2003 |
| JP | 2004-142577 | 5/2004 |
| JP | 2005-207440 | 8/2005 |
| JP | 2007-057299 | 3/2007 |
| JP | 2007-292158 | 11/2007 |
| JP | 2008-51283 | 3/2008 |
| JP | 2008-190707 | 8/2008 |
| JP | 2008213561 * | 9/2008 |
| WO | 01/77634 A2 | 10/2001 |

OTHER PUBLICATIONS

U.S. Appl. No. 12/449,451, filed Aug. 7, 2009, Hiroshi Isobe et al., NTN Corporation.

U.S. Appl. No. 12/226,518, filed Oct. 21, 2008, Takayoshi Ozaki et al., NTN Corporation.

U.S. Appl. No. 11/990,071, filed Feb. 6, 2008, Takayoshi Ozaki et al., NTN Corporation.

International Search Report for PCT/JP2009/005735, mailed Jan. 19, 2010.

English Translation of the International Preliminary Report on Patentability mailed Jun. 16, 2011 in corresponding International Patent Application PCT/JP2009/005735.

Japanese Notice of Reason(s) for Rejection issued Feb. 12, 2013 for corresponding Japanese Patent Application No. 2008-284079.

Japanese Notice of Reason(s) for Rejection issued Feb. 12, 2013 for corresponding Japanese Patent Application No. 2008-314164.

Japanese Notice of Reason(s) for Rejection issued Feb. 12, 2013 for corresponding Japanese Patent Application No. 2009-022215.

* cited by examiner

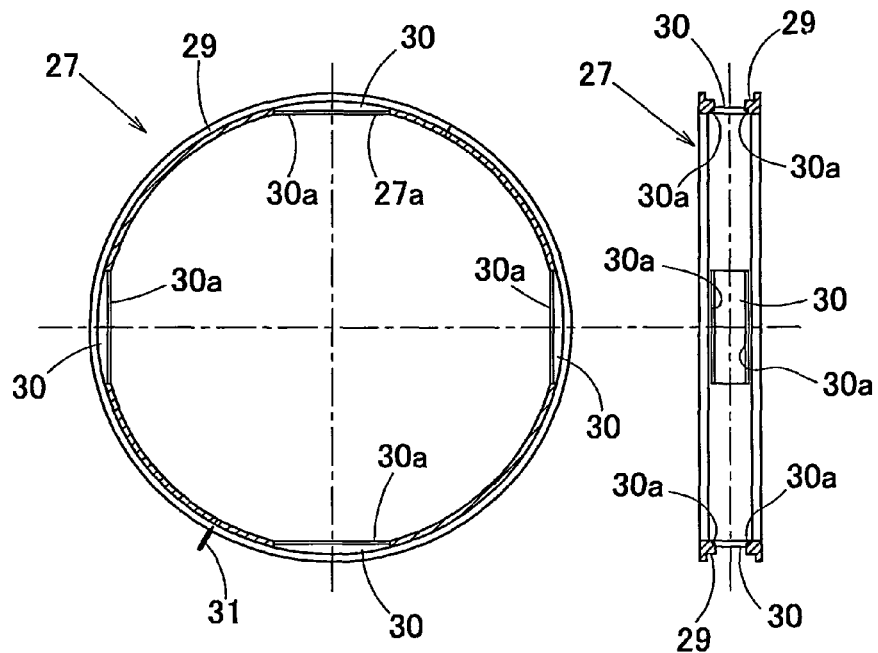

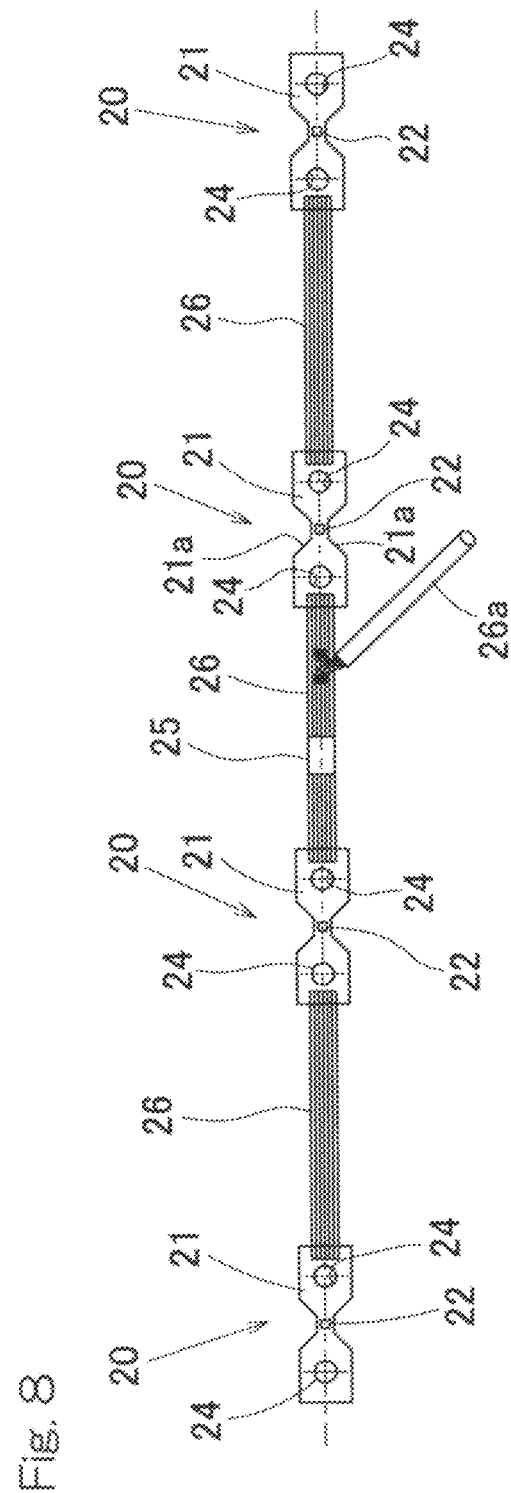

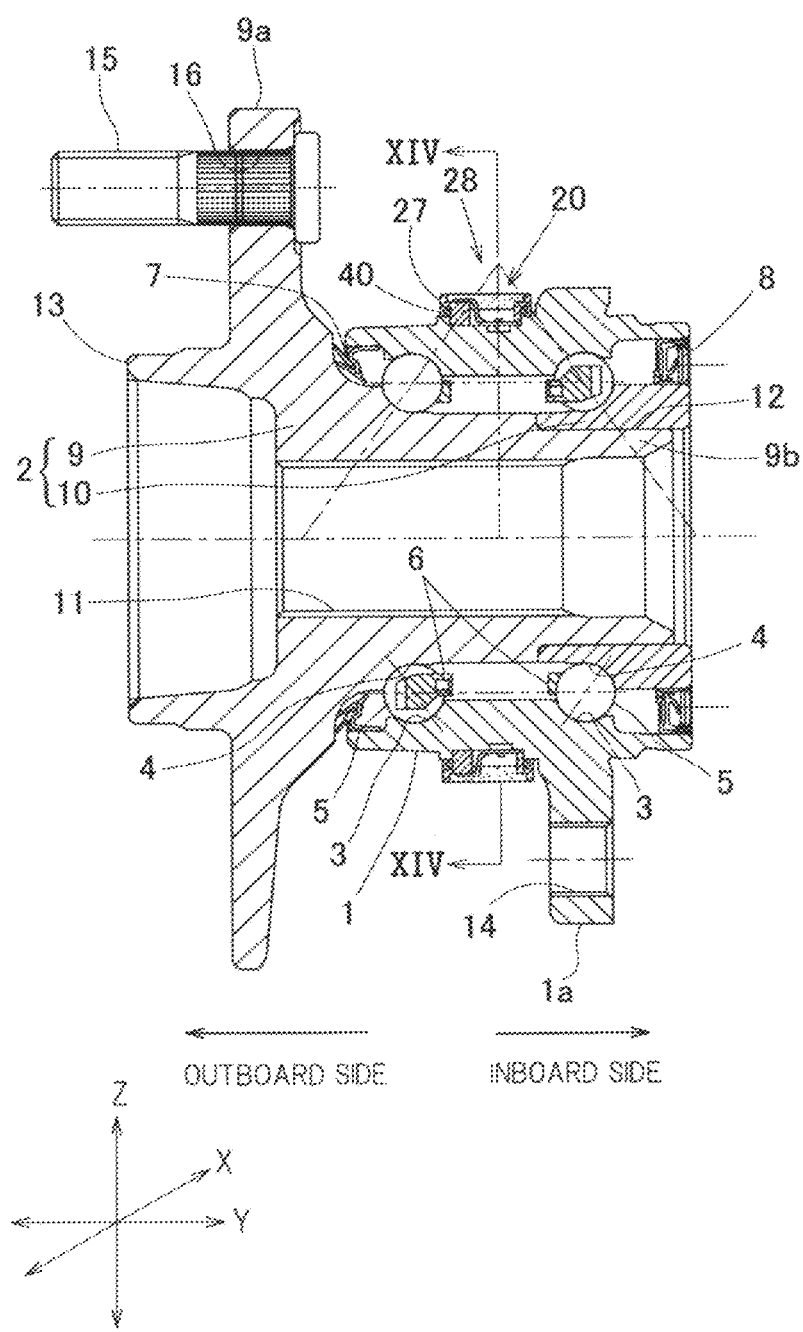

Fig. 14
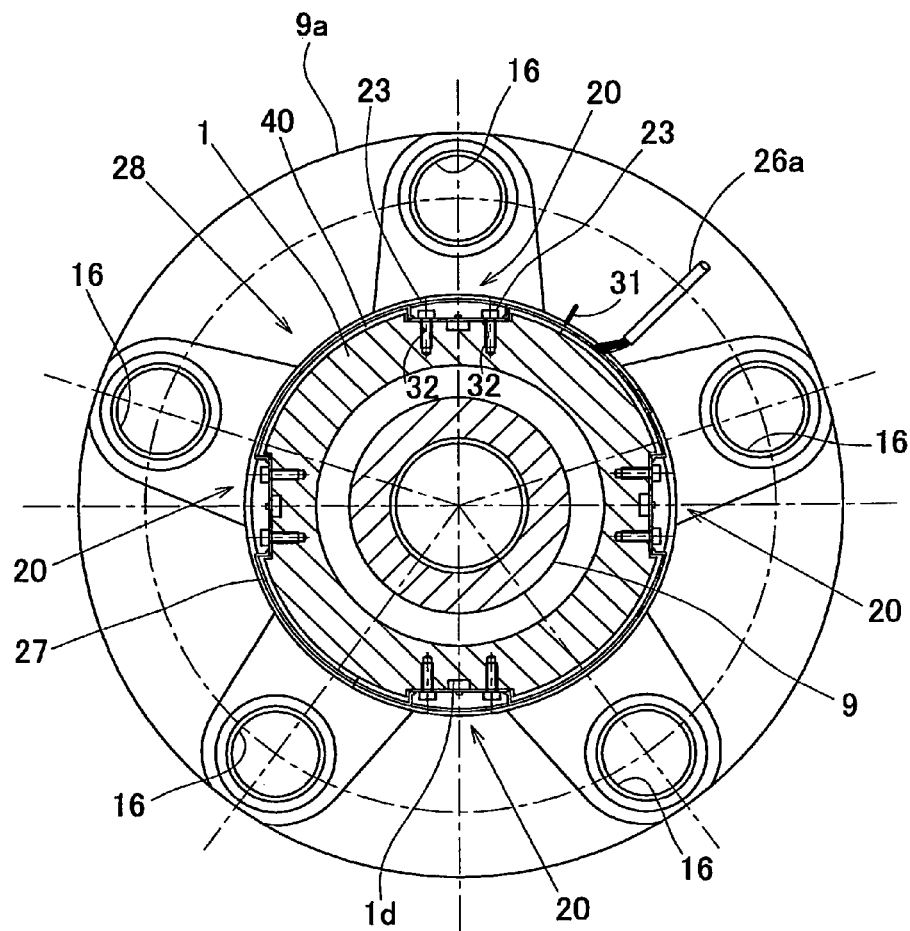
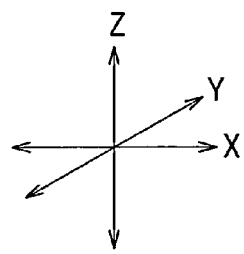

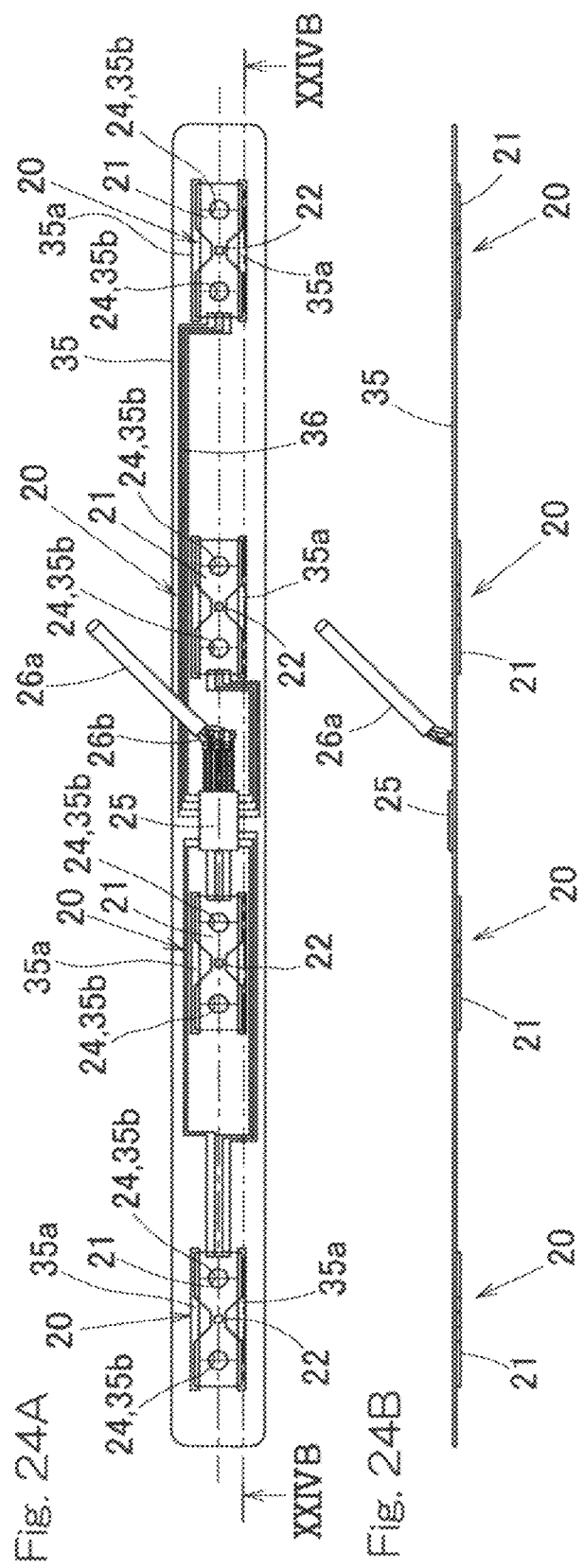

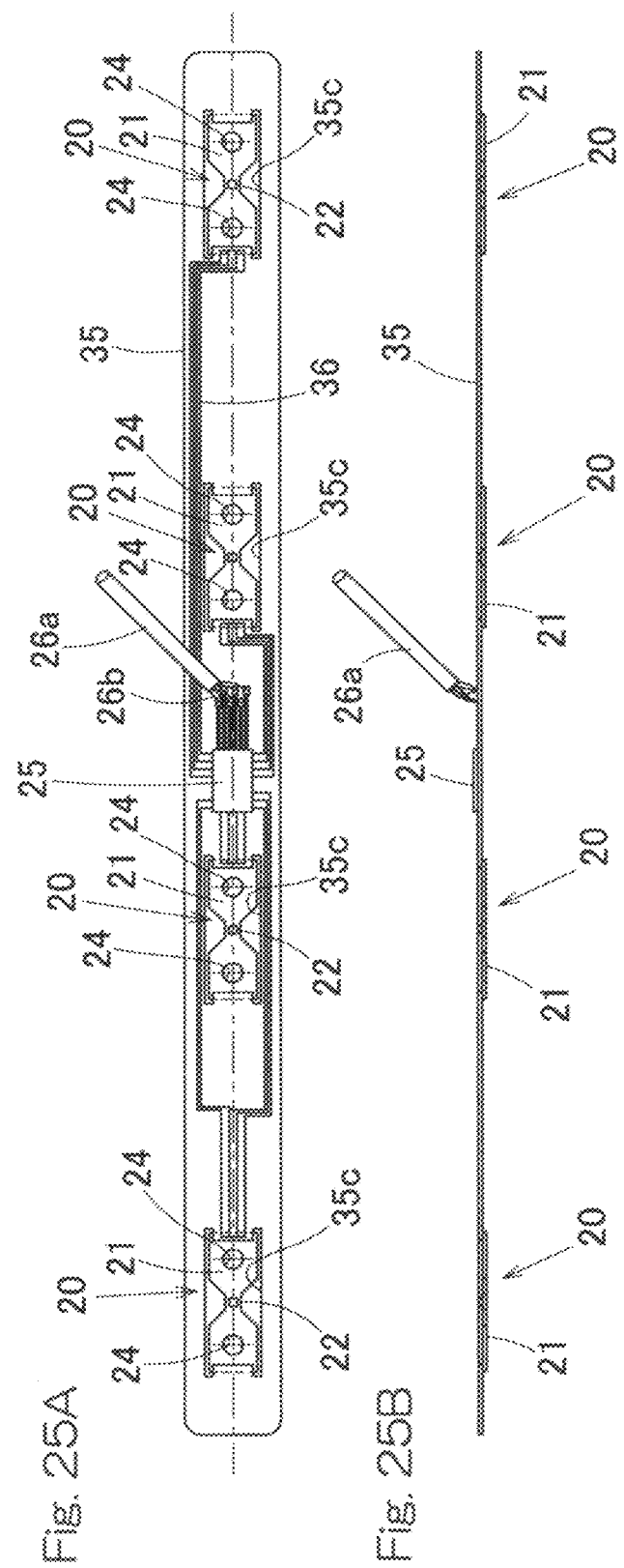

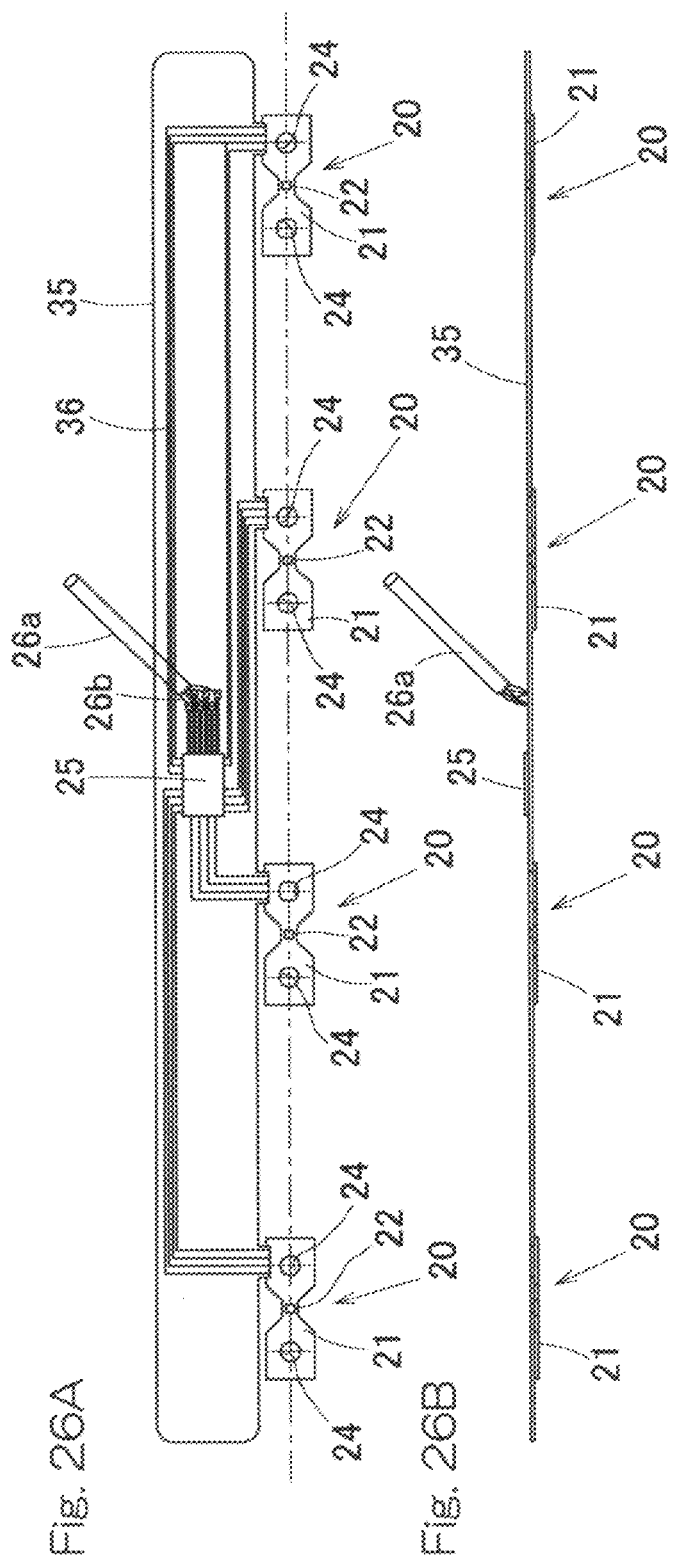

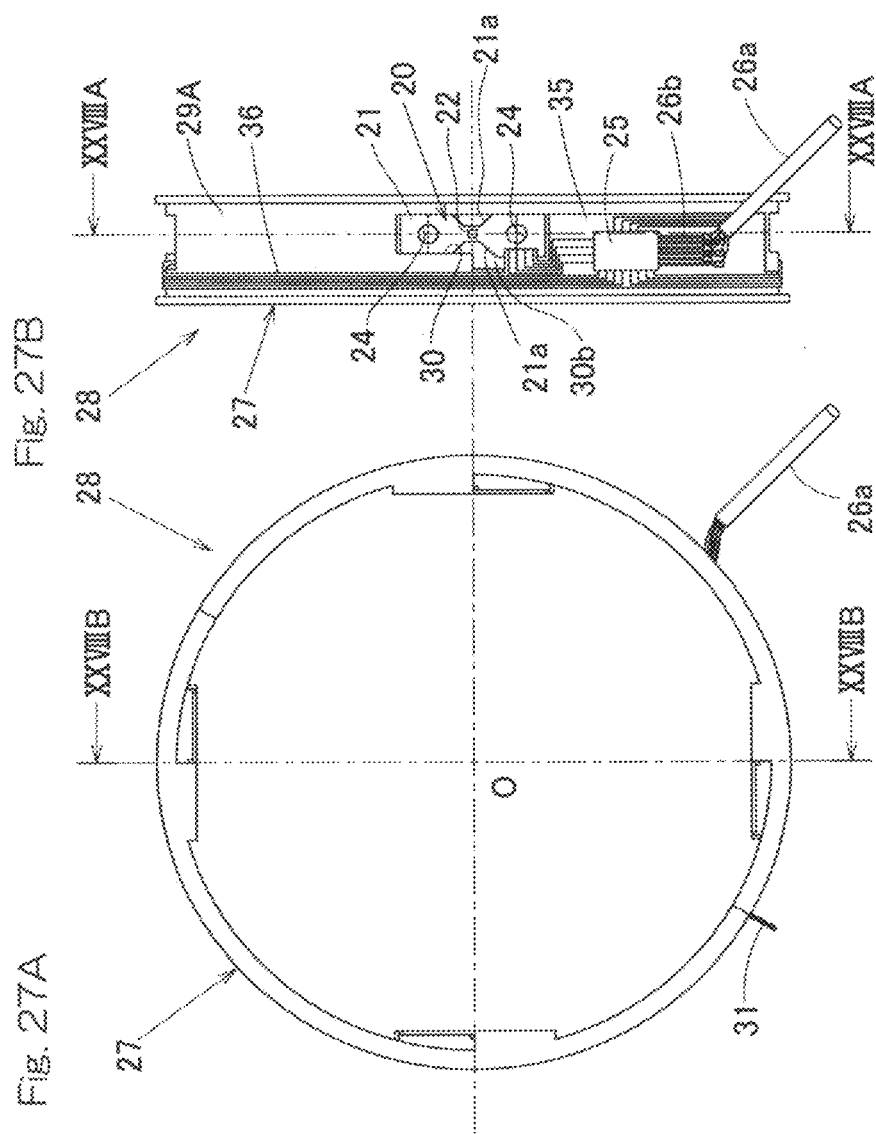

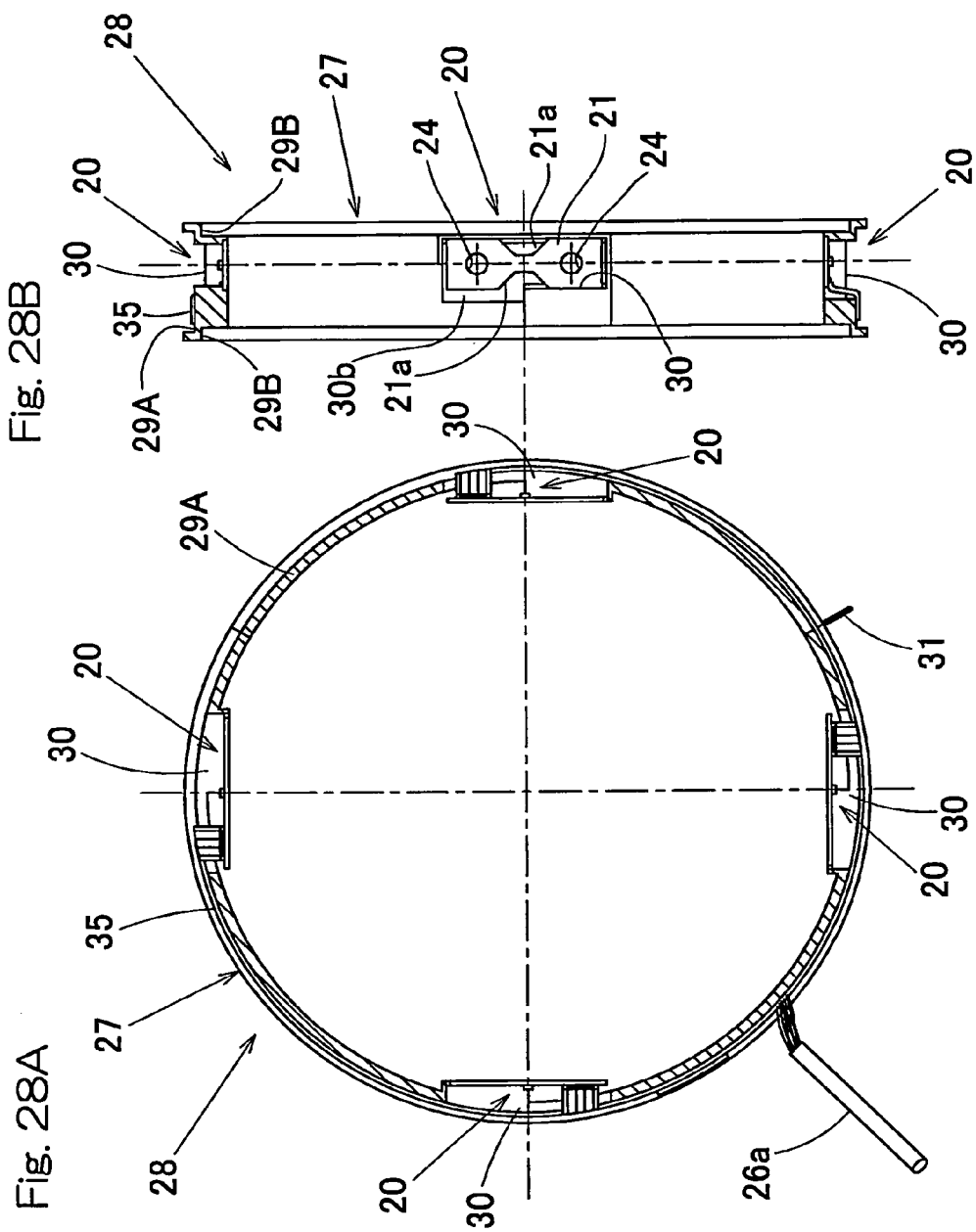

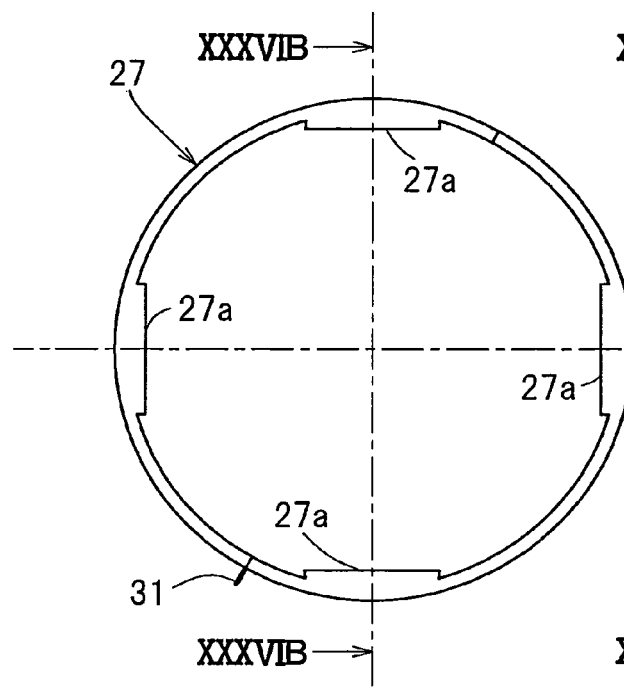
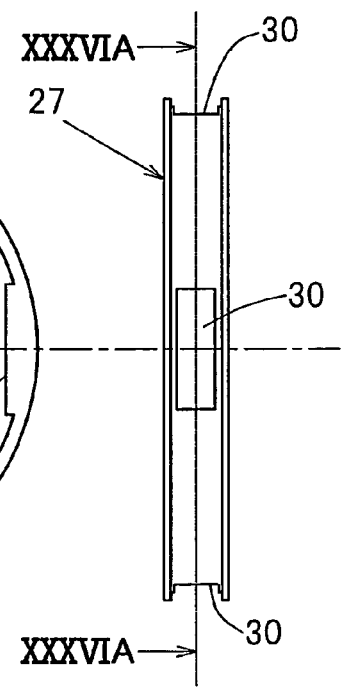
Fig. 35A  Fig. 35B
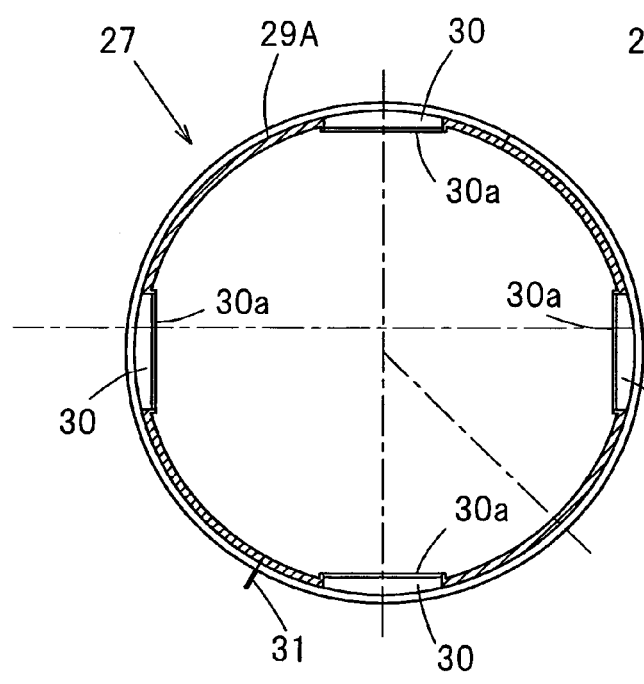
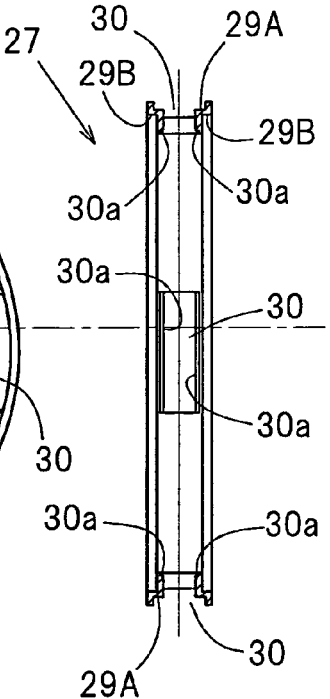
Fig. 36A  Fig. 36B

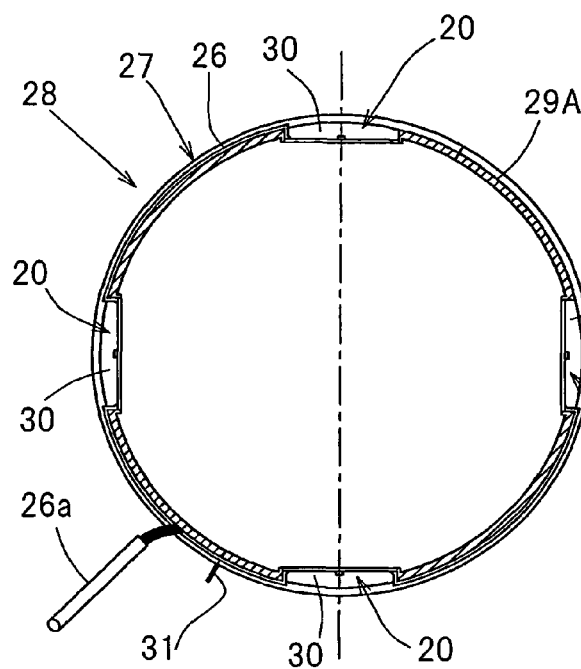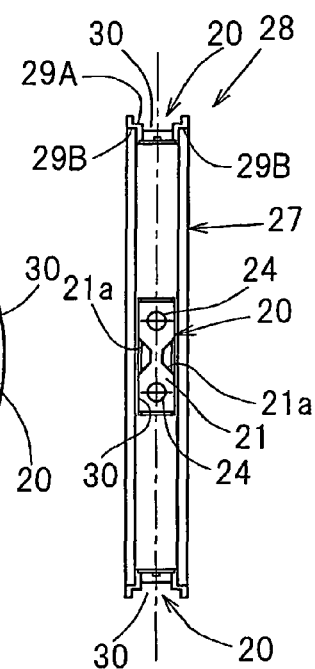

OUTBOARD SIDE ← → INBOARD SIDE

Fig. 50A
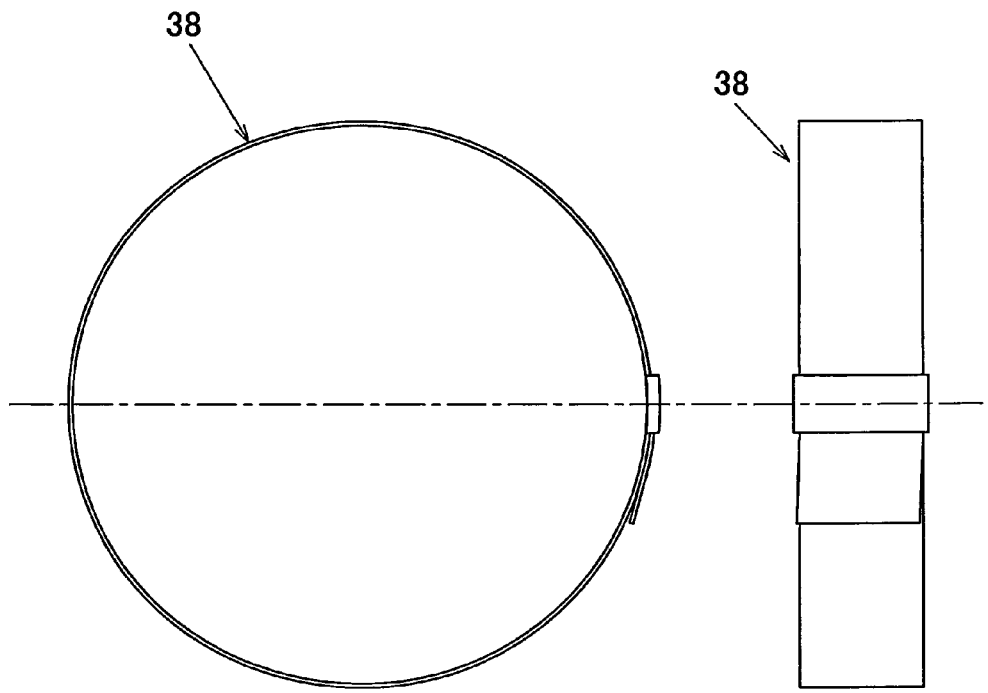
Fig. 50B
Fig. 51
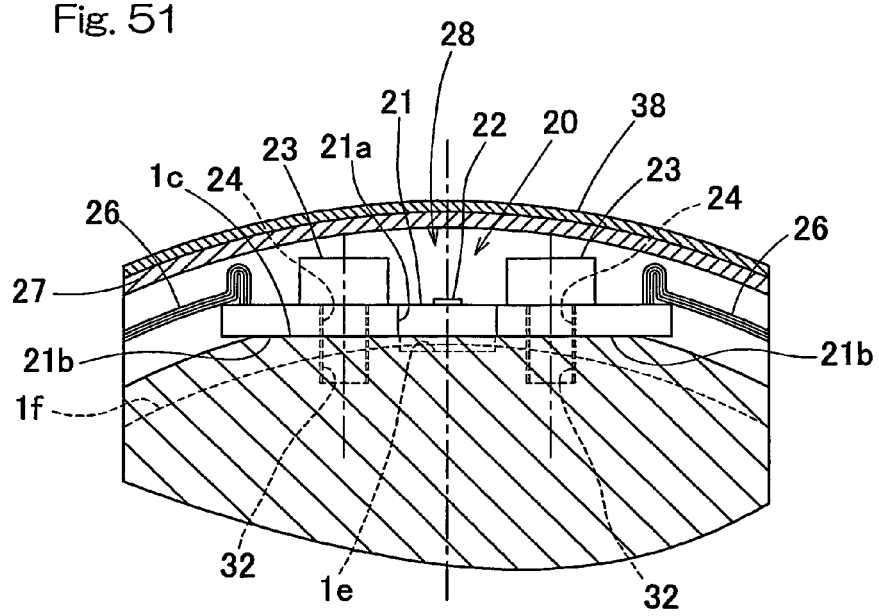

Fig. 64
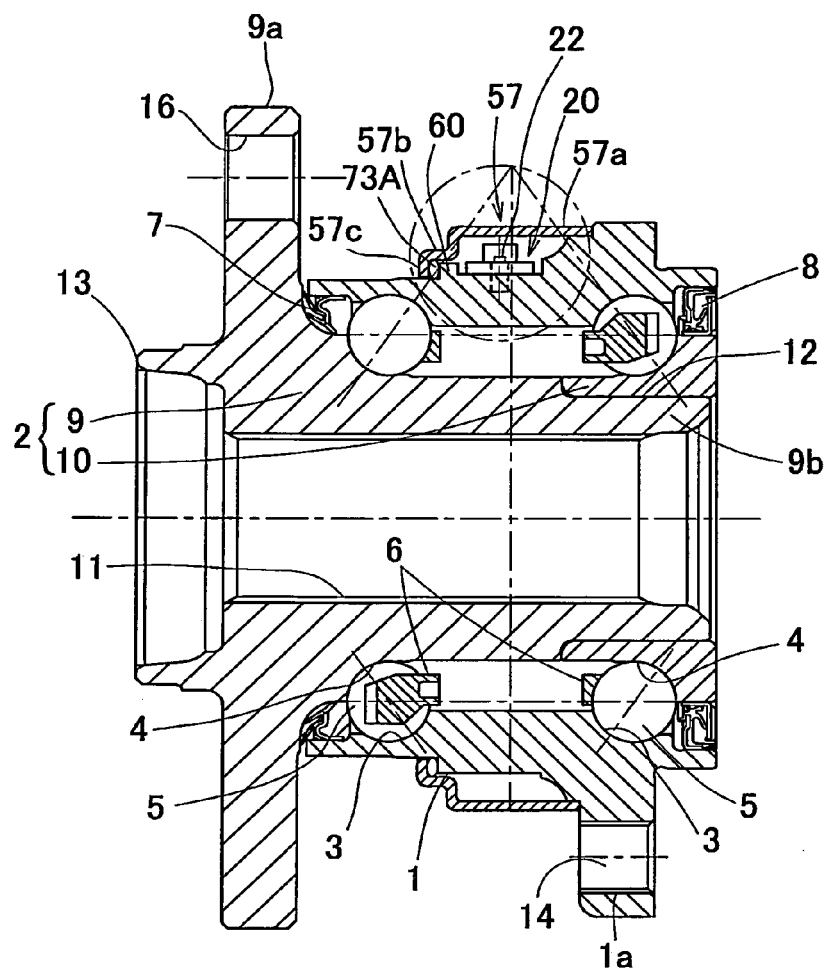
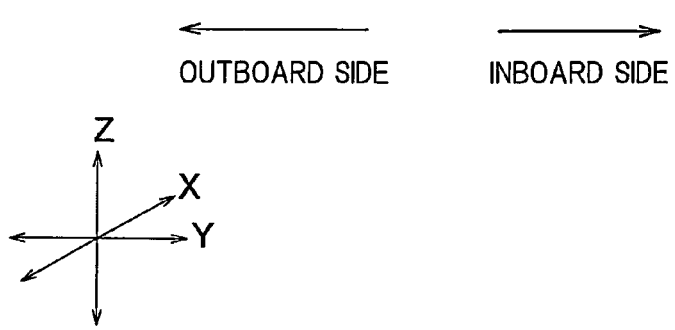

PRIOR ART

SENSOR-EQUIPPED BEARING FOR WHEEL

CROSS REFERENCE TO THE RELATED APPLICATION

This application is a continuation application, under 35 U.S.C §111(a) of international application No. PCT/JP2009/005735, filed Oct. 29, 2009, which claims priority to Japanese patent applications No. 2008-284079, filed Nov. 5, 2008, No. 2008-302296, filed Nov. 27, 2008, No. 2008-314164, filed Dec. 10, 2008, No. 2008-324965, filed Dec. 22, 2008, and No. 2009-022215, filed Feb. 3, 2009, the entire disclosure of all of which is herein incorporated by reference as a part of this application.

BACKGROUND OF THE INVENTION

1. Field of the Invention

The present invention relates to a sensor equipped wheel support bearing assembly having a load sensor built therein for detecting a load imposed on a bearing unit for a vehicle wheel.

2. Description of Related Art

As a technique for detecting a load acting on each of vehicle wheels, a sensor equipped wheel support bearing assembly has been suggested (in for example, the Patent Document 1 listed below), in which a strain occurring in a flange outer diametric surface of an outer ring of the wheel support bearing assembly, which works as a stationary ring, is detected. Another sensor equipped wheel support bearing assembly is also suggested (in, for example, the Patent Document 2 listed below), in which as shown in FIG. 66, a strain gauge 51 is pasted to an outer ring 50 of the wheel support bearing assembly for detecting the strain.

A further sensor equipped wheel support bearing assembly is suggested (in, for example, the Patent Document 3 listed below), in which a sensor unit made up of a strain generating member and a strain sensor fitted to the strain generating member is fitted to an inner diametric surface of an outer member of the bearing, which works as a stationary ring, and the strain generating member has a contact fixing segment at at least two locations relative to the outer member and a cutout at at least one location between the neighboring contact fixing segments, with the strain sensor arranged on this cutout.

According to the sensor equipped wheel support bearing assembly disclosed in the Patent Document 3, supra, when a load acts on a rotatable ring during the travel of an automotive vehicle, such load is transmitted to the stationary ring through rolling elements so that the stationary ring deforms, and therefore, such deformation brings about a strain in the sensor unit. The strain sensor provided in the sensor unit detects such strain occurring in the sensor unit. If relations between the strain and the load are determined beforehand by means of a series of experiments and/or simulations, the load or the like acting on the vehicle wheel can be detected from an output of the strain sensor.

PRIOR ART LITERATURE

[Patent Document 1] JP Laid-open Patent Publication No. 2002-098138
[Patent Document 2] JP Published Int'l Application No. 2003-530565
[Patent Document 3] JP Laid-open Patent Publication No. 2007-057299

DISCLOSURE OF THE INVENTION

It has, however, been found that the structure disclosed in the Patent Document 1 listed above, in which the strain sensor is provided on the outer diametric surface of an outer ring flange portion of the wheel support bearing assembly, and the structure disclosed in the Patent Document 2 listed above, in which as shown in FIG. 66 the strain gauge 51 is pasted to the outer ring 50 of the wheel support bearing assembly, fail to protect the sensor from the ambient environment. For this reason, the sensor is apt to be damaged once small stones on the road, when bounced during the travel of the automotive vehicle, strike against the sensor or once a muddy water is splattered on the sensor during the travel of the automotive vehicle.

On the other hand, according to the structure disclosed in the Patent Document 3 listed above, the sensor unit is fitted to the inner diametric surface of the outer ring of the wheel support bearing assembly and, therefore, the sensor can be protected from the ambient environment, but a procedure to draw a signal cable from inside of the bearing assembly to the outside of the bearing assembly and assemblage of the sensor unit are difficult to achieve.

In any event, none of the Patent Documents 1 to 3 referred to above is silent as to the wiring of the sensor. For example, in the sensor equipped wheel support bearing assembly of the type, in which as is the case with the Patent Document 3, the sensor unit is fitted to the outer member of the wheel support bearing assembly, particularly when the sensor unit is employed in a plural number and a signal processing IC employed for processing respective sensor output signals of those sensor units is fitted to the outer member, fitting the sensor units and the signal processing IC to the outer member and subsequent wiring of individual signal cables for sending the processed sensor output signal to the outside of the bearing assembly bring about the following problems:

(1) The number of component parts used increases, accompanied by an increase of the cost and, therefore, reduction in weight is unable to be accomplished.

(2) A substantial length of time is required in accomplishing the intended wiring and this in turn brings about an increase of the cost.

(3) It is quite often the yield is reduced because of a wrong wiring and/or some of the electronic components damaged during the wiring, and this also bring about an increase of the cost.

An object of the present invention is to provide a sensor equipped wheel support bearing assembly, in which any trouble occurring in the sensor under the influence of the ambient environment can be avoided so that the load, acting on the wheel support bearing assembly or a tire tread surface or a tire periphery in contact with a road surface, can be detected over a substantial period of time and in which wiring of the signal cables and assemblage of the sensors can be accomplished easily.

The sensor equipped wheel support bearing assembly according to the present invention is a sensor equipped wheel support bearing assembly for rotatably supporting a vehicle wheel relative to a vehicle body structure, which includes an outer member having an inner periphery formed with double row rolling surfaces, an inner member having an outer periphery formed with rolling surfaces held in face-to-face relation with the rolling surfaces in the outer member, double row rolling elements interposed between the respective rolling surfaces in the outer and inner members, and a sensor assembly fitted to the peripheral surface of the stationary member in a fashion coaxial with the stationary member. The sensor assembly includes electronic components, which includes a plurality of sensor units, each having a strain generating member fixed to a peripheral surface of one of the outer and inner members, which works as a stationary member, in contact therewith and a sensor fitted to the strain generating member for detecting a strain induced in the strain generating member, a signal processing IC for processing an output signal from the sensor, and a signal cable for transmitting the output signal so processed to the outside of the bearing assembly. The electric components are disposed inwardly of an annular protective covering to provide an annular sensor assembly. The stationary member is, for example, an outer member.

When a load acts on the wheel support bearing assembly or between the vehicle wheel tire and a road surface, such load is applied to the stationary member (for example, the outer member), accompanied by deformation thereof. Since the strain generating member in each of the sensor units is fixed to the stationary member in contact therewith, the strain occurring in the stationary member is transmitted, after having been amplified, to the strain generating member and such strain is detected by the sensor with a high sensitivity, resulting in accurate estimation of the load.

In particular, the electronic components, including the plurality of the sensor units, the signal processing IC for processing the output signal of the sensor in each of the sensor units and the signal cable for transmitting the processed output signals to the outside of the bearing assembly are arranged inside of the annular protective covering to provide the annular sensor assembly, which is in turn fitted to the peripheral surface of the stationary member in a coaxial relation with such stationary member. Therefore, the electronic components referred to above can be covered with the protective covering so that any possible damage to the sensors under the influence of the ambient environment can be avoided and as a result, the load, acting on the wheel support bearing assembly or the tire tread surface, can be detected accurately for a prolonged period of time. For example, the electronic components including the sensors, the signal processing IC and the signal cable can be protected from small stones bounced from the road surface during the travel of the automotive vehicle and/or a muddy water splattered during the travel of the automotive vehicle. Also, wiring of the signal cable and assemblage of the sensors can be facilitated.

In the present invention, the annular sensor assembly is preferably of a structure splittable into two components in a direction circumferentially thereof. By way of example, it is preferred that the annular sensor assembly can be split into the two components at a circumferential center.

Where the sensor assembly is fitted, for example, to the outer diametric surface of the stationary member, the sensor assembly can be easily fitted to the stationary member because of the splittable structure thereof described above.

In the present invention, each of the sensor units may be bolted to the stationary member. Specifically, when the respective sensor unit is bolted in this way, the protective covering and the sensor units can be simultaneously fixed to the bearing assembly. Since this fixing represents a fixing structure that does not require any intervening member such as, for example, a molding material, each of the sensor unit can be firmly fixed and no slip occurs in a fixing site even when loaded, resulting in increase of the detecting accuracy.

In the present invention, portions of the electronic components in the sensor assembly fitted to the stationary, which are exposed from the protective covering, may be sealed with a molding material. For example, the sensor assembly is sealed by means of a secondary molding with the molding material filled after it has been rendered to have the splittable structure as hereinbefore described or fixed to the bearing assembly by means of bolting. It is to be noted that instead of the molding material, a cylindrical protective covering may be bonded to an outer diametric surface of the sensor assembly after a bonding material or a sealant has been filled.

In the case of this construction, the electronic components such as, for example, the sensor units, the signal processing IC and the signal cable can be completely covered with the protective covering and the molding material and, therefore, an undesirable damage to those electronic components under the influence of the ambient environment can be assuredly avoided.

In the present invention, each of the strain generating member may includes a thin plate of a strip shaped configuration, when viewed from top, having a uniform width or a strip shaped configuration, when viewed from top, having a cutout at a lateral portion thereof.

In the case of this construction described above, the strain occurring in the stationary member is apt to be transmitted to the strain generating member after having been amplified and, accordingly, such strain is detected with a high sensitivity, the hysteresis appearing in the output signal thereof is reduced and the load can be estimated accurately. Also, the shape of the strain generating member is simplified and as a result, downsizing and a low cost manufacturing can be accomplished.

In the present invention, the plurality of sensor units may be provided at the same positions in a direction axially of the stationary member.

In the case of this construction described above, since the sensor units are lined up at the same axial position in the stationary member, all of the sensor units can be easily covered with the protective covering and the protective covering can be constructed compact in structure.

In the present invention, the peripheral surface of the stationary member is preferably provided with a cylindrically ground surface area over the entire circumference thereof, in which case portions of the cylindrically ground surface area, at which the strain generating members contacts, respectively, are rendered to be flat ground surface portions. In particular where the stationary member is the outer member, it is preferred that the outer periphery is rendered to be the cylindrically ground surface area over the entire circumference thereof In the case of this construction, fitting of the sensor assembly to the stationary member can be facilitated and the strain generating members can be assuredly held in contact with the peripheral surface of the stationary member.

In the present invention, the stationary member may be the outer member and the sensor assembly may be fitted to an outer diametric surface of the stationary member. In the case of this construction described above, fitting of the sensor assembly onto the stationary member becomes easy and protection of the electronic components, including the sensor units, the signal processing IC and the signal cable, can be readily accomplished with the protective covering.

In the present invention, the plurality of the sensor units may be arranged on upper, lower, left and right surface portions of the stationary member, which correspond respectively to top, bottom left and right positions relative to a tire tread surface. In the case of this construction described above, the load can be accurately estimated under any load condition. In other words, when the load becomes large in a certain direction, a portion where the rolling elements contact the rolling surfaces and a portion where the rolling elements do not contact the rolling surface appear in a 180° phase difference, positioning of the sensor units in a 180° phase difference in accord with such certain direction makes it possible that the load applied to the stationary member through the rolling elements can be necessarily transmitted to any one of those sensor units and the corresponding strain sensor can detect such load.

In the present invention, the electronic components may include a flexible substrate having a wiring circuit for wiring among the sensor units, the signal processing IC and the signal cable.

In particular, since the electronic components referred to previously is so designed as the annular sensor assembly including the plurality of sensor units, the signal processing IC for processing the output signals of the sensors of the sensor units, the signal cable for transmitting the processed output signal to the outside of the bearing assembly, and the flexible substrate having the wiring circuit for wiring among the sensor units, the signal processing IC and the signal cable, damage to the electronic components such as, for example, the sensors under the influence of the ambient environment can be avoided with a simplified wiring and the load acting on the wheel support bearing assembly or the tire tread surface can therefore be detected accurately.

Also, since the sensor units, the signal processing IC and the signal cable are wired with each other by means of the wiring circuit of the flexible substrate, the number of component parts used is reduced and, hence, reduction in cost and weight can be accomplished. In addition, since the wiring can be automated, the number of wiring steps, an erroneous wiring and impairment of the electronic components because of wiring can be reduced.

Yet, since the flexible substrate is bendable, even after the electronic components have been unitized, the sensor assembly can be fitted so as to follow the peripheral surface of the stationary member of the assembled wheel support bearing assembly. In other words, since there is no need to assemble the bearing assembly after the sensor assembly has been fitted to the stand-alone stationary member, and, therefore, any existing production facilities can be utilized for making the sensor equipped wheel support bearing assembly of the present invention. As a result, the sensor equipped wheel support bearing assembly, which is inexpensive and high in reliability, can be obtained.

In the present invention, the sensor assembly may be fitted to the peripheral surface of the stationary member through the sealing member in a fashion coaxial with the stationary member.

According to the construction described above, the electronic components including the plurality of the sensor units, the signal processing IC for processing the output signals of the sensor units and the signal cable for transmitting the processed output signal to the outside of the bearing assembly are arranged inwardly of the annular protective covering to define the annular sensor assembly, which is in turn fitted to the stationary member in a fashion coaxial with the stationary member. Accordingly, the electronic component can be protected with the protective covering and any trouble occurring in the sensors under the influence of the ambient environment under a condition in which the protective covering is unable to follow the deformation of the stationary member can be avoided advantageously, thus enabling the load acting on the wheel support bearing assembly or the tire tread surface to be accurately detected for an extended period of time.

In the present invention, the sealing member may include an annular core metal following a peripheral surface of the protective covering and a pair of annular elastic segments jointed to opposite side edges of the core metal over the entire circumferences thereof from an inner diametric surface thereof to an outer diametric surface thereof. In other words, the elastic segments wrap around the core metal over the inner and outer diametric surfaces thereof.

Where the elastic segments jointed from the inner diametric surface to the outer diametric surface of the core metal is provided in the opposite side edges of the core metal as described above, the elastic segments on the opposite side edges of the sealing member are sandwiched between the peripheral surface of the stationary member and the peripheral surface of the protective covering. For this reason, the interior and the exterior of the protective covering can be shielded completely with the elastic segments, thus enabling the sealing member to exhibit an increased sealing effect.

In the present invention, the annular protective covering may be in the form of a molded article of a rubber-like elastic element, in which case this annular protective covering is fitted to an outer peripheral surface of the stationary member by means of a band wrapped around and fastened to the protective covering.

According to the construction described above, the electronic components including the plurality of the sensor units, the signal processing IC for processing the respective output signals of the sensors and the signal cable for transmitting the processed output signal to the outside of the bearing assembly is fitted to the outer peripheral surface of the stationary member in a fashion coaxial with the stationary member and, at the same time, the sensor assembly is covered with the annular protective covering made, for example, in the form of the elastomer molder article and this annular protective covering is fitted to the outer peripheral surface of the stationary member by means of the band wrapped around and fastened to the protective covering. Accordingly, the sensor assembly can be covered with the protective covering and damages to the sensors under the influence of the ambient environment are prevented so as to enable the load acting on the wheel support bearing assembly or the tire tread surface to be detected for an extended period of time.

In the present invention, the annular protective covering may have an inner diameter increasing towards an inboard side of the sensor assembly, in which case the inboard end of the protective covering is mounted on an outer peripheral surface of the stationary member and the protective covering also having an outboard end is fitted to the outer peripheral surface of the stationary member through a sealing ring of an elastic element.

According to the construction described above, the electronic components including the plurality of the sensor units for detecting the load, the signal processing IC for processing the respective output signals of the sensors and the signal cable for transmitting the processed output signal to the outside of the bearing assembly are fitted to the outer peripheral surface of the stationary member in a fashion coaxial with the stationary member and, at the same time, the sensor assembly is covered with the protective covering of a type having the inner diameter increasing towards the inboard side. Since the inboard end of this protective covering is mounted on the outer peripheral surface of the stationary member and the outboard end of the protective covering is fitted to the outer peripheral surface of the stationary member through the sealing ring made of the elastic element, the sensor assembly can be covered with the protective covering and damages to the sensors under the influence of the ambient environment are prevented so as to enable the load acting on the wheel support bearing assembly or the tire tread surface to be accurately detected for an extended period of time.

In the present invention, the protective covering may be of a stepped cylindrical configuration with its inboard end having a large diameter. The use of the protective covering of the stepped cylindrical configuration with its inboard end having a large diameter advantageously facilitates press fitting of the protective covering onto the outer peripheral surface of the stationary member from the outboard side of the stationary member.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7A is a cross sectional view taken along the line VIIA-VIIA in FIG. 6B;

FIG. 7B is a cross sectional view taken along the line VIIB-VIIB in FIG. 6A;

FIG. 8 is a diagram showing, in a developed form, various electronic component employed in a sensor assembly;

FIG. 13 is a sectional view showing the sensor equipped wheel support bearing assembly according to a second preferred embodiment of the present invention;

FIG. 14 is a cross sectional view taken along the line XIV-XIV in FIG. 13;

FIG. 24A is a developed plan view showing another example of arrangement of the electronic components used in the sensor assembly;

FIG. 24B is a cross sectional view taken along the line XXIVB-XXIVB in FIG. 24A;

FIG. 25A is a developed plan view showing a further example of arrangement of the electronic components used in the sensor assembly;

FIG. 25B is a sectional view of FIG. 25A;

FIG. 26A is a developed plan view showing a still further example of arrangement of the electronic components used in the sensor assembly;

FIG. 26B is a sectional view of FIG. 26A;

FIG. 27A is a front elevational view showing the sensor assembly;

FIG. 27B is a side view showing the sensor assembly;

FIG. 28A is a cross sectional view taken along the line XXVIIIA-XXVIIIA in FIG. 27B;

FIG. 28B is a cross sectional view taken along the line XXVIIIB-XXVIIIB in FIG. 27A;

FIG. 35A is a front elevational view of the annular protective covering;

FIG. 35B is a side view of the annular protective covering shown in FIG. 35A;

FIG. 36A is a cross sectional view taken along the line XXXVIA-XXXVIA in FIG. 35B;

FIG. 36B is a cross sectional view taken along the line XXXVIB-XXXVIB in FIG. 35A;

FIG. 39A is a cross sectional view taken along the line XXXIXA-XXXIXA in FIG. 38B;

FIG. 39B is a cross sectional view taken along the line XXXIXB-XXXIXB in FIG. 38A;

FIG. 50A is a front elevational view showing a band employed in the sensor equipped wheel support bearing assembly;

FIG. 50B is a side view of FIG. 50A;

FIG. 51 is an enlarged sectional view showing a portion indicated by C in FIG. 44;

FIG. 64 is a sectional view showing the sensor equipped wheel support bearing assembly according to a seventh preferred embodiment of the present invention;

DESCRIPTION OF PREFERRED EMBODIMENTS

A first preferred embodiment of the present invention will now be described in detail with particular reference to FIG. 1 to FIGS. 12A and 12B. The embodiment shown therein is applied to a wheel support bearing assembly for the support of a vehicle drive wheel, which is an inner ring rotating model of the third generation type. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
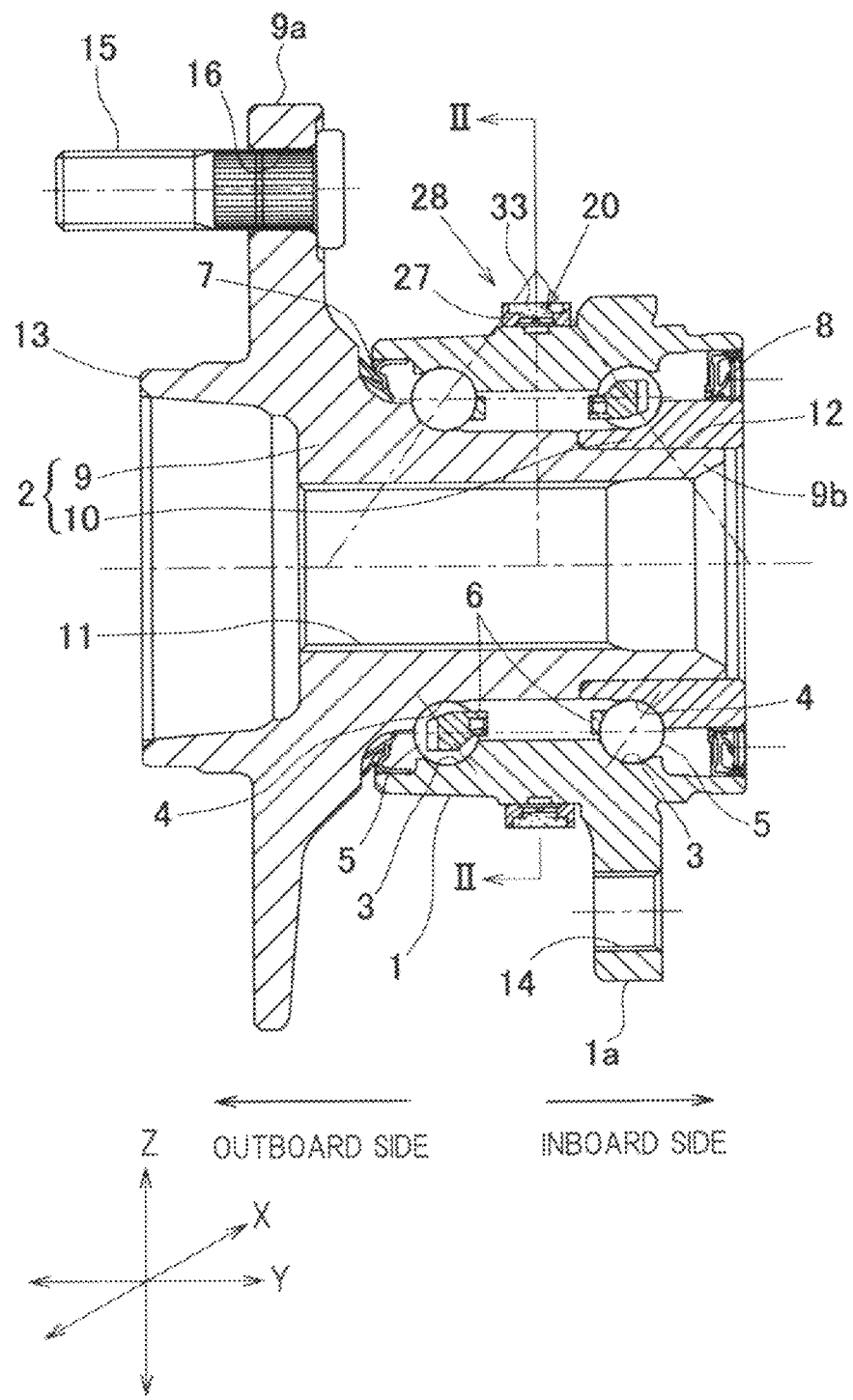
FIG. 1 is a sectional view of a sensor equipped wheel support bearing assembly according to a first preferred embodiment of the present invention.
Figure 2:
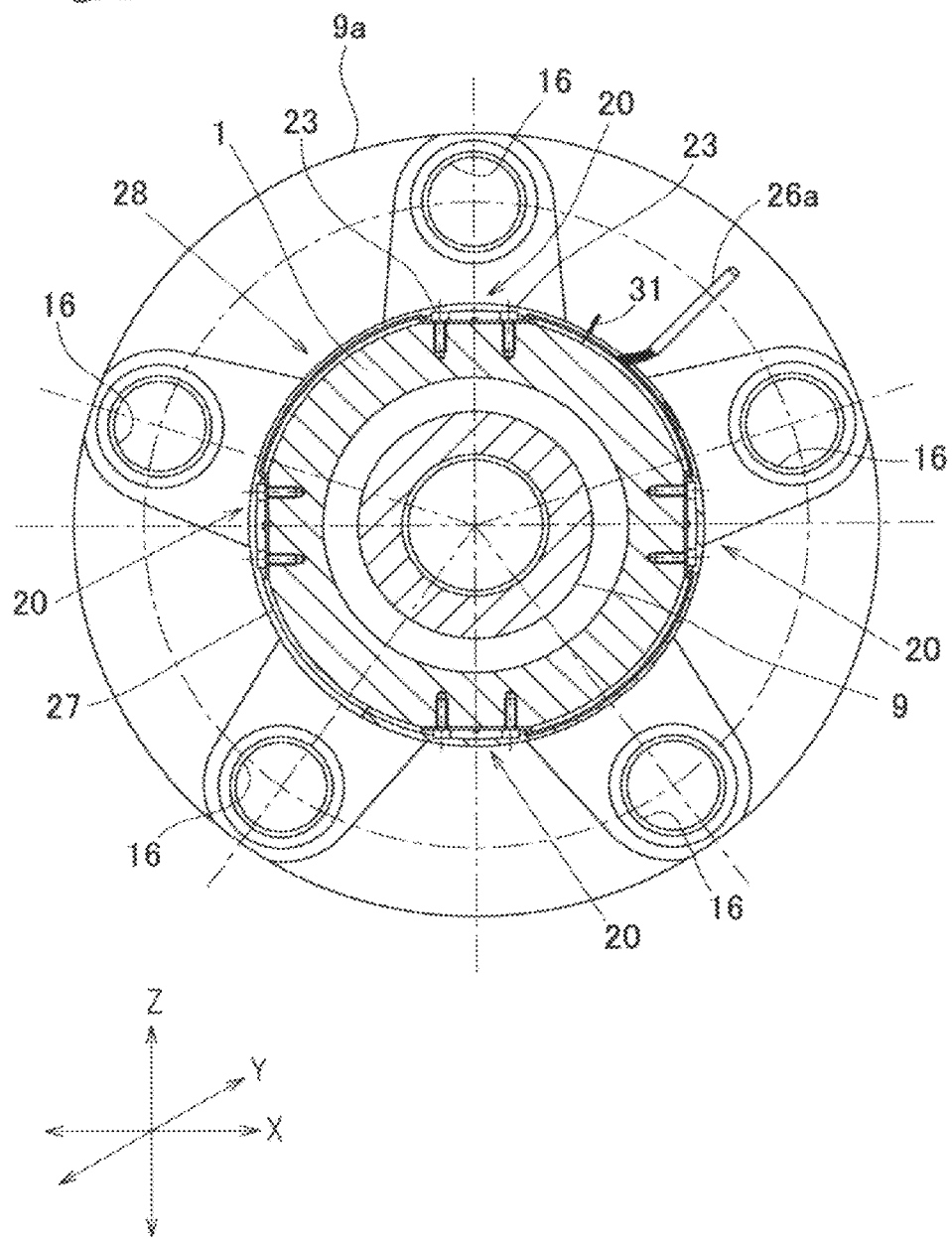
FIG. 2 is a cross sectional view taken along the line II-II in FIG. 1.

The sensor equipped wheel support bearing assembly according to the first embodiment of the present invention includes, as best shown in FIG. 1 in a sectional representation, an outer member 1 having an inner periphery formed with double row rolling surfaces 3, an inner member having an outer periphery formed with rolling surfaces 4 held in face-to-face relation with the respective rolling surfaces 3, and double row rolling elements 5 interposed between the respective rolling surfaces 3 and 4 in the outer and inner members 1 and 2. This wheel support bearing assembly is rendered to be a double row angular contact ball bearing type, in which the rolling elements 5 are in the form of balls and each row of the rolling elements 5 are retained by a retainer 6. The rolling surfaces 3 and 4 represent an arcuate sectional shape and are so formed as to have respective ball contact angles held in back-to-back relation to each other. Opposite annular ends of a bearing space delimited between the outer member 1 and the inner member 2 are sealed by respective sealing members 7 and 8.

The outer member 1 serves as a stationary member and is of one piece construction including a vehicle body fitting flange 1a formed in the outer periphery thereof, which flange 1a is adapted to be secured to a knuckle (not shown) forming a part of a vehicle suspension system (also not shown) mounted on the vehicle body structure. The flange 1a has a plurality of internally threaded mounting holes 14 defined therein at respective circumferential locations, and this vehicle body fitting flange 1*a* is rigidly secured to the knuckle when knuckle bolts (not shown) inserted into corresponding bolt insertion holes, defined in the knuckle, from the inboard side are firmly threaded into the associated internally threaded mounting holes 14.

The inner member 2 serves as a rotatable member and includes a hub unit 9, made up of a wheel mounting hub flange 9*a* and an hub axle 9*b* rigid or integral with the wheel mounting hub flange 9*a*, and an inner ring 10 mounted on an inboard side end of the hub axle 9*b* of the hub unit 9. The double row rolling surfaces 4 referred to previously are formed respectively in the hub unit 9 and the inner ring 10. The inboard side end of the hub unit 9 has an outer periphery thereof radially inwardly depressed to define an inner ring mounting surface area 12 of a reduced outer diameter, and the inner ring 10 referred to above is firmly mounted on this inner ring mounting surface area 12. The hub unit 9 has a center bore 11 defined therein so as to extend in a direction longitudinally thereof. The hub flange 9*a* is formed with press-fit holes 16 defined therein in a row extending over the circumference thereof for receiving corresponding hub bolts 15 that are press-fitted therein. A root portion of the hub flange 9*a* of the hub unit 9 has a cylindrical pilot portion 13*a* protruding towards the outboard side for guiding a vehicle wheel and a brake component part (not shown).

The outer member 1, which serves as a stationary member, has its outer diametric surface provided with four sensor units 20. In the illustrated embodiment, those sensor units 20 are mounted on upper, lower, left and right surface portions of the outer diametric surface of the outer member 1, which correspond respectively to top, bottom, forward and rearward positions with respect to a tire tread surface or a tire periphery in contact with a road surface.

Each of those sensor units 20 is made up of a strain generating member 21 and a strain sensor 22 fitted to the strain generating member 21 for detecting a strain induced in the strain generating member 21. The strain generating member 21 is prepared from a thin and elastically deformable metallic plate of 2 mm or smaller in thickness such as, for example, a steel material and represents, when viewed from top, a strip-like shape having a substantially uniform width over the entire length thereof, with a cutout 21*a* formed at a longitudinally intermediate portion of each of the opposite side edges thereof so as to extend inwardly of the strain generating member 21.

Also, the strain sensor 22 referred to above is pasted to a portion of the respective strain generating member 21 where the strain can be maximized relative to a load acting in various directions. In the illustrated embodiment, for that portion of the strain generating member 21 where the strain sensor 22 is pasted, a longitudinally intermediate portion of an outer surface of the strain generating member 21, which is left between the cutouts 21*a* in the opposite side edges thereof, is chosen so that the strain sensor 22 can detects the strain acting in a circumferential direction in the vicinity of those cutouts 21*a*. Opposite end portions of the strain generating member 21, which are spaced in a direction lengthwise thereof and lie on respective sides of the strain sensor 22, are formed with respective bolt insertion holes 24 for receiving corresponding bolts 23 (FIG. 2) used to secure the respective sensor unit 20 to the outer diametric surface of the outer member 1.

The strain generating member 21 is preferably of a kind that does not undergo any elastic deformation even when the maximum expected force is applied as an external force, acting on the outer member 1 serving as the stationary member, or a working force acting between the wheel tire and the road surface. If the elastic deformation occurs in the strain generating member 21, the deformation of the outer member 1 will not be transmitted to the corresponding sensor unit 20, thus affecting the measurement of the strain. The term "maximum expected force" referred to hereinabove and hereinafter is intended to mean the highest force within the range of force with which, for example, the bearing assembly will not be impaired even when an abnormally large force acts on the bearing assembly, but a normal functioning, except for the sensor system, can be resumed as the bearing assembly once such force is removed.

Figure 6A:
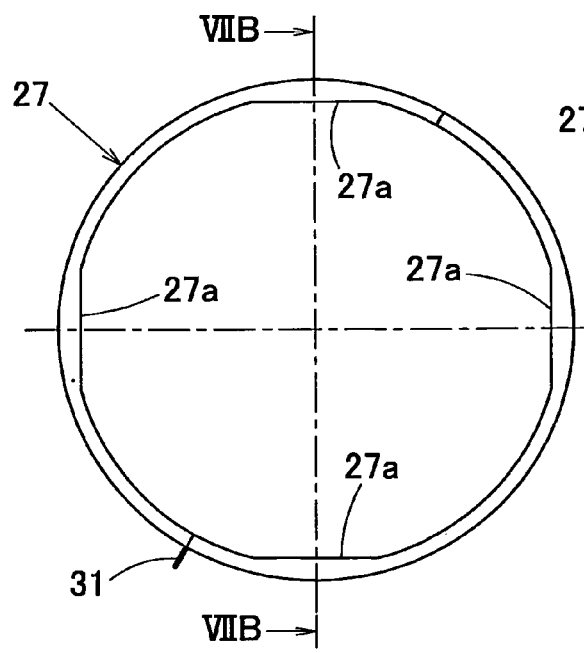
FIG. 6A is a front elevational view showing an annular protective covering.
Figure 6B:
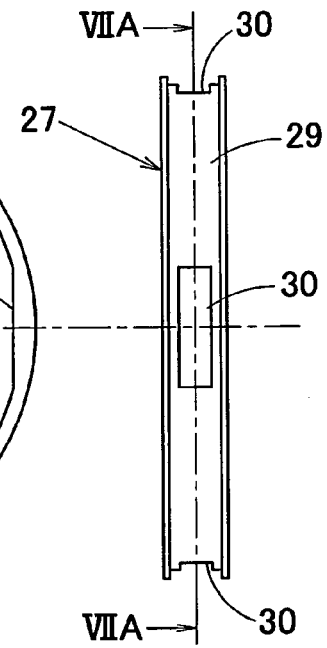
FIG. 6B is a side view showing the annular protective covering.
Figure 9A:
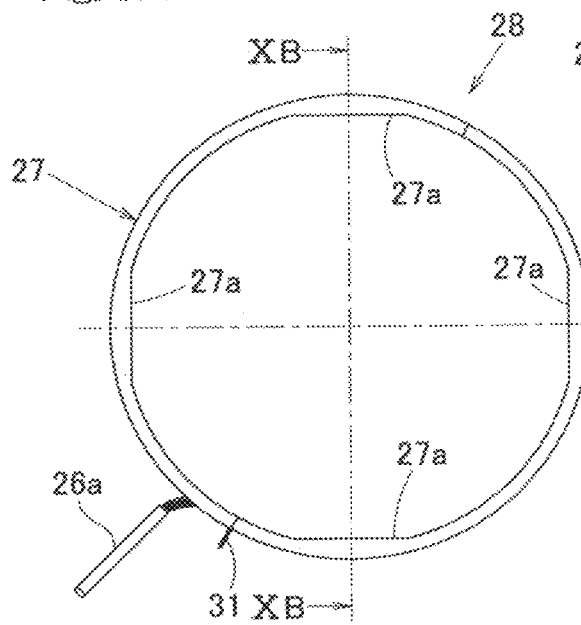
FIG. 9A is a front elevational view of the sensor assembly.
Figure 9B:
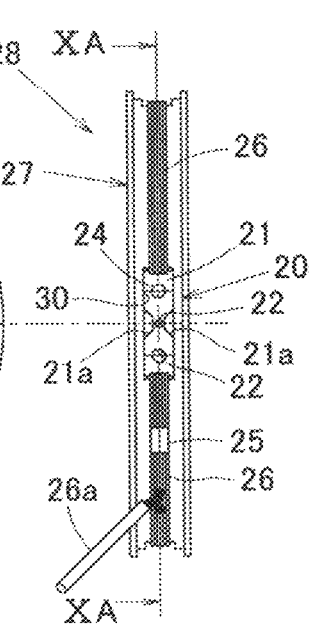
FIG. 9B is a side view of the sensor assembly.

The four sensor unit 20 referred to above are arranged inwardly of the annular protective covering 27, as shown in FIGS. 6A and 6B in front elevational and side views, respectively, together with electronic components, including a signal processing IC 25 for processing respective output signals of the strain sensors 22, signal a cable 26 (FIG. 8) for connecting each of the sensor units 20 with the signal processing IC 25 and feeding the output signals, then having been processed, to the outside of the bearing assembly to thereby complete an annular sensor assembly 28 as best shown in FIGS. 9A and 9B in front elevational and side views, respectively. FIG. 8 illustrates in a developed form, the electronic components that are arranged inside the protective covering 27. Among the sensor units 20, the signal cables 26 are wires within a groove 29 of the protective covering 27 and the signal processing IC 25 is disposed at a point halfway the signal cable 26. The signal cable 26 is fitted as if wound around a bottom face of the groove 29. A lead-out line 26*a* of the signal cables 26, drawn towards the automotive vehicle body structure, is drawn outwardly of the protective covering 27 at one location of the latter. The protective covering 27 may be made of a material selected from the group consisting of plastic, rubber and metal.

Figure 10A:
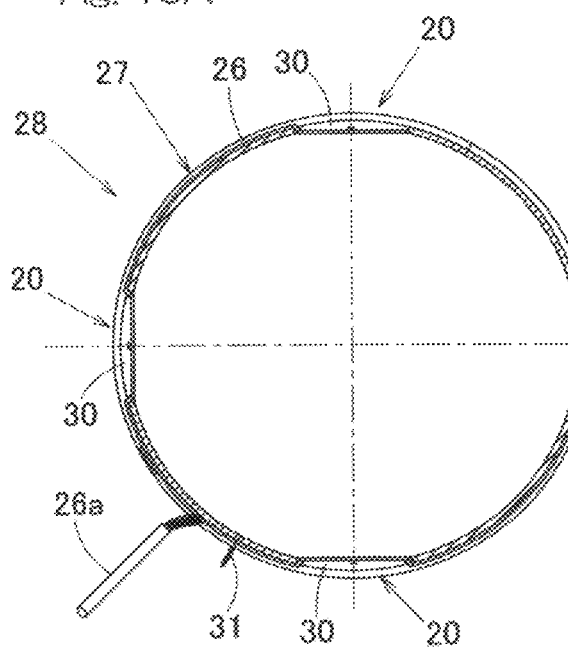
FIG. 10A is a cross sectional view taken along the line XA-XA in FIG. 9B.
Figure 10B:
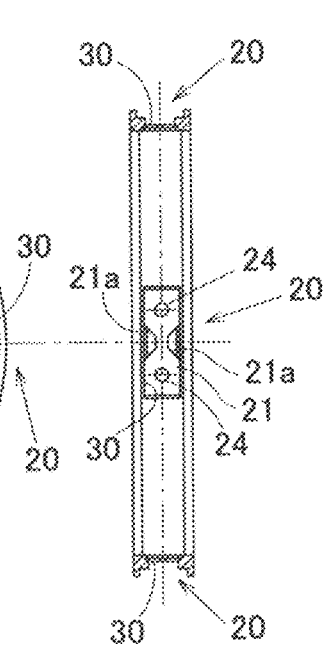
FIG. 10B is a cross sectional view taken along the line XB-XB in FIG. 9A.

As best shown in FIGS. 7A and 7B showing the cross sections taken along the lines VIIA-VIIA in FIG. 6B and VIIB-VIIB in FIG. 6A, respectively, circumferentially spaced four surface areas of the inner diametric surface of the protective covering 27, where the associated sensor units 20 are disposed, are so shaped and so configured over a predetermined circumferential length to define respective flat surface areas 27*a*. The protective covering 27 has an outer diametric surface formed with the circumferentially extending groove 29 and is formed with rectangular openings 30 formed at respective sites thereof, where the flat surface areas 27*a* are defined as hereinabove described, each of those rectangular openings 30 extending across the thickness from the groove 29 to the inner diametric surface of the protective covering 27. Axially spaced opposite side edges on an inner diametric side of those rectangular openings 30 along a circumferential direction are provided with respective engagement steps 30*a* engageable with the strain generating members 21 in the four sensor units 20. Each of those engagement steps 30*a* is provided in the corresponding flat surface area 27*a*. Accordingly, as best shown in FIGS. 10A and 10B showing the cross sections taken along the lines XA-XA in FIG. 9B and XB-XB in FIG. 9A, respectively, each of the sensor units 20 is fitted to the respective flat surface area 27*a* so as to be seated inside the corresponding rectangular opening 30 in the protective covering 27 with the associated strain generating member 21 exposed towards the inner diametric side.

Since as hereinabove described each of the sensor units 20 is fitted to the inner diametric surface of the protective covering 27 with the strain generating member 21 exposed, it is possible to hold the strain generating member 21 in tight contact with the outer diametric surface of the outer member 1, which works as the stationary member, so that the elastic deformation occurring in the outer member 1 can be effectively transmitted to the strain generating member 21. Each of the rectangular openings 30 is an opening formed to permit the wiring and bolting of the associated sensor unit 20 to be performed from an outer peripheral side of the protective covering 27.

Figure 11A:
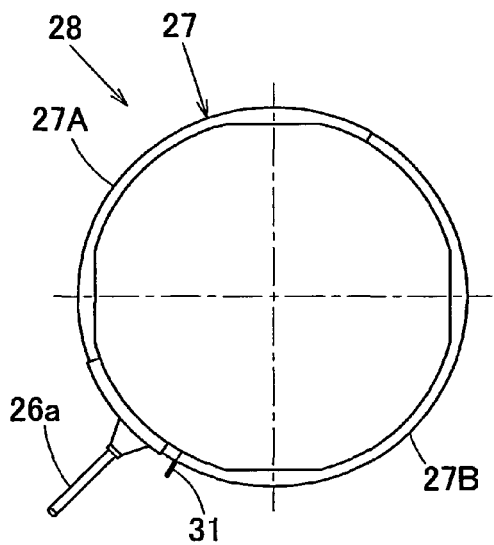
FIG. 11A is a front elevational view showing the sensor assembly in a closed condition.
Figure 11B:
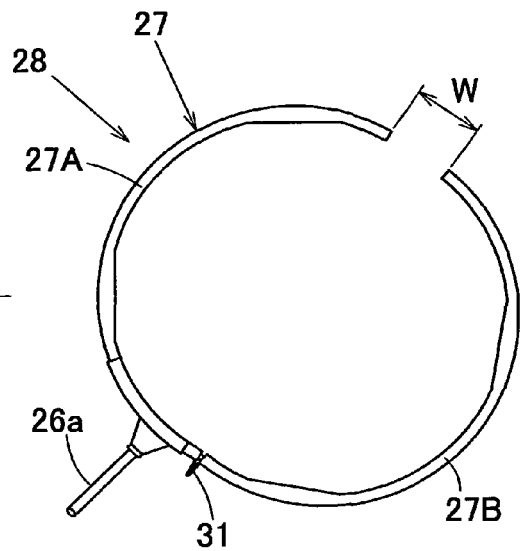
FIG. 11B is a front elevational view showing the sensor assembly in an opened condition.

The annular sensor assembly 28 is splittable at a circumferential center thereof into two components as best shown in FIGS. 11A and 11B. More specifically, the annular protective covering 27 is of a structure including two split components 27A and 27B that are hingedly connected at one end thereof with each other by means of a hinge 31 such that the two arcuate components of the sensor assembly 28 can be selectively opened or closed through the hinge 31. The maximum clearance W delimited between respective free ends of the two arcuate components 27A and 27B opposite to the hinge 31, when the sensor assembly 28 is held in a fully opened position as best shown in FIG. 11B, is chosen to be of a value greater than the outer diametric dimension D (FIG. 4) of the outer member 1. Accordingly, while the protective covering 27 is fully opened to permit the clearance W between the respective free ends of the arcuate components 27A and 27B to assume the maximum value, the sensor assembly 28 can be mounted on to the outer diametric surface of the outer member 1 in a direction radially inwardly of the outer member 1.

Figure 4:
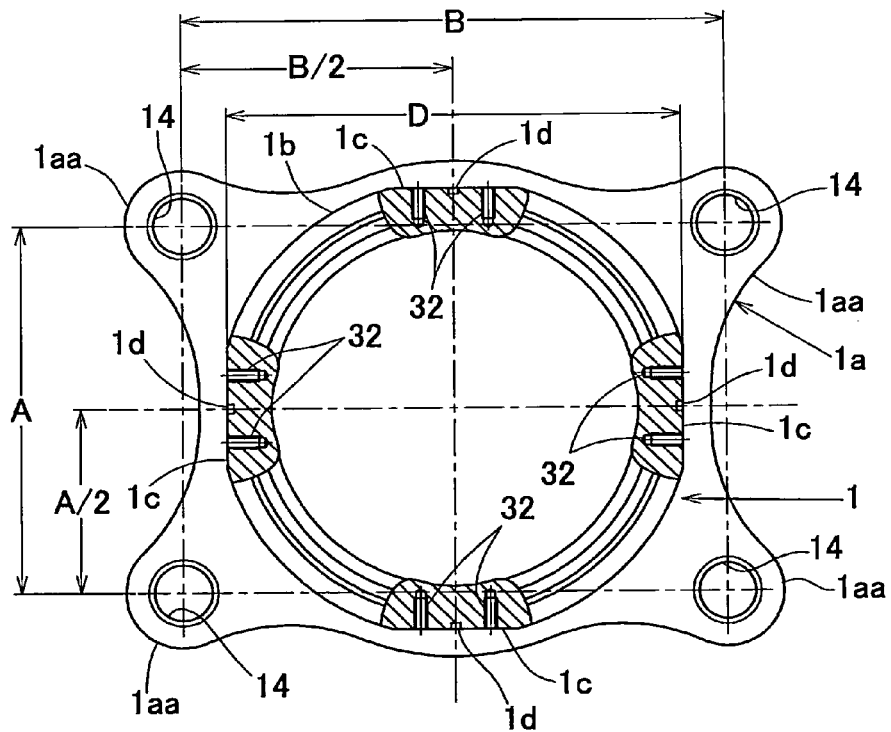
FIG. 4 is a front elevational view, with a portion broken away, showing a portion of the outer member as viewed from the outboard side.
Figure 5:
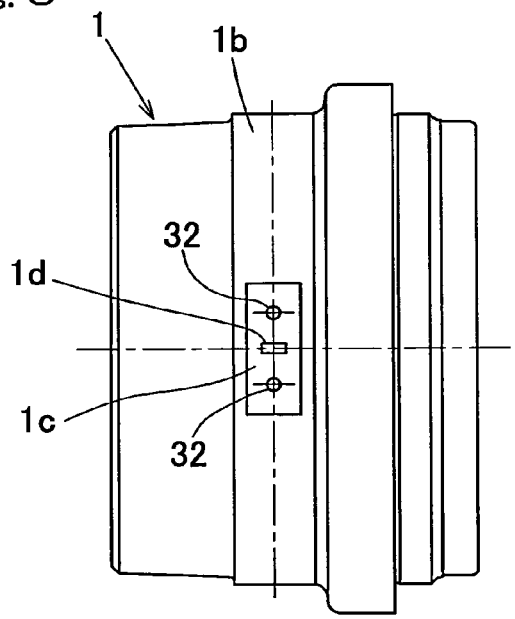
FIG. 5 is a side view of the outer member.

FIG. 4 illustrates in a fragmentary front elevational view with a portion broken away, the outer member 1 as viewed from the outboard side. The vehicle body fitting flange 1a integral or rigid with the outer member 1 is rendered in the form of radially outwardly extending lugs 1aa formed by protruding respective circumferential portions of the flange 1a, where the mounting holes 14 are defined, toward an outer diametric side, that is, in a direction radially outwardly of the flange 1a beyond the remaining circumferential portion of such flange 1a. An axial location of the outer member 1, where the sensor assembly 28 is mounted, provided with a cylindrically ground surface area 1b that extends over the entire circumference of the outer member 1. Also, four portions of the cylindrically ground surface area 1b, where the strain generating members 21 of the respective sensor units 20 contact, that is, upper, lower, left and right surface portions of the cylindrically ground surface area 1b are each formed in a flat ground surface portion 1c as best shown in FIG. 5. Accordingly, the strain generating members 21 of the sensor units 20 can be assuredly held in contact with the corresponding flat ground surface portions 1c.

Also, each of the flat ground surface portions 1c is formed with two internally threaded screw holes 32 in alignment with the corresponding bolt insertion holes 24 defined in each of the strain generating members 21. Accordingly, when the bolts 23 inserted through the bolt insertion holes 24 in the strain generating members 21, after the sensor assembly 28 is mounted on the cylindrically ground surface area 1b in the outer member 1, are threaded into the corresponding screw holes 32, the sensor units 20 can be fixed on the outer diametric surface of the outer member 1 and, at the same time, the sensor assembly 28 in its entirety can also be fixed in position.

An area of each of the flat ground surface portions 1c, which lies intermediate between the two screw holes 32, is formed with an axially extending groove 1d. Accordingly, the intermediate area, where the cutouts 21a in the strain generating member 21 are positioned, is separated from the flat ground surface portion 1c and, therefore, a strain induced deformation in the vicinity of the cutouts 21a can be facilitated. The four sensor units 20 are provided at respective positions where the strain sensors 22 in those sensor units 20 lie at the respective locations where they assume the same positions with respect to the axial direction.

Figure 3:
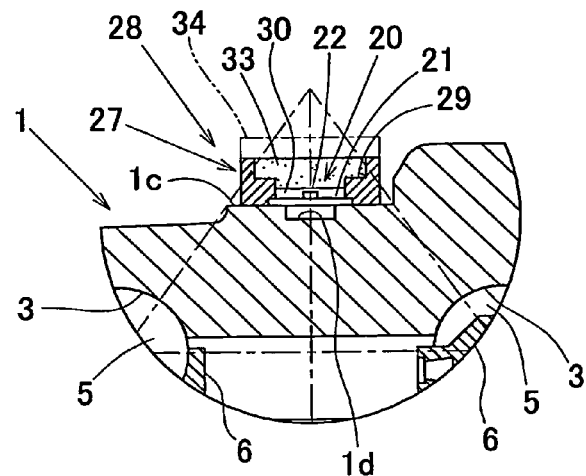
FIG. 3 is an enlarged sectional view showing a site of installation of a sensor assembly in an outer member.

The site at which the sensor assembly 28 is mounted on the outer member 1 is shown in FIG. 3 on an enlarged scale. As shown therein, after the sensor assembly 28 has been mounted on the outer diametric surface of the outer member 1, the respective portions of the electronic components (including the sensor unit 20, the signal processing IC 25 and the signal cable 26) in the sensor assembly 28, which are exposed from the protective covering 27, are sealed with a molding material 33. In other word, a secondary molding is carried out with the molding material 33. More specifically, the molding material 33 is filled in the groove 29 defined in the protective covering 27 so as to extend over the entire circumference of the latter to thereby seal the exposed portions of the electronic components.

Figure 12A:
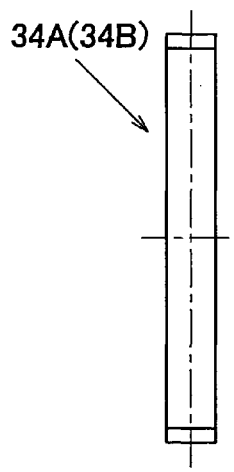
FIG. 12A is a side view showing a split body of a ring shaped outer covering.
Figure 12B:
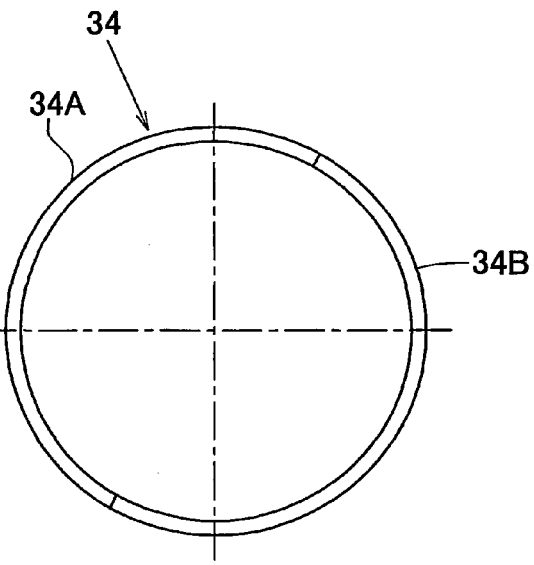
FIG. 12B is a front elevational view showing the ring shaped outer covering.

It is to be noted that instead of the use of the molding material 33 for sealing the exposed portions of the electronic components referred to above, a ring shaped outer covering member 34 comprised of two semicircular split pieces 34A and 34B as shown in FIGS. 12A and 12B may be fixedly bonded to an outer diametric surface of the sensor assembly, as shown by the double dotted line in FIG. 3, after a bonding material or a sealing material has been filled in the circumference groove 29 in the protective covering 27. In other words, after the sensor assembly 28 has been fitted to the bearing assembly, the ring shaped outer covering member 34 may be fitted to the outer diametric surface of the sensor assembly 28.

For the strain sensor 22 in each of the sensor units 20, any of various types can be employed. For example, the strain sensor 22 may be employed in the form of a metal foil strain gauge. In such case, fixture thereof to the strain generating member 21 is generally carried out by means of a bonding technique. Also, the strain sensor 22 may alternatively be employed in the form of a thick film resistance element formed on the strain generating member 21.

The strain sensor 22 of each of the sensor units 20 is connected with the previously described signal processing IC 25. The signal processing IC 25 estimates a force (a vertically load Fz, a load Fx expected to become a driving force or a braking force, an axially load Fy) acting on the wheel support bearing assembly or between the vehicle wheel and the road surface (the tire tread surface) and includes, for example, a signal processing circuit and/or a correcting circuit. The signal processing IC 25 has a relation setting module (not shown), in which relations between the working force and the output signal of the strain sensor are set in terms of calculating equations and/or tables, and is operable to estimate and then output a value of the working force from the output signal, inputted thereto, by means of the relation setting module. The contents of the relation setting module are determined by means of a series of experiments and/or simulations before they are set in the relation setting module.

When a load acts between the wheel tire and the road surface, such load is also applied to the outer member 1, serving as the stationary member of the wheel support bearing assembly, accompanied by deformation. Since the strain generating member 21 in each of the sensor units 20 is fixed to the peripheral surface of the outer member 1 in contact therewith, the strain occurring in the outer member 1 is transmitted to the strain generating member 21 after having been amplified, and such strain is subsequently detected by the strain sensor 22 with a high sensitivity and, therefore, the load can be estimated accurately.

In particular, the electronic components including the plural sensor units 20, the signal processing ICs 25 for processing the respective output signals of the strain sensors 22, and the signal cables 26 for connecting the sensor units 20 with the signal processing IC 25 and for transmitting the processed output signals to the outside of the bearing assembly are arranged inwardly of the annular protective covering 27 to thereby form the sensor assembly 28, which is in turn fitted to the peripheral surface of the outer member 1 in coaxial relation with the latter. Accordingly, the electronic components including the sensor units 20 can be protected from being damaged (damages caused by small stones bounced from the road surface during the travel of the automotive vehicle and/or corrosion caused by a muddy water or a salty water) and the load can therefore be accurately detected for an extended period of time. Also, wiring of the signal cables 26 and assemblage of the strain sensors 22 can be facilitated.

In describing the foregoing embodiment, reference has been made to the detection of the working force acting between the wheel tire and the road surface, but the detection may be made of not only the working force acting between the wheel tire and the road surface, but also a force (for example, a preload amount) acting on the wheel support bearing assembly.

When the detected load obtained from the sensor equipped wheel support bearing assembly of the structure described above is used in controlling the automotive vehicle, contribution can be made to a stabilized travel of the automotive vehicle. Also, when the sensor equipped wheel support bearing assembly of the structure described above is utilized, the load sensors can be neatly and smugly installed in the automotive vehicle, rendering the mass-productivity to be excellent with the cost reduced consequently.

Also, since in the embodiment described hereinabove, the sensor assembly 28 is made splittable into the two semicircular components at the circumferential center, mounting of the sensor assembly 28 on to the peripheral surface of the outer member 1 can be facilitated, accompanied by an increase of the assemblability.

Also, since in the embodiment hereinabove described, the strain generating member 21 in each of the sensor units 20 is fixed directly to the peripheral surface of the outer member 1, serving as the stationary member, by the use of the bolts 23, thereby allowing the strain generating member 21 to be fixed in position with no intervention of the molding material, the respective sensor unit 20 can be firmly fixed. In addition, an undesirable occurrence of a slip between each of the sensor units 20 and the outer member 1 serving as the stationary member is avoided and the detecting accuracy can therefore be increased correspondingly. Yet, since fixing of each of the sensor units 20 to the outer member 1 by the use of the bolts 23 allows the sensor assembly 28 to be fitted to the outer member 1 at the same time, the assemblability can be further increased. Since the throughholes or rectangular openings 30 is provided in the protective covering 27, the protective covering 27, after the sensor assembly 28 being fixed to the outer member 1, can be fixed to the outer member 1 with both the strain generating members 21 and the bolts 23 of the sensor assembly 28 held in direct contact with the outer member 1.

If the axial positions of the respective sensor units 20 fixed to the outer diametric surface of the outer member 1 serving as the stationary member differ from each other, respective strains transmitted from the outer diametric surface of the outer member 1 to the strain generating members 21 also differ from each other. In the embodiment hereinabove described, the sensor units 20 are provided at the same positions in the axial direction of the outer member 1 and, therefore, the electronic components including the plural sensor units 20 can be protected by the protective covering 27 then encircling those axial positions, thus facilitating compactization of the protective covering 27.

Also, in the embodiment described hereinabove, the sensor assembly 28 is fitted to the outer diametric surface of the outer member 1 serving as the stationary member and the cylindrically ground surface area 1b is provided over the entire circumference of the outer member 1 and those portion of the cylindrically ground surface area 1b, where the strain generating members 21 in the sensor units 20 contact, are rendered to be the flat ground surface portions 1c. Accordingly, fitting of the sensor assembly 28 to the outer member 1 can be facilitated and the assured contact between the strain generating members 21 and the outer diametric surface of the outer member 1 can be achieved.

Also, since in the embodiment hereinabove described, the strain generating member 21 in each of the sensor units 20 is made of a thin plate material of a generally rectangular shape when viewed from top as shown in FIG. 8, with its opposite side edge portions formed with the respective cutouts 21a, the strain occurring in the outer member 1 can, after having been amplified, be easily transmitted to the strain generating member 21, and such strain can be detected by the corresponding strain sensor 22 with a high sensitivity, wherefore the hysteresis occurring in the output signal of the strain sensor 22 can be reduced, making it possible to measure the load accurately. Since the shape of the strain generating member 21 can also become simplified, it can be made compact in structure and at a low cost. This equally applies even where the strain generating member 21 is in the form of a strip having a uniform width when viewed from top.

Also, since in the embodiment hereinabove described, the sensor units 20 are provided at the upper, lower, left and right surface portions of the outer diametric surface of the outer member 1 serving as the stationary member, the load can be accurately estimated even under any loading conditions. So to speak, when the load acting in a certain direction becomes large, a portion where the rolling elements 5 contact the rolling surfaces 3 and a portion where the rolling elements 5 do not contact the rolling surface 3 appear in a 180° phase difference, and therefore, positioning of the sensor units 20 in a 180° phase difference in accord with such certain direction makes it possible that the load applied to the outer member 1 through the rolling elements 5 can be necessarily transmitted to any one of those sensor units 20 and the corresponding strain sensor 22 can detect such load.

In such case, the upper and lower surface portions of the outer diametric surface of the outer member 1, where the sensor units 20 are respectively provided, are preferably so chosen as to align with points intermediate of the spacing B between the left and right radial lugs 1aa of the vehicle body fitting flange 1a which neighbor with each other across such spacing B as shown in FIG. 4. Also, the left and right surface portions of the outer diametric surface of the outer member 1, where the sensor units 20 are respectively provided, are preferably so chosen as to align with points intermediate of the spacing A between the upper and lower radial lugs 1aa of the vehicle body fitting flange 1a which neighbor with each other across such spacing A as shown in FIG. 4. When the positions where the sensor units 20 are respectively fixed are so chosen as described above, an undesirable influence, which would be brought about by a lateral slip about the knuckle bolt tending to constitute a cause of the hysteresis, can be minimized and the hysteresis occurring in the output signals of the strain sensors 22 can be correspondingly reduced, with the load consequently estimated with a high accuracy.

A second preferred embodiment of the present invention will be described in detail with particular reference to FIG. 13 to FIGS. 28A and 28B. In describing the second preferred embodiment, component parts similar to those employed in the first embodiment of the present invention shown in and described with reference to FIG. 1 to FIGS. 12A and 12B are designated by like reference numerals and, therefore, the details thereof are not reiterated for the sake of brevity. This second embodiment of the present invention is substantially similar to the previously described first embodiment thereof, but differs therefrom in that electronic component parts include a flexible substrate 35 having a wiring circuit for wiring among the sensor units 20, the signal processing IC 25 and the signal cables 26.

Figure 21A:
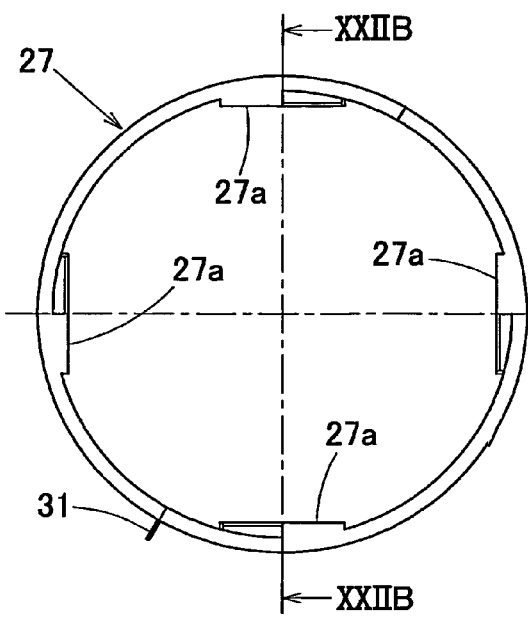
FIG. 21A is a front elevational view showing the annular protective covering.
Figure 21B:
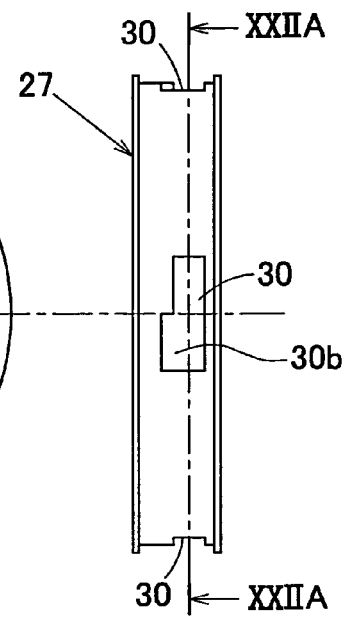
FIG. 21B is a side view showing the annular protective covering.

In the practice of this second embodiment, each of the sensor units 20 provided on the outer diametric surface of the outer member 1 serving as the stationary member, is arranged inwardly of the annular protective covering 27, best shown in FIGS. 21A and 21B respectively in front elevational and side views, together with an electronic component including a signal processing IC 25 which is an integrated circuit chip for processing an output signal of the strain sensor 22, a wiring portion 26b (FIGS. 23A and 23B) of the signal cable 26 for transmitting the processed output signal to the outside of the bearing assembly and a flexible substrate 35 having a wiring circuit 36 for wiring among the sensor unit 20, the signal processing IC 25 and the signal cable wiring portion 26b, to thereby provide an annular sensor assembly 28 best shown in FIGS. 27A and 27B in front elevational and side views.

Figures 23A, 23B:
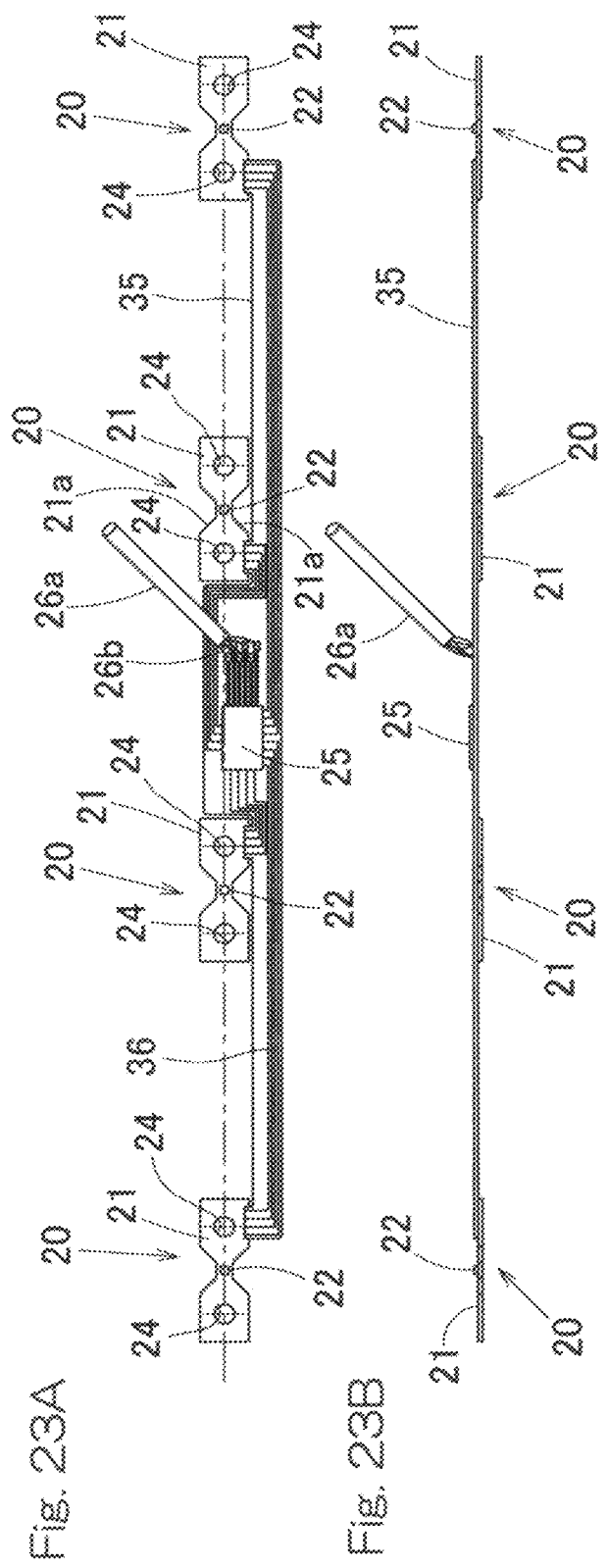
FIG. 23A is a developed plan view showing one example of arrangement of the electronic components used in the sensor assembly.
FIG. 23B is a sectional view of FIG. 23A.

FIGS. 23A and 23B illustrate the electronic components that are arranged inside the protective covering 27, in top plan developed and sectional views, respectively. In this example of arrangement of the electronic component parts, the wiring circuit 36 for wiring among each of the sensor units 20, the signal processing IC 25 and the corresponding signal cable wiring portion 26b are printed on the strip shaped flexible substrate 35 as a circuit pattern, with the signal processing IC 25 fitted directly to this flexible substrate 35. The sensor unit 20 and the signal processing IC 25 are connected with the wiring circuit 36 and the lead-out line 26a for drawing the signal cable 26 towards the vehicle body structure is connected with the signal cable wiring portion 26 by means of, for example, soldering. The respective sensor unit 20 is separated from the flexible substrate 35 except for the junction with the wiring circuit 36 of the flexible substrate 35.

Also, the flexible substrate 35 is of a structure having a large width portion at a site of installation of the signal processing IC 25 and narrow width portions at other sites than the site of installation of the signal processing IC 25, with the sensor units 20 disposed on a side portion of each of the narrow width portions of the flexible substrate 35, so that the entire structure of arrangement will not have an increased width. Accordingly, the sensor assembly 28 can be constructed compact in structure.

Each of the sensor units 20 is of a design in which one of opposite surfaces of the corresponding strain generating member 21 opposite to the surface thereof held in contact with the outer member 1 is used as a circuit printed surface, and is fitted to the flexible substrate 35 referred to above with the circuit printed surface confronting a printed surface of the wiring circuit 36 of the flexible substrate 35. Accordingly, the surface of each of the sensor units 20 that is held in tight contact with the outer member 1 forms a flat surface where none of the circuit printed surface and solder deposits exist, allowing the respective sensor units 20 to be fitted to the outer member 1 in tight contact therewith.

The flexible substrate 35 is arranged in the circumferential direction along an outer diametric side groove 29A defined in the protective covering 27. Since the flexible substrate 35 extends along the outer diametric side groove 29A in the annular protective covering 27 as described above, a base material for the flexible substrate 35 is preferred to be polyimide. Selection of polyimide as the base material for the flexible substrate 35 allows the flexible substrate 35 to have a sufficient flexibility and a sufficient heat resistance and, therefore, it can be easily curved to follow the curvature of the outer diametric side groove 29A in the circumferential direction of the protective covering 27. The signal cable lead-out line 26a is drawn outwardly from one location on the protective covering 27 to the outside of the protective covering 27.

Figure 22A:
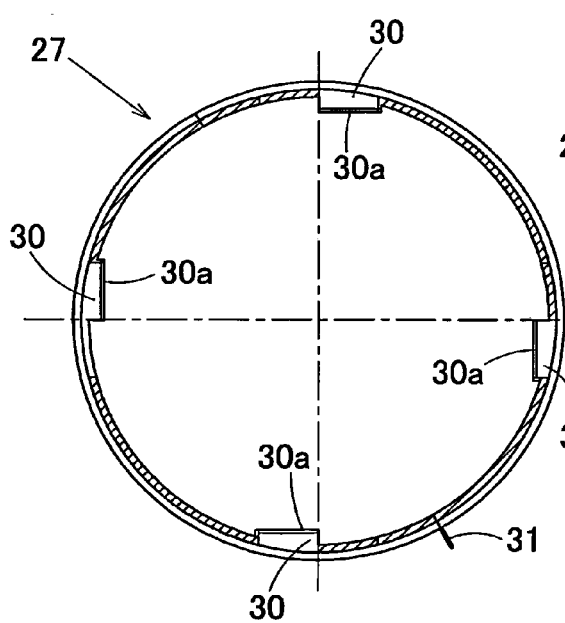
FIG. 22A is a cross sectional view taken along the line XXIIA-XXIIA in FIG. 21B.
Figure 22B:
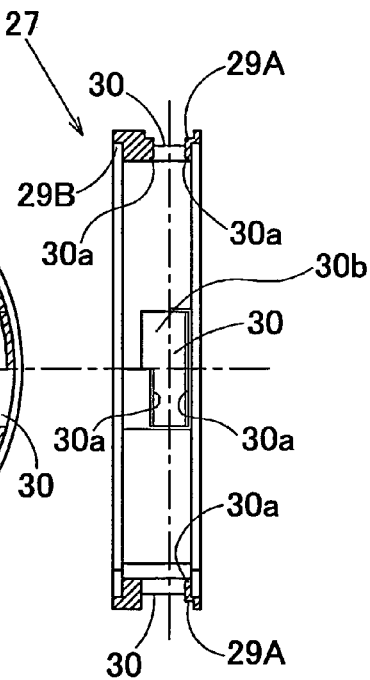
FIG. 22B is a cross sectional view taken along the line XXIIB-XXIIB in FIG. 21A.

The protective covering 27 is so formed as shown in FIGS. 22A and 22B showing respective cross sections taken along the lines XXIIA-XXIIA in FIG. 21B and XXIIB-XXIIB in FIG. 21A. FIGS. 21A and 21B and FIGS. 22A and 22B correspond to FIGS. 6A and 6B and FIGS. 7A and 7B associated with the previously described first embodiment of the present invention, respectively, and, therefore, component parts similar to those shown therein are designated by like reference numeral with the details thereof consequently not reiterated for the sake of brevity. In particular, however, each of the openings 30 in the protective covering 27 employed in the practice of the second embodiment now under discussion is of a generally oblong shape extending in the direction circumferentially of the protective covering 27 and one of halves thereof is, by the reason which will be described later, formed in the large width portion 30b. Other structural features than those described above are similar to those in the previously described first embodiment and, as shown in FIGS. 28A and 28B showing respective cross sections taken along the lines XXVIIIA-XXVIIIA in FIG. 27B and XXVIIIB-XXVIIIB in FIG. 27A, each of the sensor units 20 is arranged in alignment with the corresponding opening 30 in the protective covering 27 with the associated strain generating member 21 exposed radially inwardly of the protective covering 27.

Since there is a step between the flexible substrate 35, disposed inside the outer diametric groove 29A of the protective covering 27, and each of the sensor units 20 disposed radially inwardly of the protective covering 27, the junctions in the flexible substrate 35 with the sensor units 20, is bent to represent a shape similar to the figure "S" when viewed in section as shown in FIG. 28B. Since each of the sensor units 20 is separated from the flexible substrate 35 except for the junction of it with the wiring circuit 36 of the flexible substrate 35, a strain resulting from a bending force of the flexible substrate 35 will hardly occur in the sensor unit 20 even when the sensor unit 20, after the wiring has been made, is fitted to the outer diametric surface of the outer member 1 serving as the stationary member. Accordingly, the initial offset at the time of the sensor fitting is relieved to allow the load to be accurately detected.

Also, when the sensor units 20 are to be disposed on the inner diametric side of the protective covering 27, the junctions in the flexible substrate 35 with the sensor units 20 are aligned with the large width portions 30b of the respective openings 30 of the protective covering 27 as best shown in FIG. 27B. Accordingly, the junctions in the flexible substrate 35 with the sensor units 20 can be bent easily.

FIG. 24A illustrates a developed plan view showing another example or second example of arrangement of the electronic components used in the sensor assembly and FIG. 24B is a cross sectional view taken along the line XXIVB-XXIVB in FIG. 24A. In this second example of arrangement of the electronic components, all of the sensor units 20, the signal processing IC 25 and the signal cable wiring portion 26b are mounted on the flexible substrate 35. Even in this case, each of the sensor units 20 is of a design in which one of the opposite surfaces of the respective strain generating members 21, which is opposite to the surface held in contact with the outer member 1, is rendered to be a circuit printed surface, and is fitted to the flexible substrate 35 with the circuit printed surface confronting a printed surface of the wiring circuit 36 of the flexible substrate 35. In this second example, a strip-shaped opening 35a extending in a direction lengthwise of the flexible substrate 35 is formed in a portion of the flexible substrate 35 which are aligned with opposite sides of each of the sensor unit 20 at the site of disposition of such sensor unit 20. This flexible substrate 35 is also formed with bolt insertion holes 35b at respective locations alignable with the insertion holes 24 for the bolts 23 (FIG. 14) used to secure the sensor units 20 to the outer diametric surface of the outer member 1.

Accordingly, when the strip-shaped openings 35a are formed in the respective portions of the flexible substrate 35, which are aligned with the opposite sides of the sensor units 20 at the sites of disposition of such sensor units 20 as hereinabove described, it is possible to avoid the possibility that the deformation of the strain generating member 21 in each of the sensor units 20 may be restricted by the flexible substrate 35, allowing the load detecting accuracy to be increased correspondingly.

Other structural features than those described above are similar to those in the first mentioned example of arrangement of the electronic components shown in and described with particular reference to FIGS. 23A and 23B.

FIGS. 25A and 25B illustrate developed plan and sectional views showing a third example of arrangement of the electronic components used in the sensor assembly. Even in this third example of arrangement of the electronic components, the sensor units 20, the signal processing IC 25 and the signal cable wiring portion 26b are all fitted to the flexible substrate 35. Even in this case, each of the sensor units 20 is of a design in which one of the opposite surfaces of the respective strain generating members 21, which is opposite to the surface held in contact with the outer member 1, is rendered to be a circuit printed surface, and is fitted to the flexible substrate 35 with the circuit printed surface confronting a printed surface of the wiring circuit 36 of the flexible substrate 35. In this third example, however, a square-shaped opening 35c, through which allows the respective sensor unit 20 in its entirety to be exposed to the outside, is formed in a portion of the flexible substrate 35 aligned with the site of disposition of the associated sensor unit 20.

When the oblong openings 35c are formed in the respective junctions in the flexible substrate 35 with the sensor units 20, so that the sensor units 20 in their entirety can be exposed to the outside through such oblong openings 35c, it is possible to avoid the possibility that the deformation of the strain generating member 21 in each of the sensor units 20 may be restricted by the flexible substrate 35, allowing the load detecting accuracy to be increased correspondingly.

Other structural features than those described above are similar to those in the first mentioned example of arrangement of the electronic components shown in and described with particular reference to FIGS. 23A and 23B.

FIGS. 26A and 26B illustrate developed plan and sectional views showing a fourth example of arrangement of the electronic components used in the sensor assembly. In this fourth example of arrangement of the electronic components, the sensor units 20 are separated from the flexible substrate 35 except for the junctions with the wiring circuit 36 in the flexible substrate 35, as is the case with the example of arrangement of the electronic components shown in and described with particular reference to FIGS. 23A and 23B. In this fourth example, the flexible substrate 35 is of a stripe shape having the same uniform width and each of the sensor units 20 is disposed on one side of the flexible substrate 35 along a longitudinal direction of the flexible substrate 35. Other structural features than those described above are similar to those in the first mentioned example of arrangement of the electronic components shown in and described with particular reference to FIGS. 23A and 23B.

Figure 17A:
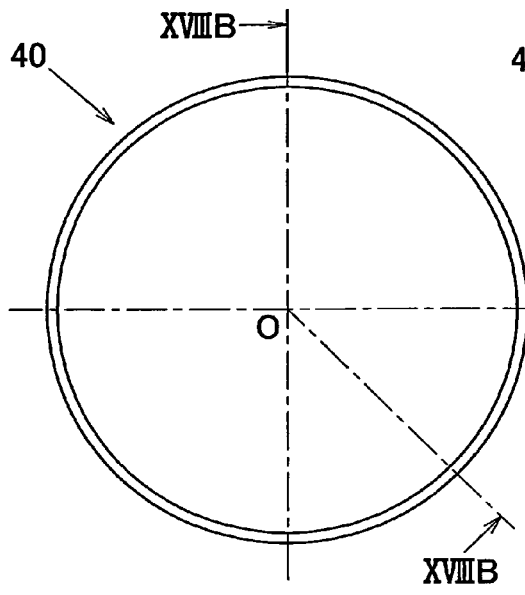
FIG. 17A is a front elevational view showing a sealing member.
Figure 17B:
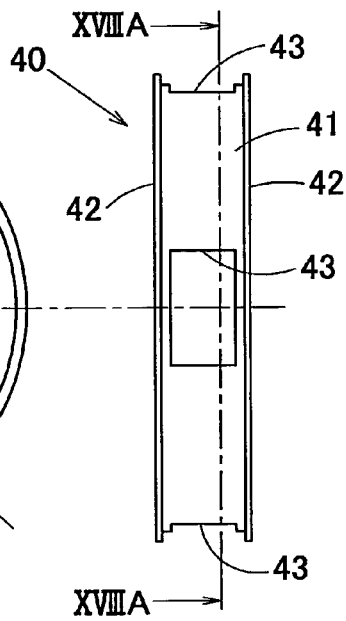
FIG. 17B is a side view showing the sealing member.
Figure 18A:
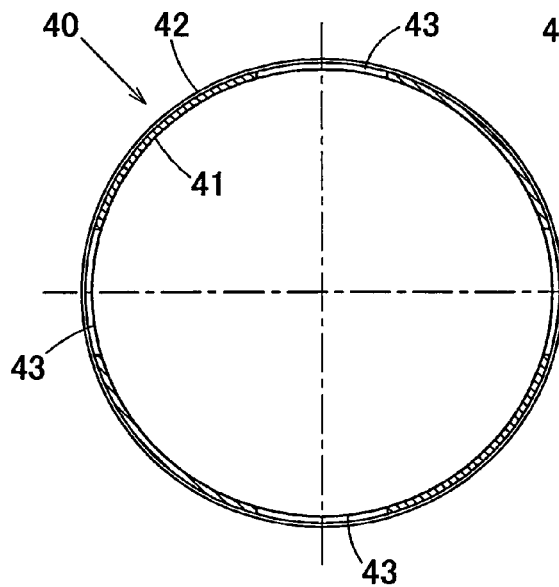
FIG. 18A is a cross sectional view taken along the line XVIIIA-XVIIIA in FIG. 17B.
Figure 18B:
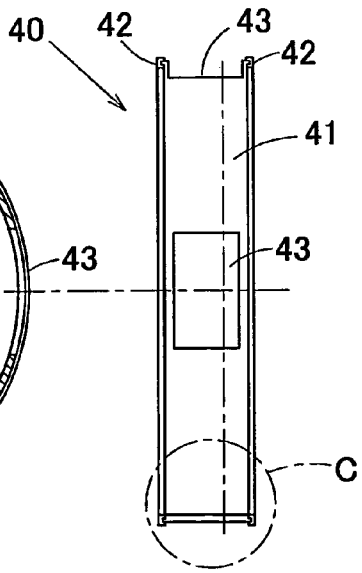
FIG. 18B is a cross sectional view taken along the line XVIIIB-XVIIIB in FIG. 17A.

The annular sensor assembly 28 is fitted to the outer diametric surface of the outer member 1, serving as the stationary member of the bearing assembly, through a sealing member 40, in a coaxial fashion with the outer member 1. FIGS. 17A and 17B illustrate front elevational and side views, respectively, showing the sealing member 40. As shown in FIGS. 18A and 18B showing respective cross sections taken along the lines XVIIIA-XVIIIA in FIG. 17B and XVIIIB-XVIIIB in FIG. 17A, the sealing member 40 is made up of a ring shaped core metal 41 following the curvature of the inner diametric surface of the protective covering 27, and a pair of ring shaped elastic segments 42 jointed to the entire circumferences of opposite side edges of the core metal 41 so as to range from an inner diametric surface thereof to the outer diametric surface thereof Circumferential portions of the sealing member 40, which confront the sites of disposition of the associated sensor units 20 in the sensor assembly 28, are provided with respective sensor unit exposing openings 43 each open across radially thereof.

Accordingly, each of the sensor units 20 can be caused to contact the outer diametric surface of the outer member 1 through the associated sensor unit exposing opening 43 in the sealing member 40 while the sensor assembly 28 is fitted to the outer diametric surface of the outer member 1 through the sealing member 40.

Figure 19:
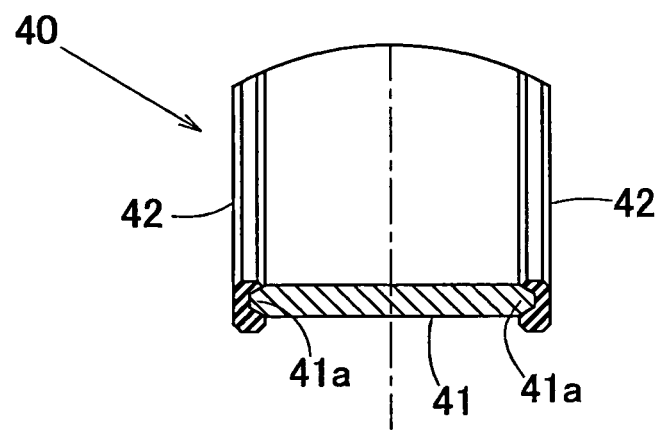
FIG. 19 is a fragmentary enlarged sectional view showing one example of the sealing member.

The core metal 41 of the sealing member 40 is formed by means of any known press work with the use of a corrosion resistant steel material, and, as best shown in FIG. 19 showing a portion of C in FIG. 18B on an enlarged scale, showing each the opposite side edges thereof, where the ring shaped elastic segments 42 are jointed, is rendered to be a chamfered portion 41a which has its inner diametric surface having a diameter shrunk to vary in a direction widthwise or axial direction inwardly thereof and also has its outer diametric surface having a diameter shrunk to vary in a direction widthwise inwardly thereof. When such a jointing structure as hereinabove described is used, the ring shaped elastic segments 42 can be assuredly jointed to the opposite side edges of the core metal 1 without any bonding material employed. The sealing member 40 referred to above is press fitted onto and, hence, fixed to the outer diametric surface of the outer member 1 in a condition prior to it being assembled into the bearing assembly.

Figure 15:
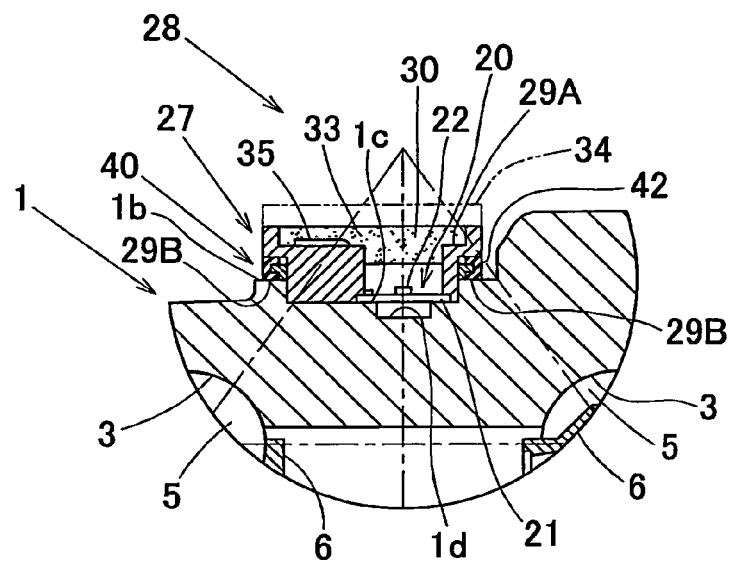
FIG. 15 is an enlarged sectional view of the outer member showing a portion other than a junction between a sensor unit and a wiring circuit on a flexible substrate.
Figure 16:
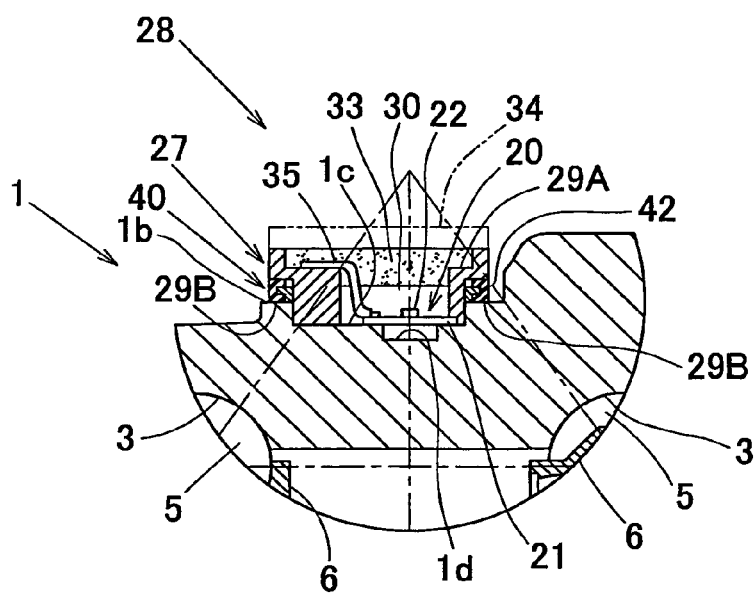
FIG. 16 is an enlarged sectional view of the outer member showing the junction between the sensor unit and the wiring circuit on the flexible substrate.

Also, opposite side portions of the inner diametric surface of the protective covering 27 for the annular sensor assembly 28 referred to above are formed with respective inner diametric side grooves 29B with which the ring shaped elastic segments 42 of the sealing member 40 are held in tight contact as best shown in FIGS. 15 and 16. As is the case with the previously described first embodiment, the annular sensor assembly 28 is of a type capable of being split into the two components at the circumferential center thereof as shown in FIGS. 11A and 11B. Accordingly, after the sealing member 40 has been press fitted onto the outer diametric surface of the outer member 1, the sensor assembly 28 can be fitted in a fashion overlapping the sealing member 40 when the sensor assembly 28 is fully opened to set the clearance W thereof to the maximum value.

Figure 20:
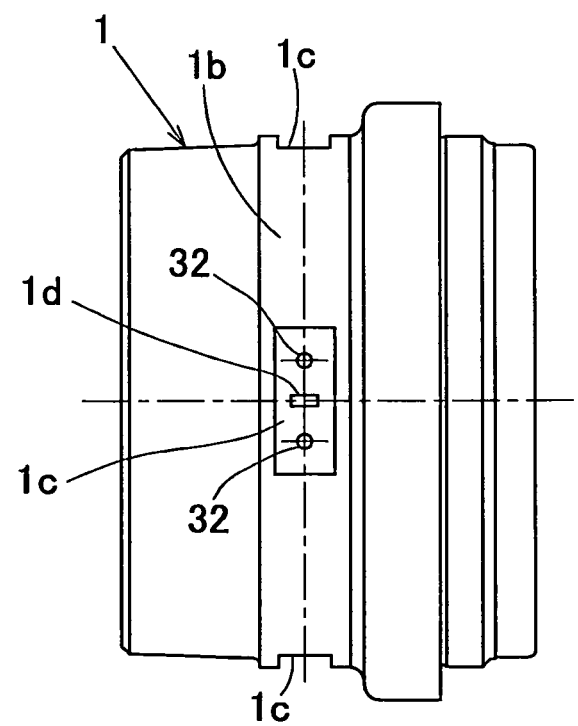
FIG. 20 is a side view showing the outer member.

The axial position, where the sensor assembly 28 is fitted to the outer diametric surface of the outer member 1, is provided with a cylindrically ground surface area 1b as shown in FIG. 20, as is the case with that in the previously described first embodiment, and four portions of the cylindrically ground surface area 1b, where the strain generating members 21 of the respective sensor units 20 contact, are each formed with a flat ground surface portion 1c. Accordingly, each of the strain generating members 21 in the sensor units 20 can be assuredly held in contact with the respective flat ground surface portion 1c. Also, each of those flat ground surface portions 1c is provided with internally threaded screw holes 32 in alignment with the respective bolt insertion holes 24 in the strain generating member 21. Accordingly, after the sensor assembly 28 has been assembled to the cylindrically ground surface area 1b through the sealing member 40, the bolts 23 having been passed through the bolt insertion holes 24 (FIGS. 23A and 23B) in each of the strain generating members 21, as shown in FIG. 14, are threaded into the corresponding screw holes 32 so that the respective sensor unit 20 can be directly fixed to the outer diametric surface of the outer member 1 and, at the same time, the sensor assembly 28 as a whole can be fixed in position.

The portion of the outer member 1 where the sensor assembly 28 is fitted in the outer member 1 is shown on an enlarged scale in FIGS. 15 and 16. As shown therein, after in an assembled condition, in which the outer member 1 has been assembled into the bearing assembly, the sensor assembly 28 has been fitted to the outer diametric surface of the outer member 1 through the sealing member 40, those portions of the electronic components (the sensor units 20, the signal processing IC 25, the signal cable wiring portion 26b and the flexible substrate 35) in the sensor assembly 28, which portions are exposed from the protective covering 27, are sealed by means of the secondary molding with the molding material 33. More specifically, the molding material 33 is filled in the outer diametric side groove 29A of the protective covering 27 over the entire circumference thereof to thereby seal those exposed portions of the electronic components.

It is to be noted that FIG. 15 illustrates an enlarged sectional view of that portion of each of the sensor units 20, which is not connected with the wiring circuit 36 of the flexible substrate 35, whereas FIG. 16 illustrates an enlarged sectional view of that portion of each of the sensor units 20 which is connected with the wiring circuit 36 of the flexible substrate 35, both of which views are taken in a direction transverse to the circumference of the outer member 1.

Even the wheel support bearing assembly of the structure designed according to the second embodiment as hereinabove described functions in a manner basically similar to that according to the previously described first embodiment and brings about effects similar to those afforded by that according to the previously described first embodiment.

In addition, in the practice of the second embodiment, the electronic components including the plurality of the sensor units 20, the signal processing IC 25 for processing the respective sensor output signals of the sensor units 20, the signal cable wiring portion 26b through which the processed sensor output signal is fed to the outside of the bearing assembly, and the flexible substrate 35 having the wiring circuit 36 for wiring among the sensor units 20, the signal processing IC 25 and the signal cable wiring portion 26b, are arranged inwardly of the annular protective covering 27 to provide the annular sensor assembly 28 and this sensor assembly 28 is fitted to the outer diametric surface of the outer member 1 serving as the stationary member in a fashion coaxial with the outer member 1. Accordingly, through a simplified wiring treatment, the electronic components including the sensor units 20 can be protected from being damaged (damages caused by small stones bounced from the road surface during the travel of the automotive vehicle and/or corrosion caused by a muddy water or a salty water) under the influence of the ambient environment, so that troubles occurring in the electronic components such as, for example, the sensors by the influence of the ambient environment can be avoided, and the load acting on the wheel support bearing assembly or the tire thread surface can therefore be accurately detected for an extended period of time.

Also, since the sensor units 20, the signal processing IC 25 and the signal cable wiring portion 26b are electrically wired with each other by means of the wiring circuit 36 on the flexible substrate 35, the number of component parts used can be reduced so that the cost can also be reduced and the weight can then be reduced. Yet, since the wiring can be automated, the number of wiring steps, erroneous wiring and possible damages to the electronic components caused by the wiring can be reduced.

Also, since the flexible substrate 35 is flexible enough to be bendable, the sensor assembly 28 can be fitted to the outer diametric surface of the outer member 1, serving as the stationary member of the assembled bearing assembly, so as to follow the curvature of such outer diametric surface even after the electronic components have been unitized, i.e., formed into a unitary structure. In other words, since there is no need to assemble the bearing assembly after the sensor assembly 28 is fitted to the outer member 1 while the latter is an independent component, existing production facilities currently used can be employed with no alteration made therein, for the production of the sensor equipped wheel support bearing assembly according to this second embodiment. As a result, the sensor equipped wheel support bearing assembly which is inexpensive and highly reliable can be obtained.

Since in the second embodiment hereinabove described, the sensor units 20 are fitted to the flexible substrate 35 with the circuit printed surface thereof held in face-to-face relation with the printed surface of the wiring circuit 36 of the flexible substrate 35, the surface of each of the sensor units 20, which is held in contact with the outer member 1 serving as the stationary member, is free from any step, which would otherwise be created by the solder deposits and/or printed circuit surfaces, and can therefore be fitted to the outer member 1 in tight contact therewith.

Also, since in the second embodiment hereinabove described, polyimide is chosen as the base material for the flexible substrate 35, the flexible substrate 35 can have a sufficient flexibility and a sufficient heat resistance.

Referring now to FIG. 29 to FIGS. 39A and 39B, a third preferred embodiment of the present invention will be described in detail. In describing the third embodiment hereinafter, component parts similar to those shown and described in connection with the previously described first embodiment are designated by like reference numerals and, therefore, the details thereof are not reiterated. In any event, however, this third embodiment is similar to the previously described first embodiment, but differs therefrom in that the sensor assembly 28 is fitted to the peripheral surface of the stationary member through the sealing member 40 in a fashion coaxial with the stationary member.

FIGS. 35A and 35B and FIGS. 36A and 36B correspond respectively to FIGS. 6A and 6B and FIGS. 7A and 7B both pertaining to the previously described first embodiment and FIGS. 38A and 38B and FIGS. 39A and 39B correspond respectively to FIGS. 9A and 9B and FIGS. 10A and 10B both pertaining to the previously described first embodiment, and, therefore, the details thereof are not reiterated. In those figures, the outer diametric side groove 29A defined in the outer diametric surface of the annular protective covering 27 so as to extend in a direction circumferentially of the latter corresponds to the groove 29 employed and described in connection with the previously described first embodiment.

Figure 33A:
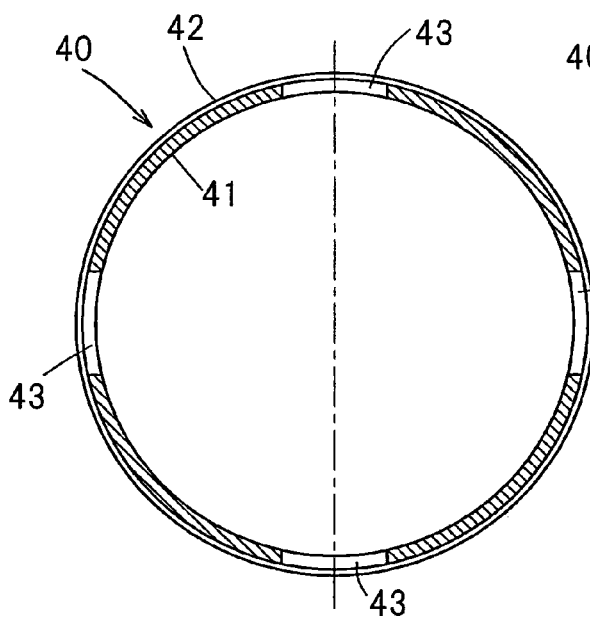
FIG. 33A is a cross sectional view taken along the line XXXIIIA-XXXIIIA in FIG. 32B.
Figure 33B:
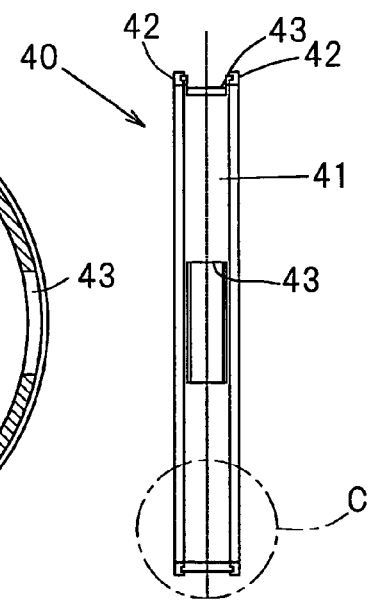
FIG. 33B is a cross sectional view taken along the line XXXIIIB-XXXIIIB in FIG. 32A.

The annular sensor assembly 28 shown in FIGS. 38A and 38B and FIGS. 39A and 39B is fitted to the outer diametric surface of the outer member 1, serving as the stationary member of the bearing assembly, through the sealing member 40 in a fashion coaxial with the outer member 1. As best shown in FIGS. 33A and 33B showing the cross sections taken along the lines XXXIIIA-XXXIIIA in FIG. 32B and XXXIIIB-XXXIIIB in FIG. 32A, respectively, the sealing member 40 is made up of an annular, that is, ring shaped core metal 41 following the inner diametric surface of the protective covering 27 and a pair of annular, that is, ring shaped elastic segments 42 jointed to the opposite side edges of the core metal 41 from the inner diametric surface thereof to the outer diametric surface over the entire circumferences thereof. Circumferential locations of this sealing member 40, which confront the respective sites of installation of the sensor units 20, are provided with oblong sensor unit exposing openings 43 that extend completely in the radial direction. Accordingly, in a condition in which the sensor assembly 28 is fitted to the outer diametric surface of the outer member 1 through the sealing member 40, the sensor units 20 can be contacted with the outer diametric surface of the outer member 1 through the sensor unit exposing opening 43 in the sealing member 40.

Figure 34A:
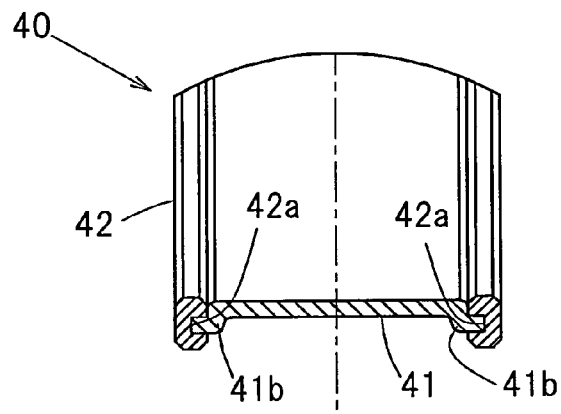
FIG. 34A is a fragmentary enlarged sectional view showing one example of the sealing member.

The core metal 41 of the sealing member 40 is formed by means of any known press work with the use of a corrosion resistant steel material, and, as best shown in, for example, FIG. 34A showing a portion of C in FIG. 33B on an enlarged scale, each the opposite side edges thereof, where the ring shaped elastic segments 42 are jointed, is rendered to be a diametrically expanded bent portion 41b having its diameter expanded radially outwardly. More specifically, the diametrically expanded bent portion 41b is made up of an upright piece portion extending towards an outer diametric side and a cylindrical portion extending from a tip of the upright piece portion in a direction widthwise outwardly. Each of the ring shaped elastic segments 42 is rendered to have a generally U-sectioned configuration having a grooved portion 42a in an inwardly oriented side face so as to extend in a circumferential direction, and the ring shaped elastic segments 42 are jointed to the opposite side edges of the core metal 41 with the diametrically expanded bent portion 41b of the core metal 41 press fitted into the respective grooved portions 42a. When such a jointing structure as hereinabove described is used, the ring shaped elastic segments 42 can be assuredly jointed to the opposite side edges of the core metal 41 without any bonding material employed. Also, the elastic segments 42 are positioned in contact with the upright piece portions of the diametrically expanded bent portion 41b.

Figure 34B:
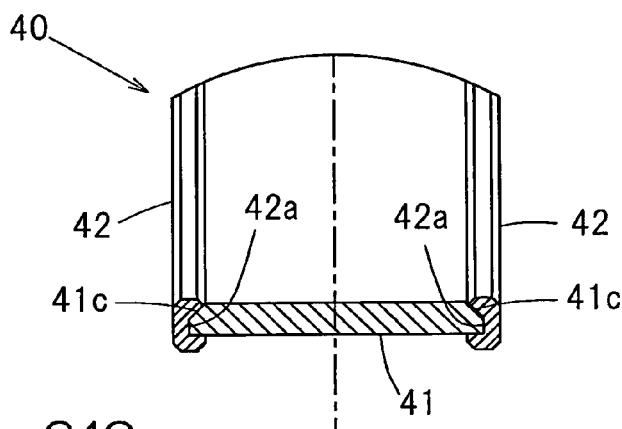
FIG. 34B is a fragmentary enlarged sectional view showing another example of the sealing member.
Figure 34C:
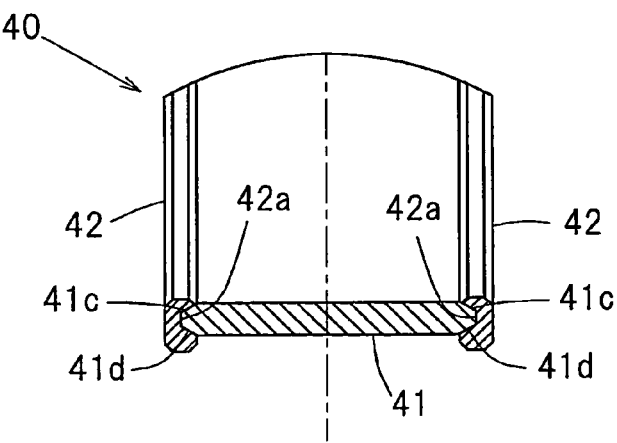
FIG. 34C is a fragmentary enlarged sectional view showing a further example of the sealing member.

Other than that described above, the opposite side edges of the core metal 41, which will become respective elastic segment jointing portions, may have such a sectional shape of a tip as to represent a chamfered portion 41c having its inner diametric face of a diameter reducing in a direction widthwise inwardly thereof as best shown in FIG. 34B. Alternatively, as best shown in FIG. 34C, it may have such a sectional shape of the tip as to represent a combination of a chamfered portion 41c, having its inner diametric face of a diameter reducing in a direction widthwise inwardly, and a chamfered portion 41d having its outer diametric face of a diameter expanding in a direction widthwise inwardly. Even when the opposite side edges of the core metal 41 are so shaped as hereinabove described, the ring shaped elastic segments 42 can be easily and assuredly jointed to the opposite side edges of the core metal 41 by press-fitting the groove portions 42a of the annular elastic segments 42 onto the chamfered portions 41c or chamfered portions 41c, 41d of the core metal 41 without any bonding material employed. Also, where the chamfered portions 41c, or the chamfered portions 41c and 41d is/are provided, it is possible to avoid an undesirable excessive increase in thickness of each of the elastic segments 42 while each of the elastic segments 42 is so structured as to wrap around inner and outer diametric sides of the core metal 41. Also, since due to the use of the chamfered portion 41c or the chamfered portions 41c and 41d, the tip of each of the side edges of the core metal 41 is narrowed, a job of mounting can be easily performed when the elastic segment 42 with the grooved portion 42a or the like is mounted on the corresponding side edge of the core metal 41 by means of press fitting.

The sealing member 40 referred to above can be press fitted onto and fixed to the outer diametric surface of the outer member 1 of the bearing assembly prior the mount of the annular sensor assembly 28.

Figure 30:
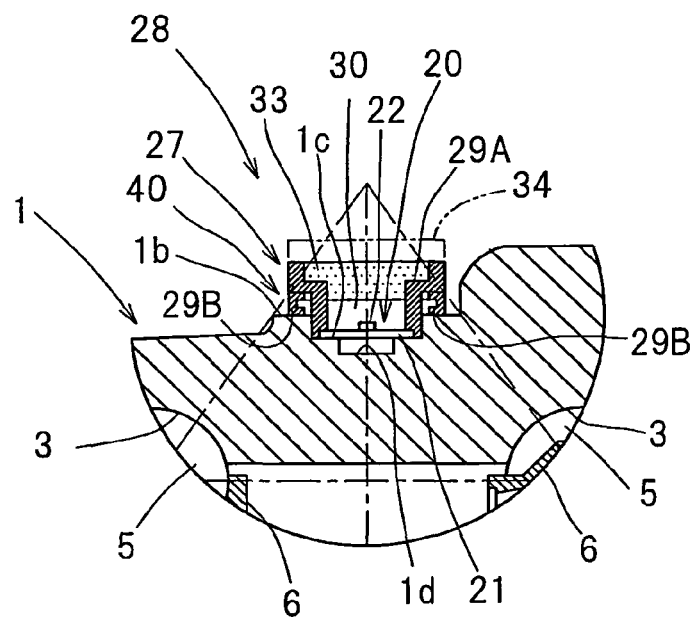
FIG. 30 is an enlarged sectional view showing a circumferential position, where the sensor unit at the axial position, where the sensor assembly is installed in the outer member, is arranged.
Figure 37:
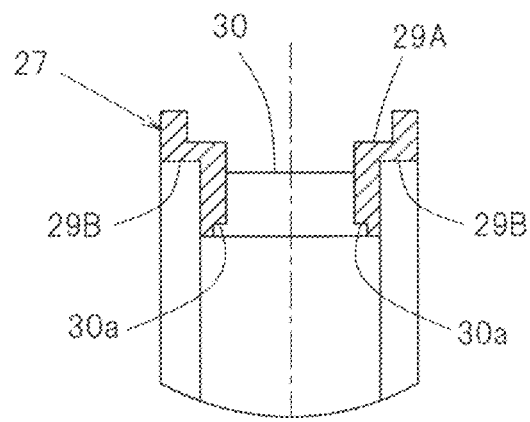
FIG. 37 is a fragmentary enlarged sectional view showing the protective covering.
Figure 38A:
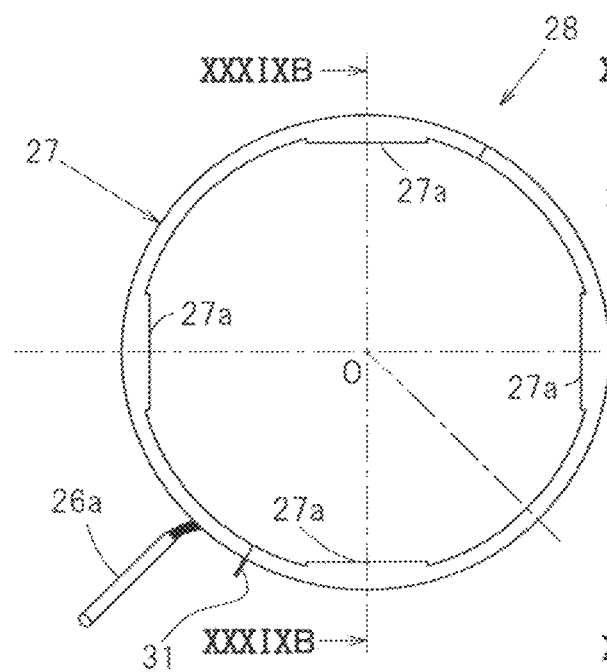
FIG. 38A is a front elevational view showing the sensor assembly.
Figure 38B:
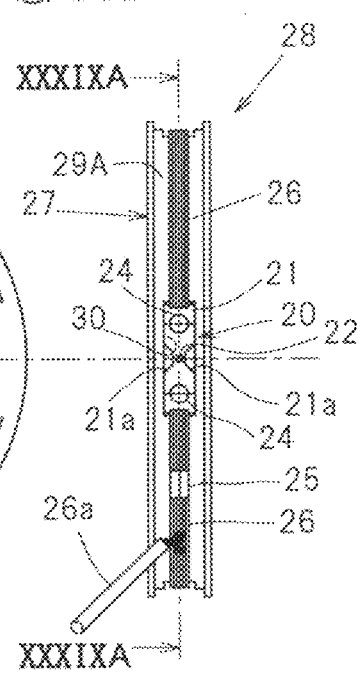
FIG. 38B is a side view showing the sensor assembly shown in FIG. 38A.

Also, opposite side portions of the inner diametric surface of the protective covering 27 for the annular sensor assembly 28 shown in FIG. 30 are formed, as shown in FIG. 37, with respective inner diametric side grooves 29B with which the ring shaped elastic segments 42 of the sealing member 40 are held in tight contact. The annular sensor assembly 28 is rendered to be splittable at the circumferential center thereof into the two components as is the case with that shown and described in connection with the first embodiment with reference to FIGS. 11A and 11B. Other structural features than those described above and the function are similar to those in the previously described first embodiment and, therefore, the details thereof are not reiterated.

Figure 29:
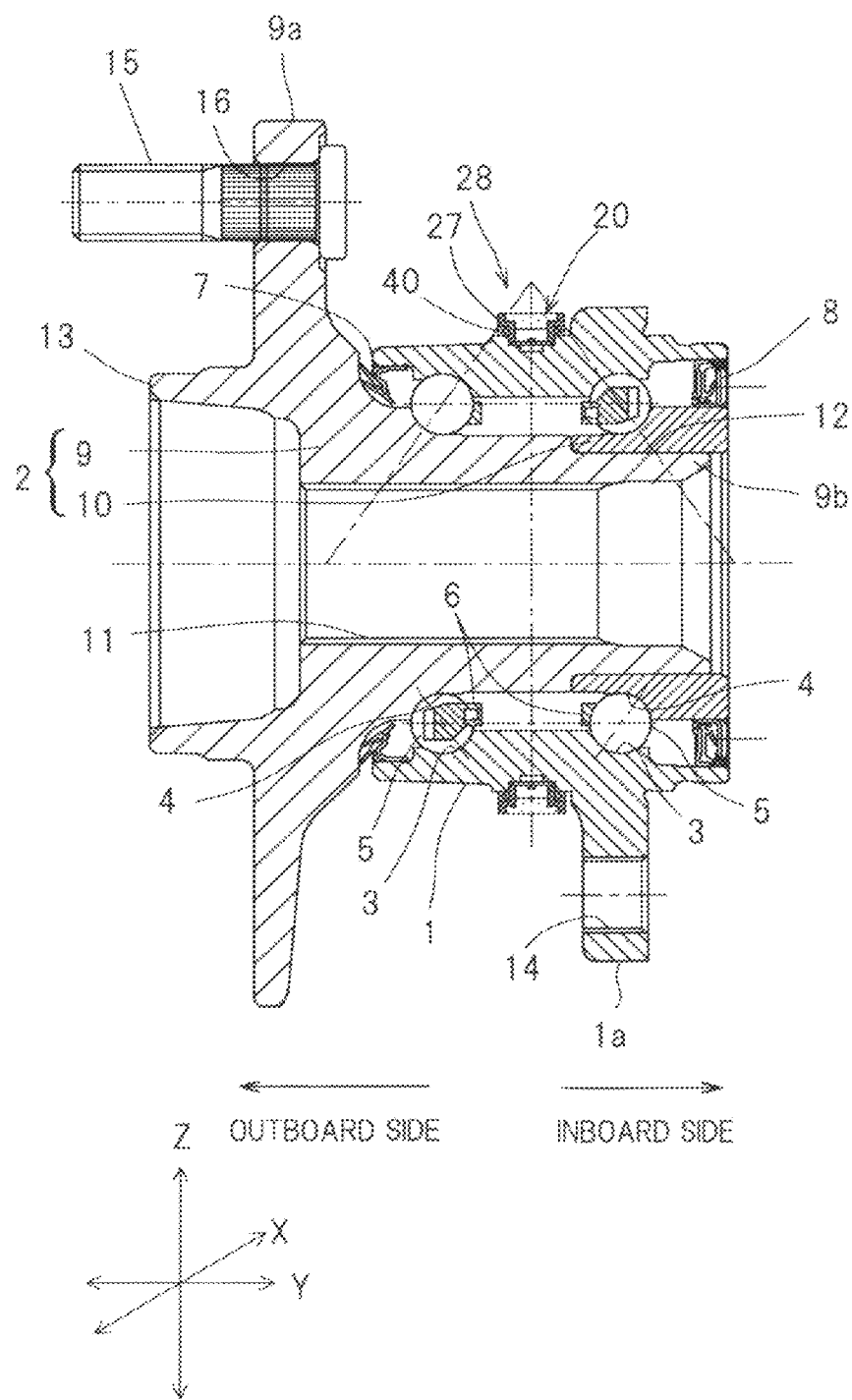
FIG. 29 is a sectional view showing the sensor equipped wheel support bearing assembly according to a third preferred embodiment of the present invention.

Referring to FIG. 29, the axial location where the sensor assembly 28 is fitted to the outer diametric surface of the outer member 1, is formed with a cylindrically ground surface area 1b over the entire circumference as shown in FIG. 20 as is the case with that in the previously described second embodiment, and the description made in connection with the second embodiment equally applies. Accordingly, the details thereof are not reiterated for the sake of brevity.

Figure 31:
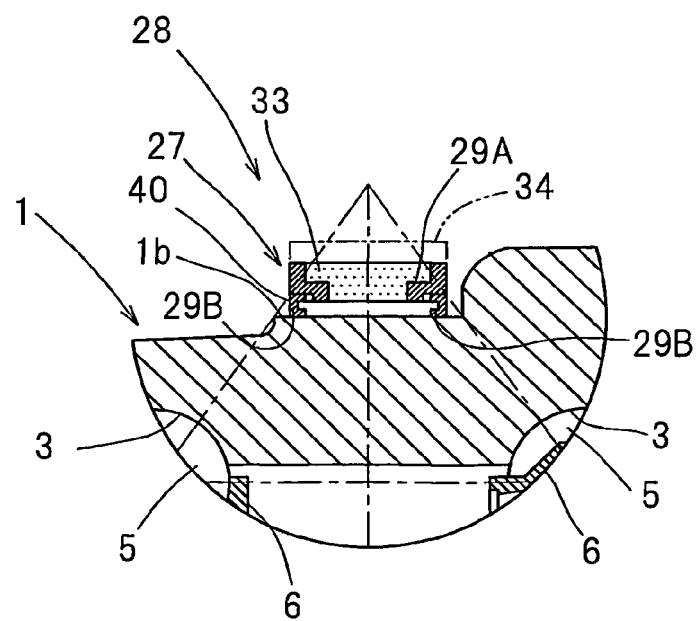
FIG. 31 is an enlarged sectional view showing the circumferential position, where the sensor unit at the axial position, where the sensor assembly is installed in the outer member, is not arranged.
Figure 32A:
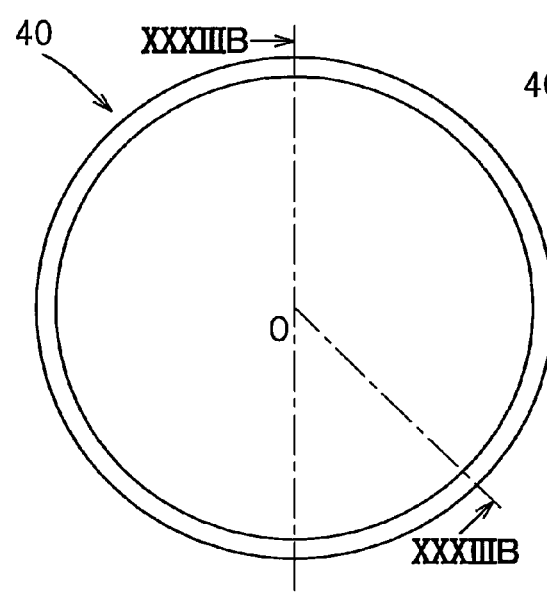
FIG. 32A is a front elevational view showing the sealing member.
Figure 32B:
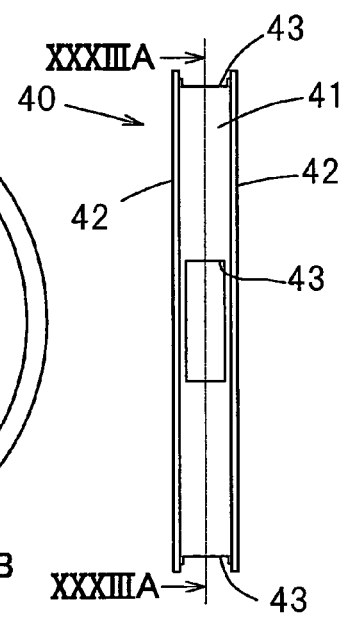
FIG. 32B is a side view of FIG. 32A.

The portion of the outer member 1 to which the sensor assembly 28 is fitted as shown in FIG. 29 is shown on an enlarged scale in FIGS. 30 and 31. As shown therein, after the sensor assembly 28 has been fitted to the outer diametric surface of the outer member 1 through the sealing member 40, those exposed portions of the electronic components (the sensor units 20, the signal processing IC 25 and the signal cable 26) in the sensor assembly 28 are sealed with the molding material 33. More specifically, the molding material 33 is filled in the outer diametric side groove 29A of the protective covering 27 over the entire circumference thereof to seal the exposed portions of the electronic components.

It is to be noted that FIG. 30 illustrates an enlarged sectional view of the site of installation of the sensor unit 20, whereas FIG. 31 illustrates an enlarged sectional view of the site, where the sensor unit 20 is not installed, both of which views are taken in a direction transverse to the circumference of the outer member 1.

In sealing those exposed portions of the electronic components as discussed above, instead of the use of the molding material 33 referred to above, a ring shaped outer covering member 34 comprised of two semicircular split pieces 34A and 34B as shown in FIGS. 12A and 12B may be fixedly bonded to an outer diametric surface of the sensor assembly 28, as shown by the double dotted line in FIGS. 30 and 31, after a bonding material or a sealing material has been filled in the outer diametric side groove 29A in the protective covering 27 in a manner similar to that previously described in connection with the first embodiment.

The operation of the construction described above will now be described. The operation is basically similar to that of the previously described first embodiment and the details thereof are not therefore reiterated. In the case of this construction, the electronic components including the plural sensor units 20, the signal processing IC 25 for processing the respective output signals of the strain sensors 22 in those sensor units 20 and the signal cable 26 for transmitting the processed output signal to the outside of the bearing assembly are arranged inside the annular protective covering 27 to provide the annular sensor assembly 28, which is in turn fitted to the peripheral surface of the outer member 1 through the sealing member 40 in a fashion coaxial with the outer member 1. Accordingly, the electronic components including the sensor units 20 can be protected from being damaged (damages caused by small stones bounced from the road surface during the travel of the automotive vehicle and/or corrosion caused by a muddy water or a salty water) under the influence of the ambient environment, allowing the load to be accurately detected for an extended period of time.

In particular since the sensor assembly 28 is fitted to the peripheral surface of the outer member 1 through the sealing member 40, damages to the electronic components such as, for example, the strain sensors 22 under the influence of the ambient environment can be assuredly avoided even under the condition in which the protective covering 27 is unable to follow the deformation of the outer member 1.

In this third embodiment described above, the sealing member 40 is made up of the ring shaped core metal 41 following the inner diametric surface of the protective covering 27 and the pair of the ring shaped elastic segments 42 jointed to the entire circumferences of opposite side edges of the core metal 41 so as to range from an inner diametric surface thereof to the outer diametric surface thereof. Accordingly, the elastic segments 42 on the opposite side edges of the sealing member 40 are sandwiched between the outer diametric surface of the outer member 1 and the inner diametric surface of the protective covering 27 to thereby completely shield the interior of the protective covering 27 from the outside, and therefore, the sealing effect brought about by the sealing member 40 can be increased.

Also, since in this third embodiment described above, the core metal 41 of the sealing member 40 is in the form of a product prepared by means of any known press work with the use of a corrosion resistant steel material, it is possible to impart a sufficient resistance to the load to the sealing member 40 as well as to prevent an undesirable corrosion of the sealing member 40 caused by a muddy water or a salty water from the outside. As a result, it is possible to assuredly prevent the electronic components such as, for example, the sensor units 20 under the influence of the ambient environment from being damaged.

Moreover, since in this third embodiment described above, the inner diametric surface of the protective covering 27 in the sensor assembly 28 is provided with the inner diametric side groove 29B that tightly adhere to the elastic segments 42 of the sealing member 40, the sealing effect afforded by the sealing member 40 can be increased with the elastic segments 42 of the sealing member 40 held in tight contact with the inner diametric side groove 29B.

Figure 40:
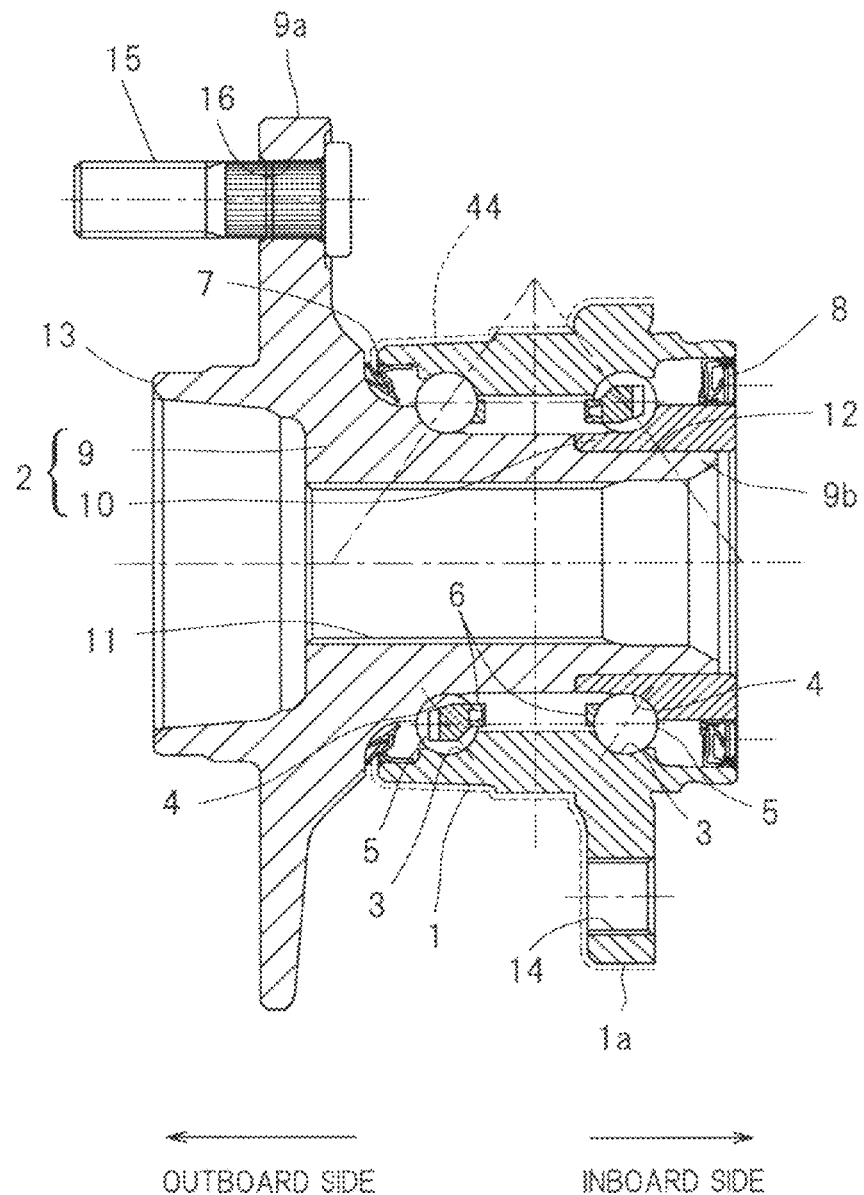
FIG. 40 is a sectional view showing the sensor equipped wheel support bearing assembly according to a fourth preferred embodiment of the present invention.
Figure 41:
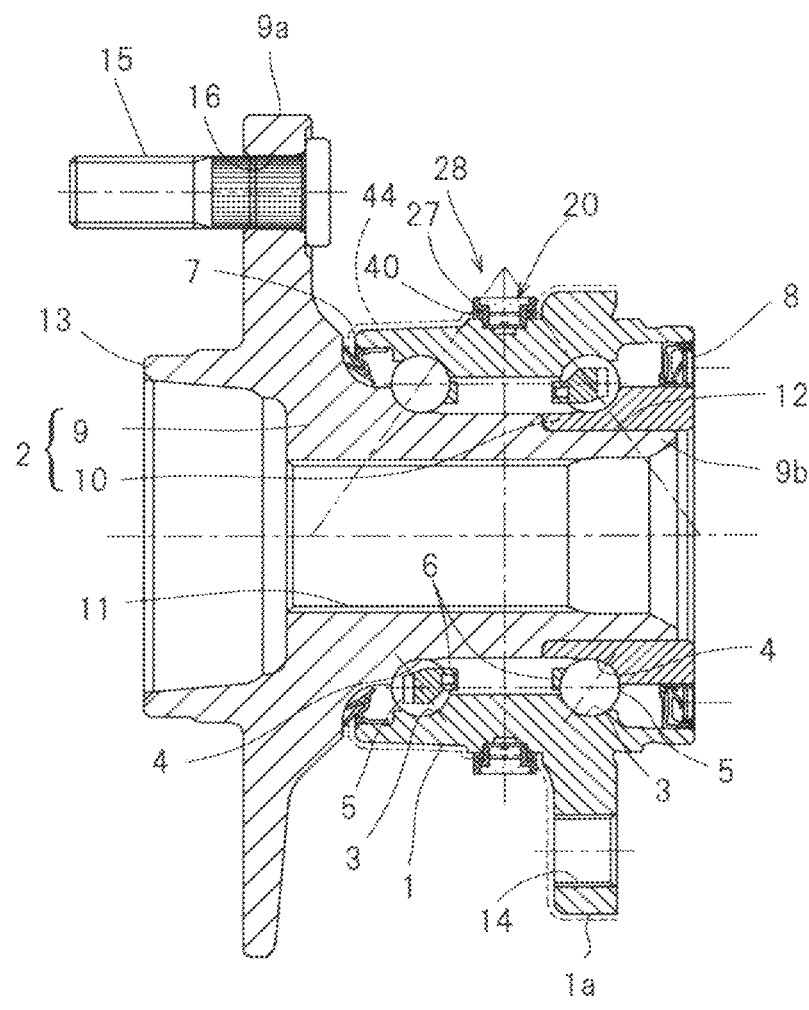
FIG. 41 is a sectional view showing the sensor equipped wheel support bearing assembly having the sensor assembly fitted to the bearing.

FIGS. 40 and 41 illustrate a fourth preferred embodiment of the present invention. The sensor equipped wheel support bearing assembly according to the fourth embodiment is similar to that according to the previously described third embodiment with reference to FIG. 29 to FIGS. 39A and 39B, but differs therefrom in that the outer diametric surface of the outer member 1, to which the annular sensor assembly 28 is fitted, is formed with a surface treatment layer 44 having a corrosion resistance or an anticorrosive property. In the fourth embodiment, the surface treatment layer 44 referred to above is so formed as to cover a surface region including an outer peripheral surface and an outboard side face of the vehicle body fitting flange 1a integral or rigid with the outer member 1, an outer peripheral surface of the outer member 1 on the outboard side of and adjacent to the vehicle body fitting flange 1a, and an outboard end face of the outer member 1. A surface region ranging from a portion of the outer peripheral surface of the outer member 1 on the inboard side of and adjacent to the vehicle body fitting flange 1a to the inboard end face of the vehicle body fitting flange 1a is a surface region that will form a knuckle contact surface and is left bare with no surface treatment layer 44 formed thereon.

Figure 42:
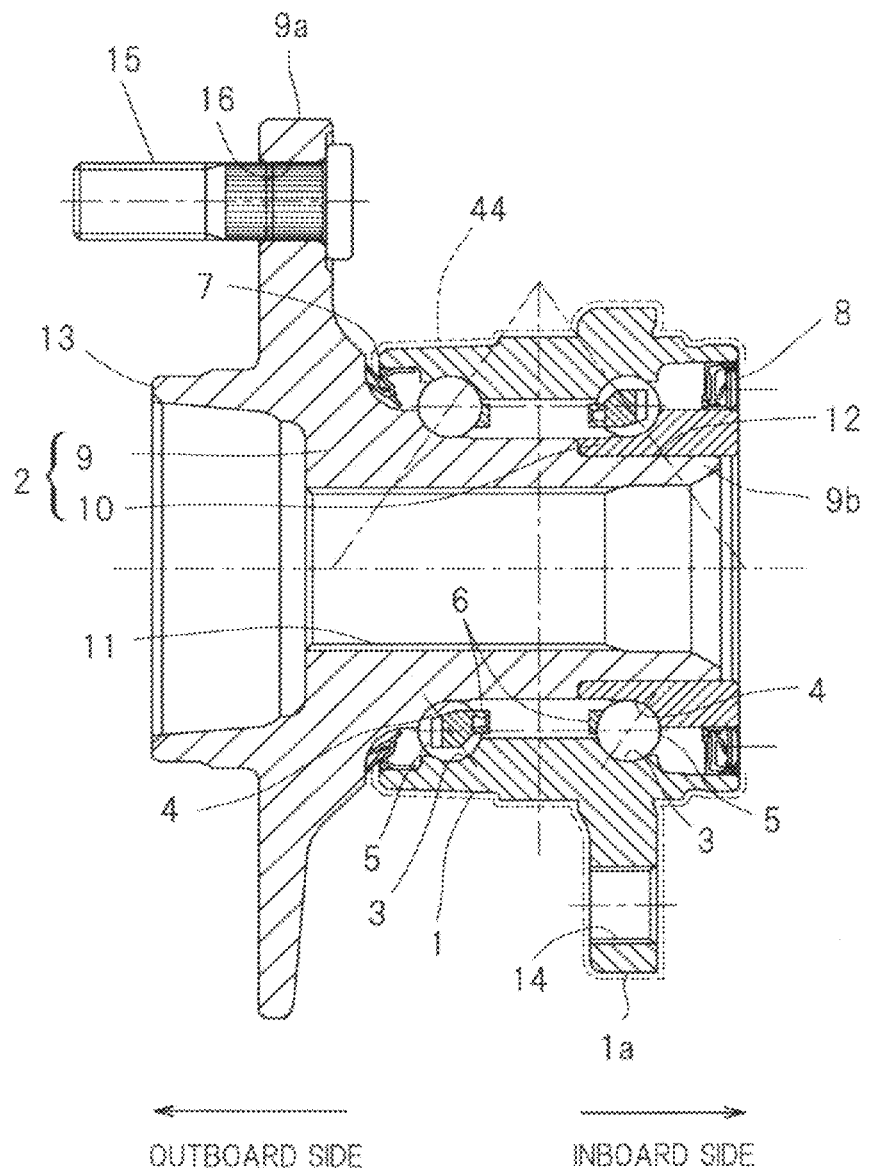
FIG. 42 is a sectional view showing a different example of formation of a surface treated layer in the bearing.

It is to be noted that the surface treatment layer 44 referred to above may be formed on the entire outer diametric surface of the outer member 1 as shown in FIG. 42. The sensor assembly 28 of the type discussed hereinabove can be fitted through the sealing member 40 to the outer diametric surface of the outer member 1 formed with the surface treatment layer 44, as shown in FIG. 41. Other structural features than those described above are similar to those shown in and described in connection with the third embodiment with reference to FIG. 29 to FIGS. 39A and 39B.

For the surface treatment layer 44 having a corrosion resistance or an anticorrosive property, a plated layer formed by means of, for example, a metal plating process, a painted layer formed by means of a painting process, or a coated layer formed by means of a coating process can be enumerated. For the metal plating process, zinc plating, uni-chrome plating, chromate plating, nickel plating, chromium plating, electroless nickel plating, Kanigen plating (trade name), magnetite coating (black oxide finishing), or Raydent® can be suitably employed. For the painting process, electrodeposition of cation, electrodeposition of anion or electrodeposition of fluorine can be suitably employed. For the coating process, ceramic coating of, for example, silicon nitride can be suitably employed.

Since as hereinabove described, in the practice of this fourth embodiment, the surface treatment layer 44 having the corrosion resistance or the anticorrosive property is formed on the outer diametric surface of the outer member 1 to which the sensor assembly 28 is fitted, it is possible to prevent the sensor assembly 28 from being lifted because of a local swelling of the outer diametric surface of the outer member 1 caused by rusting and/or to prevent the sensor units 20 of the sensor assembly 28 from contagious rusting due to contact with the rusted outer member 1 and, accordingly, any erroneous operation of the sensors 22 resulting from the rust can be alleviated to allow the load detection to be performed accurately for an extended period of time.

Also, since in the fourth embodiment shown in FIGS. 40 and 41, the surface treatment layer 44 is formed in the surface region ranging from the vehicle body fitting flange 1a to the outboard end thereof, not over the entire outer diametric surface of the outer member 1, when grinding the rolling surfaces 3 in the outer member 1, a surface untreated portion can be maintained at the inboard end of the outer diametric surface of the outer member 1 and the rolling surfaces 3 can be highly precisely subjected to any known grinding process.

A fifth preferred embodiment of the present invention will now be described in detail with particular reference to FIGS.

43 to 54. In this fifth embodiment, component parts similar to those shown in and described with particular reference to FIG. 1 to FIGS. 12A and 12B in connection with the first embodiment of the present invention are designated by like reference numerals and, therefore, the details thereof are not reiterated. In any event, this fifth embodiment is similar to the previously described first embodiment, but differs therefrom in that the annular protective covering 27a is a molded article in the form of a rubber-like elastic element and that the protective covering 27 so prepared is fitted to the outer peripheral surface of the stationary member with a band 38 fastened therearound.

Figure 44:
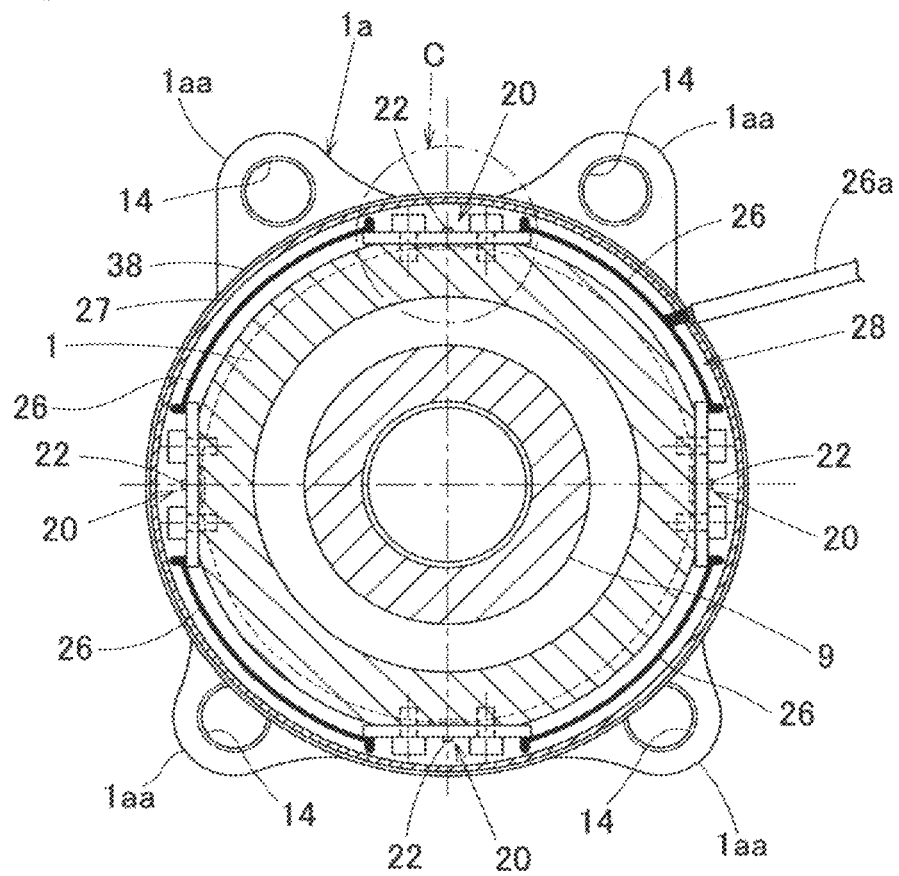
FIG. 44 is a cross sectional view taken along the line XXXXIV-XXXXIV in FIG. 43.
Figure 52:
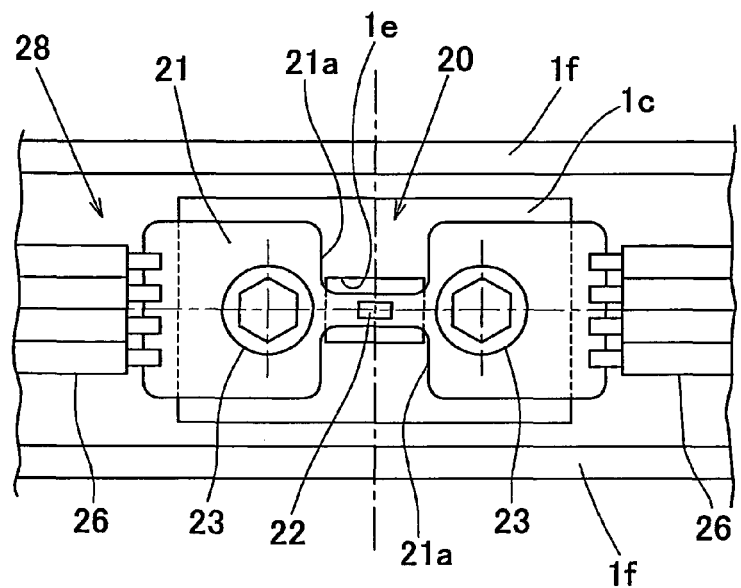
FIG. 52 is a top plan view showing the site of installation of the sensor unit in the outer member employed in the sensor equipped wheel support bearing assembly.
Figure 53:
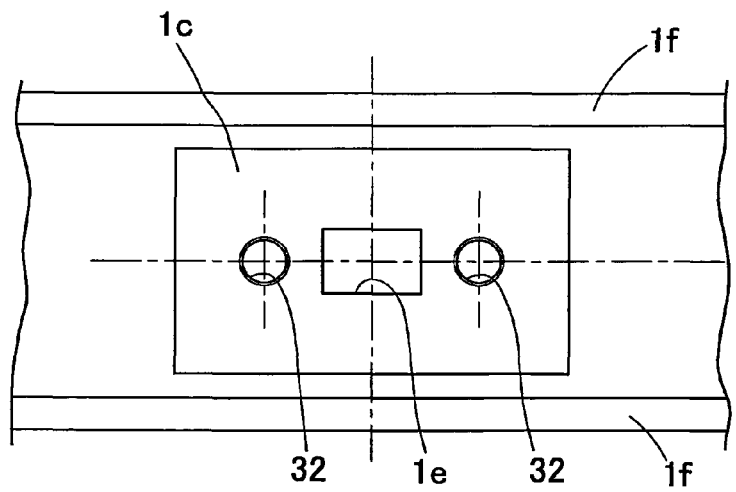
FIG. 53 is a top plan view showing the site of installation of the sensor unit in the outer member before the sensor unit is fitted.

In the practice of this fifth embodiment, each of the sensor units 20 is so formed as shown in FIG. 51, showing a portion indicated by C in FIG. 44 on an enlarged scale, and also in FIG. 52 showing a top plan view thereof. With respect to the strain generating member 21 in each of the sensor units 20, component parts similar to those shown in FIG. 8 pertaining to the previously described first embodiment are designated by like reference numerals and, therefore, the details thereof are not reiterated. In accordance with this fifth embodiment, the strain generating member 21 has its opposite end portions formed with contact fixing segments 21b adapted to be fixed to the outer diametric surface of the outer member 1 in contact therewith. It is, however, to be noted that depending on the shape of the strain generating member 21, the number of the contact fixing segments 21b may be three or more.

Figure 47:
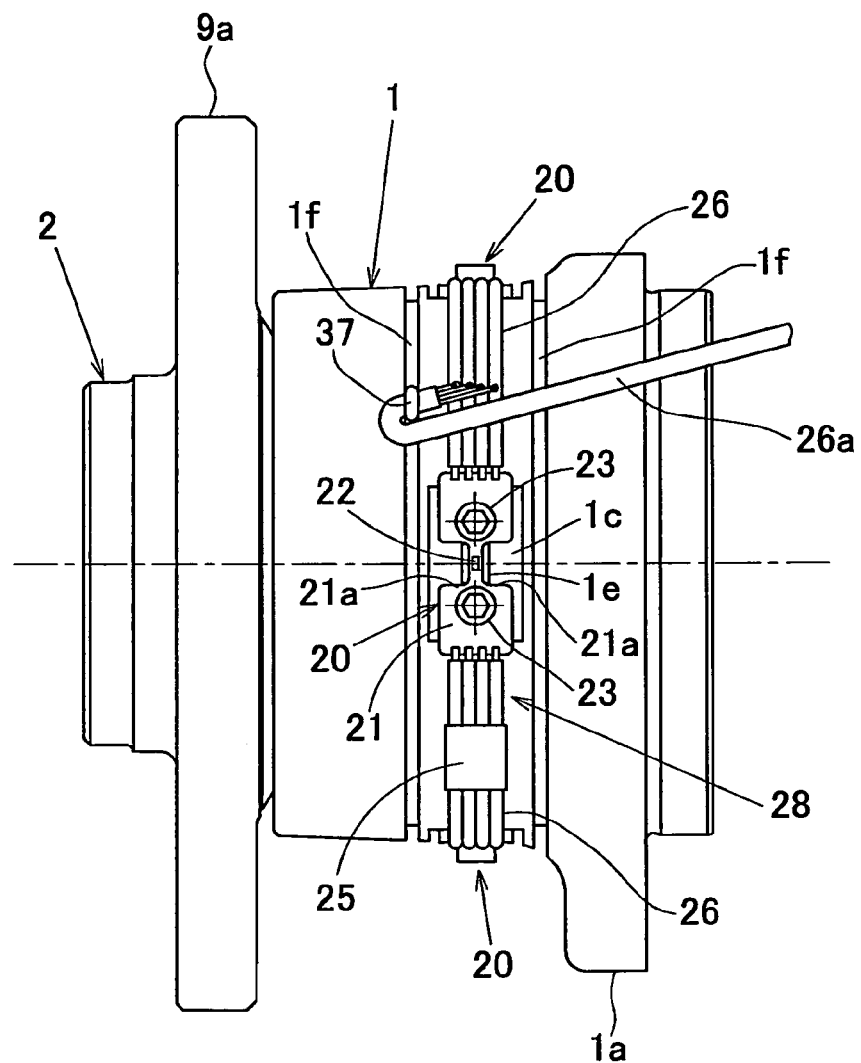
FIG. 47 is a side view showing a condition in which the protective covering employed in the sensor equipped wheel support bearing assembly is removed.

As best shown in FIG. 47, each of the sensor units 20 is so arranged that the two contact fixing segments 21b of the corresponding strain generating member 21 can be held at the same positions in the direction axially of the outer member 1 and spaced a distance from each other in the direction circumferentially of the outer member 1, and those contact fixing segments 21b are fixed to the outer diametric surface of the outer member 1 by means of the bolts 23. In order to stably fix the respective sensor unit 20 to the outer diametric surface of the outer member 1, a portions of the outer diametric surface of the outer member 1, to which the contact fixing segments 21b are fixed directly, are formed as a flat surface portion 1c corresponding to the flat ground surface portion employed in the practice of the first embodiment and as best shown in FIG. 3. Also, another portion of the outer diametric surface of the outer member 1, which lies intermediate between two locations where the two contact fixing segments 21b are fixed, is provided with a groove 1e. The bolts 23 are successively passed through the respective bolt insertion holes 24 defined in the contact fixing segments 21b so as to extend radially completely therethrough, and are then threaded into the screw holes 32 defined in the outer diametric surface of the outer member 1. With the two contact fixing segments 21b of the strain generating member 21 fixed to the outer diametric surface of the outer member 1 on respective sides of the groove 1e in the manner described above, the intermediate portion of the strain generating member 21 of a thin plate configuration having the cutouts 21a can be spaced from the outer diametric surface of the outer member 1, thus facilitating a strain induced deformation in the vicinity of the cutouts 21a.

The four sensor units 20 are, as best shown in FIG. 47, connected in a ring shaped pattern with the electronic components including, for example, the signal processing IC 25 for processing the respective output signals of the strain sensors 22 thereof and the signal cable 26 for transmitting the processed output signal therethrough to the outside of the bearing assembly to form the sensor assembly 28, and the sensor assembly 28, which is rendered to be of a ring shape, is in turn fitted to the outer diametric surface of the outer member 1 in a fashion coaxial with the outer member 1. The signal cable 26 is wired between the sensor units 20 and the signal processing IC 25 is disposed halfway through the signal cable 26. In such case, the four sensor units 20 are disposed at the same axial locations of the outer diametric surface of the outer member 1 as shown in FIG. 44 showing a cross section taken along the line XXXXIV-XXXXIV in FIG. 43.

The sensor assembly 28 fitted to the outer diametric surface of the outer member 1 is covered by an annular, that is, ring shaped protective covering 27 coaxial with the outer member 1. This protective covering 27 is of a generally inverted U-shaped configuration including a pair of upright walls 27a positioned spaced in an axially direction from each other so as to extend radially and a cylindrical wall 27b connecting respective outer diametric side ends of those upright walls 27a together.

The protective covering 27 of the structure described above is fitted to the outer diametric surface of the outer diameter 1 by fastening such a band 38 as shown in FIGS. 50A and 50B around the outer diameter 1. This protective covering 27 is in the form of a molded article of a rubber-like elastic element such as, for example, an elastomer molded article. More specifically, the material for the protective covering 27 may be employed in the form of a rubber material (polychloroprene rubber, silicone rubber, polyethylene chloride rubber, urethane rubber, or acrylic ethylene) or a thermoplastic elastomer. For the material for the band 38, a metallic material such as, for example, stainless steel can be employed.

Figure 43:
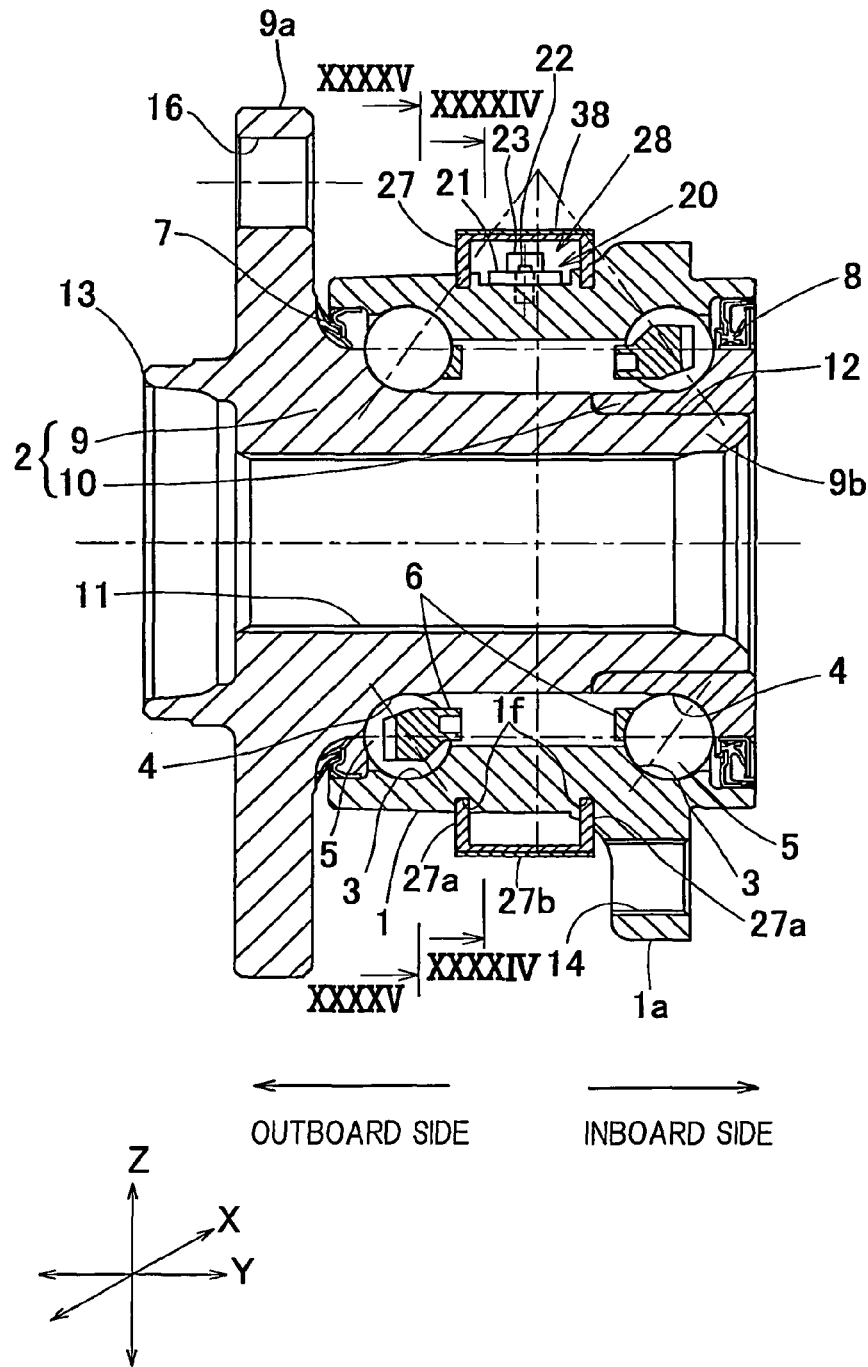
FIG. 43 is a sectional view showing the sensor equipped wheel support bearing assembly according to a fifth preferred embodiment of the present invention.

As shown in FIG. 47, the outer diametric surface of the outer member 1 is provided with a circumferentially extending protective covering mounting grooves 1f positioned at two locations spaced axially with the sensor assembly 28 intervening therebetween, and, with the upright walls 27a of the protective covering 27 received within the respective mounting grooves 1f as shown in FIG. 43, the protective covering 27 is axially positioned and, at the same time, the sensor assembly 28 is assuredly sealed by the protective covering 27.

Figure 45:
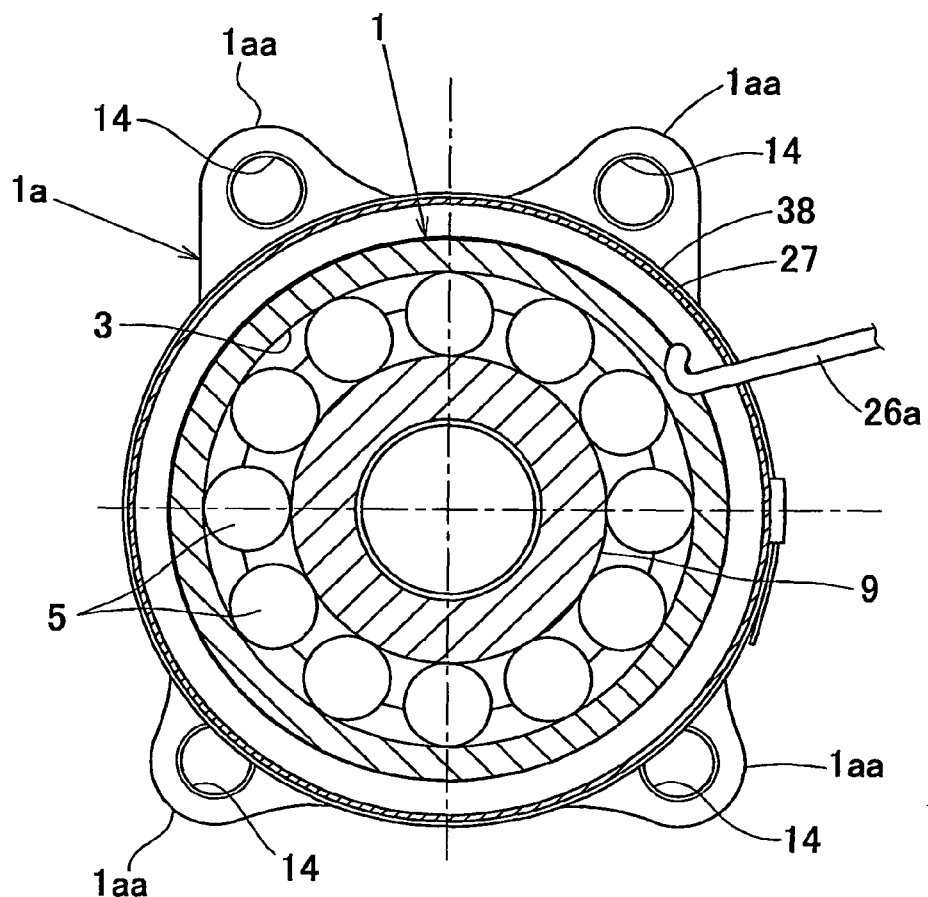
FIG. 45 is a cross sectional view taken along the XXXXV-XXXXV in FIG. 43.
Figure 46:
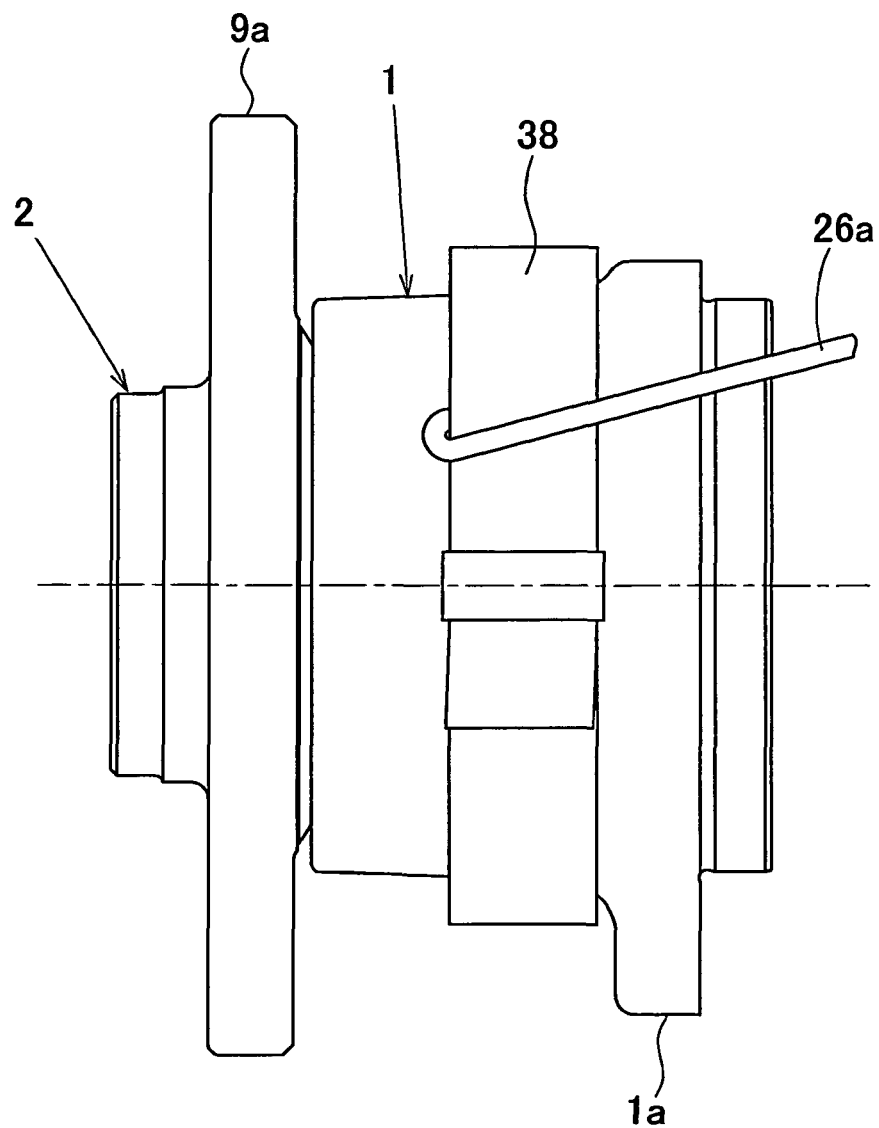
FIG. 46 is a side view of the sensor equipped wheel support bearing assembly.

The lead-out line 26a of the signal cable 26 in the sensor assembly 28, which is drawn outwardly towards the vehicle body structure, is drawn outwardly from one location of the protective covering 27 towards the outside of the protective covering 27, as shown in FIG. 45, showing a cross section taken along the line XXXXV-XXXXV in FIG. 43, and FIG. 46. In this instance as shown in FIG. 47, an O-ring 37 is mounted at the location where the lead-out line 26a is drawn outwardly from the protective covering 27 and, accordingly a sealing is provided at a portion of the protective covering 27, from which the signal cable lead-out line 26a is drawn outwardly. It is, however, to be noted that in place of the O-ring 37, a sealing material may be filled in at that portion of the protective covering 27 to thereby seal that portion of the protective covering 27, from which the signal cable lead-out line 26a is drawn outwardly.

Figure 48:
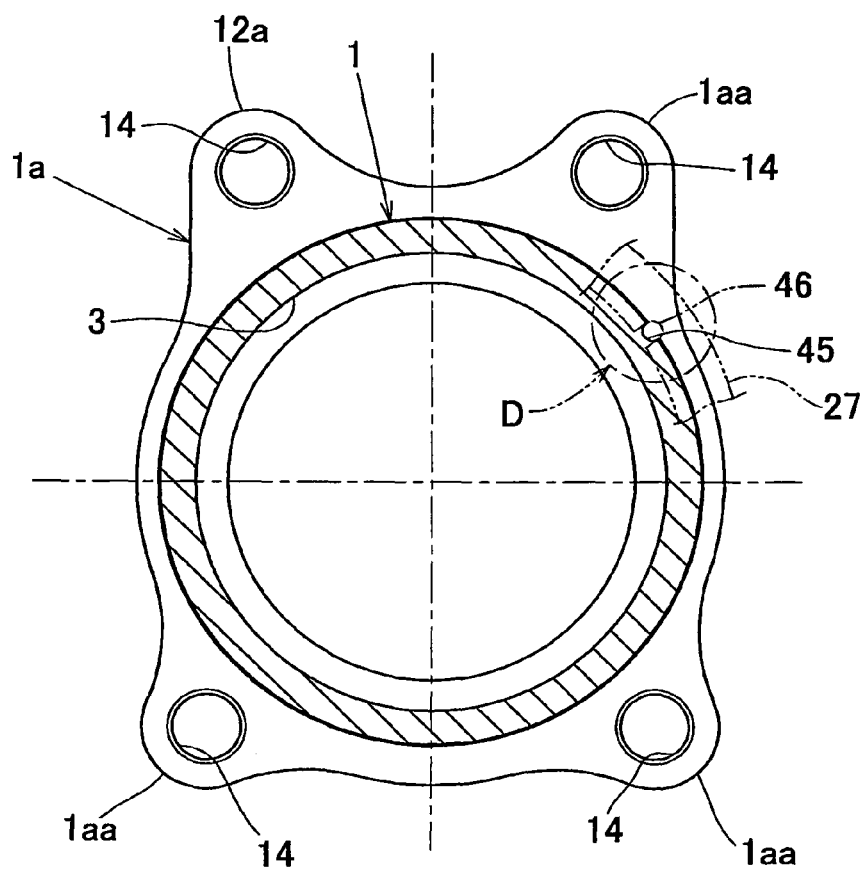
FIG. 48 is a sectional view showing the outer member in the sensor equipped wheel support bearing assembly as viewed from the outboard side.
Figure 49A:
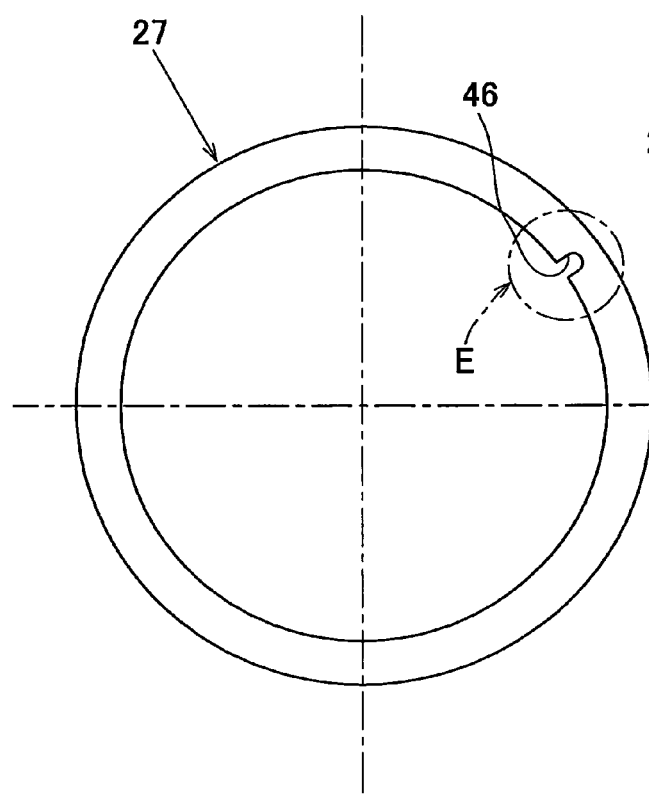
FIG. 49A is a front elevational view showing the protective covering employed in the sensor equipped wheel support bearing assembly.
Figure 49B:
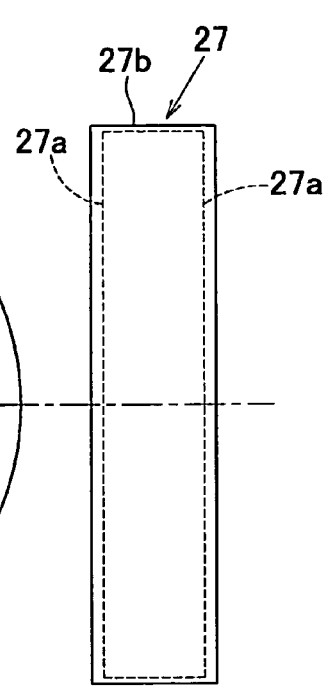
FIG. 49B is a side view of FIG. 49A.

Also, as shown in a portion D in FIG. 48 and a portion E in FIG. 49A, a portion of one of the upright walls 27a of the protective covering 27 in the circumferential direction and a portion of the outer diametric surface of the outer member 1, which confronts the portion of such one of the upright walls 27a are formed with respective cutouts 46 and 45 through which the signal cable lead-out line 26a is passed. Accordingly, the signal cable lead-out line 26a can be positioned with respect to the circumferential direction.

Assemblage of the sensor equipped wheel support bearing assembly according to the fifth embodiment described above is carried in the following manner. At the outset, in a condition in which the outer member 1 stands alone or the rolling elements 5 are assembled onto the outer member 1, the ring shaped sensor assembly 28 is fitted to (or mounted on) the outer diametric surface of the outer member 1 as shown in FIG. 47. Then, the sensor assembly 28 is covered with the ring shaped protective covering 27, which is in turn fitted to the outer diametric surface of the outer member 1 with the band 38 fastened therearound, and the bearing assembly in its entirety is assembled subsequently. By so assembling in this manner, the sensor equipped wheel support bearing assembly, in which the sensor assembly 28 fitted to the outer member 1 is covered with the protective covering 27 then fastened around the outer diameter 1 by means of the band 38, can be easily assembled.

The manner of how the load is detected in the sensor equipped wheel support bearing assembly of the structure according to the fifth embodiment will now be described. The details thereof are not reiterated because the basic operation is similar to that in the previously described first embodiment. In particular, in the case of this fifth embodiment, the sensor assembly 28, in which the electronic components including the plural sensor units 20, the signal processing IC 25 for processing the respective output signals of the strain sensors 22 and the signal cable 26 for transmitting the processed output signal to the outside of the bearing assembly are connected in a ring shaped pattern, are fitted to the outer diametric surface of the outer member 1 in a fashion coaxial with the outer member 1 and, at the same time, this sensor assembly 28 is covered with the ring shaped protective covering 27 in the form of an elastomer molded article with the band 38 fastened around such protective covering 27 to fit the latter to the outer diametric surface of the outer member 1. Accordingly, the electronic components including the sensor units 20 can be protected from being damaged (damages caused by small stones bounced from the road surface during the travel of the automotive vehicle and/or corrosion caused by a muddy water or a salty water) under the influence of the ambient environment, allowing the load to be accurately detected for an extended period of time.

In the case of this fifth embodiment, in which the outer member 1 serves as the stationary member, the protective covering 27 is fitted to the outer diametric surface of the outer member 1 and, therefore, the protective covering 27 can be easily fitted and the protection of the sensor assembly 28 with the protective covering 27 can readily be accomplished.

Also, in this fifth embodiment described hereinabove, the rubber or thermoplastic elastomer is used as a material for the protective covering 27 and, therefore, the formation thereof can readily be accomplished and the protective covering 27 can be fitted to the outer member 1 with a high sealability.

Moreover, in this fifth embodiment described hereinabove, since the band 38 is made of the metallic material, the fitting of the protective covering 27 onto the outer diametric surface of the outer member 1 serving as the stationary member can be firmly and highly tightly achieved.

Further, in this fifth embodiment described hereinabove, since the protective covering mounting grooves 1f are formed in the outer diametric surface of the outer member 1 serving as the stationary member, so as to extend in the circumferential direction thereof and the protective covering 27 is engaged in those mounting grooves 1f, not only can the protective covering 27 be positioned axially, but also the sensor assembly 28 can be assuredly sealed inside the protective covering 27.

Moreover, in this fifth embodiment described hereinabove, the lead-out line 26a of the signal cable 26 for drawing the signal cable 26 from the protective covering 27 has the O-ring 37 tightly mounted thereon and, therefore, the sealability of the protective covering 27 can be further increased. An effect similar to that described above can be obtained even if the sealing material is filled in that portion of the protective covering 27, from which the signal cable lead-out line 26a is drawn outwardly of the protective covering 27.

Yet, in this fifth embodiment described hereinabove, the cutouts 45 and 46 are provided in the outer diametric surface of the outer member 1, serving as the stationary member, and the protective covering 27, respectively, for facilitating the lead-out line 26a of the signal cable 26 to be drawn outwardly from the protective covering 27 and, therefore, the signal cable lead-out line 26a can be positioned with respect to the circumferential direction.

If the axial positions of the contact fixing segments 21b of the strain generating member 21 of the sensor units 20 fixed to the outer diametric surface of the outer member 1 serving as the stationary member differ from each other, strains transmitted from the outer member 1 to the strain generating members 21 also differ from each other. In this fifth embodiment hereinabove described, the contact fixing segments 21b of the strain generating member 21 of the sensor units 20 are provided at the respective positions on the outer member 1, where they assume the same dimension, and, therefore, those strains are apt to concentrate on the strain generating member 21, thus increasing the detecting sensitivity. Also, since the sensor units 20 are, in the outer member 1, arranged in the same axial position, mere positioning of the protective covering 27 at that axial position makes it possible to cover the sensor assembly 28 made up of the electronic components including the sensor units 20 and, therefore, the protective covering 27 can be constructed compact.

In addition, according to the above described fifth embodiment, since the strain generating member 21 of each of the sensor units 20 is in the form of a thin plate of a strip shape, when viewed from top, having the cutouts 21a defined in the opposite side portions thereof as best shown in FIG. 52, the strain occurring in the outer member 1 can be apt to be, after having been amplified, transmitted to the strain generating member 21 and, therefore, such strain can be detected by the corresponding strain sensor 22 with a high sensitivity, and the hysteresis occurring in the output signal thereof can be reduced, so that the load can be estimated with a high accuracy. Also, the shape of the strain generating member 21 becomes simplified and can be made compact and at a low cost.

Figure 54:
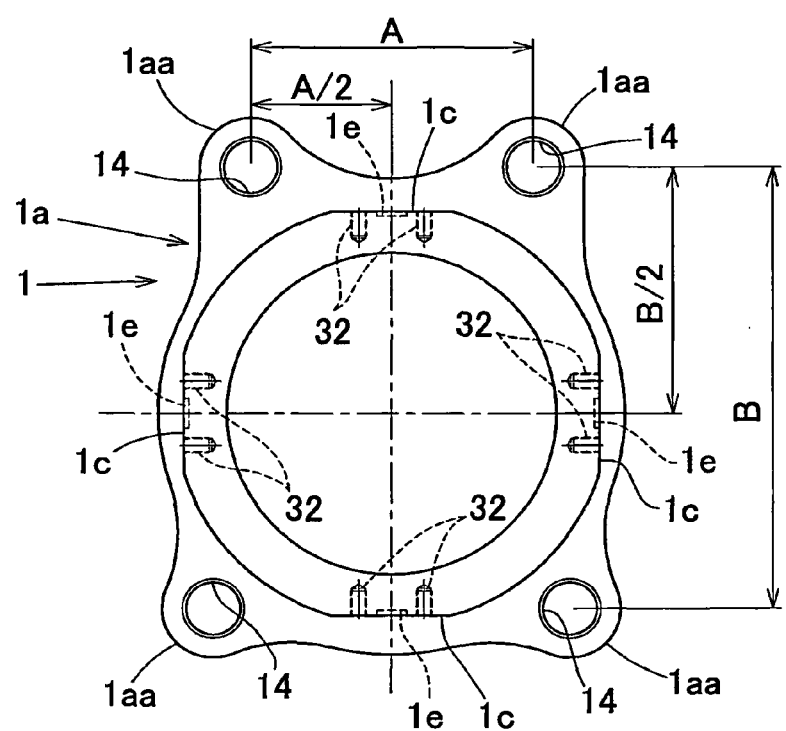
FIG. 54 is a front elevational view showing the outer member as viewed from the outboard side.

It is to be noted that the description made with reference to FIG. 4 in connection with the previously described first embodiment equally applies to each of the strain generating members 21 shown in FIG. 54 and, therefore, the details thereof are not reiterated for the sake of brevity.

A sixth preferred embodiment of the present invention will now be described in detail with particular reference to FIGS. 55 to 63. In describing the sixth embodiment, component parts similar to those shown in and described with reference to FIG. 1 to FIGS. 12A and 12B in connection with the first embodiment are designated by like reference numerals and the details thereof are not therefore reiterated. In any event, this sixth embodiment is featured in that a protective covering 27, corresponding to the annular protective covering 27 employed in and described in connection with the previously described first embodiment, is of a design in which the protective covering 57 is made to have an inner diameter increasing towards the inboard side and the protective covering 57 has an inboard end mounted on the outer peripheral surface of the stationary member and also has an outboard end fitted to the outer peripheral surface of the stationary member through a sealing ring (O-ring) 73 made of an elastic material.

Figure 56:
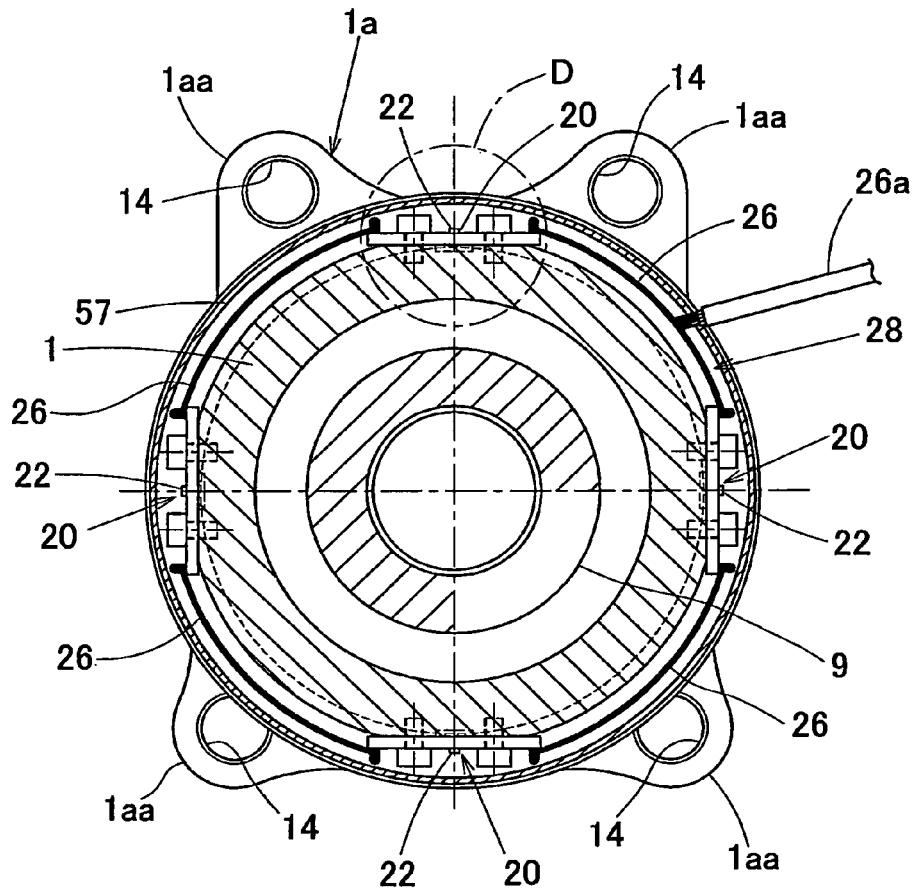
FIG. 56 is a cross sectional view taken along the line XXXXXVI-XXXXXVI in FIG. 55.
Figure 62:
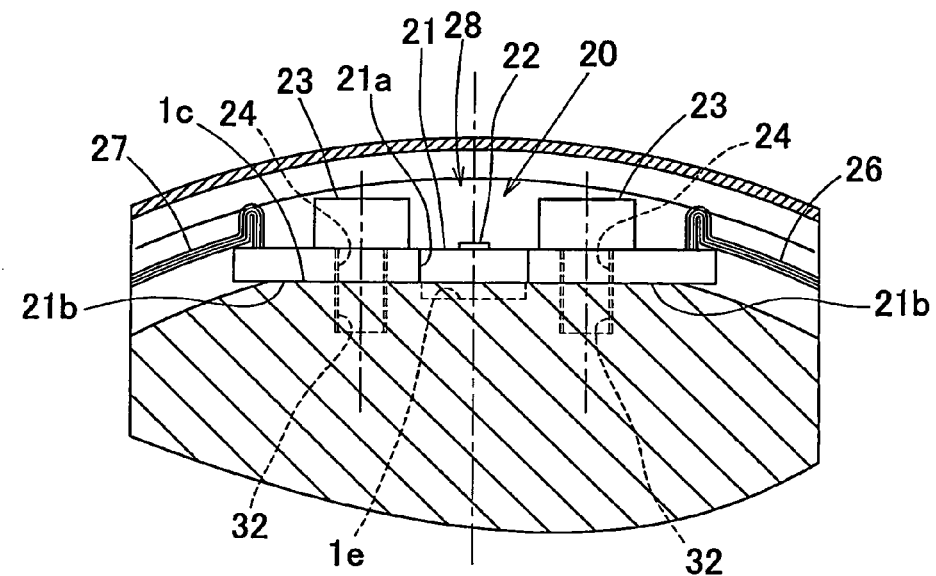
FIG. 62 is an enlarged sectional view showing a portion indicated by D in FIG. 56.
Figure 63:
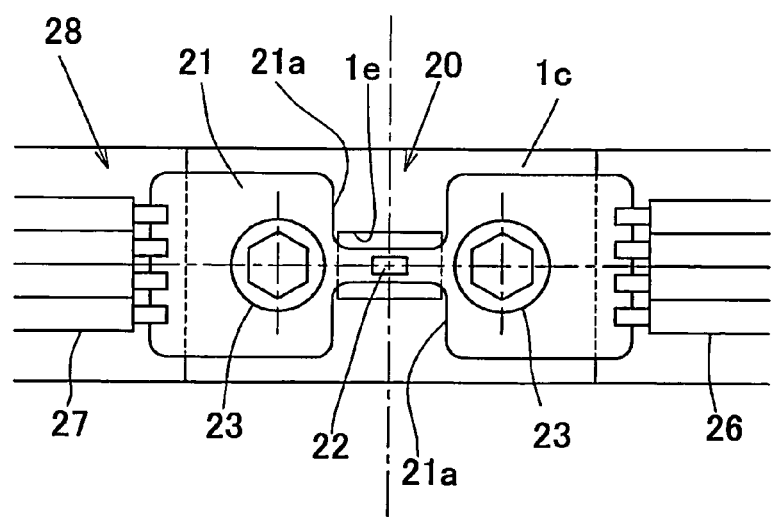
FIG. 63 is a top plan view showing the site of installation of the sensor unit on the outer member employed in the sensor equipped wheel support bearing assembly.

While each of the sensor units 20 employed in the practice of the sixth embodiment is so formed as shown in FIG. 62, showing a portion D in FIG. 56 on a large scale, and in a top plan view in FIG. 63, the description made with reference to FIG. 8 and in connection with the previously described first embodiment equally applies and, therefore, the details thereof are not reiterated.

Figure 58:
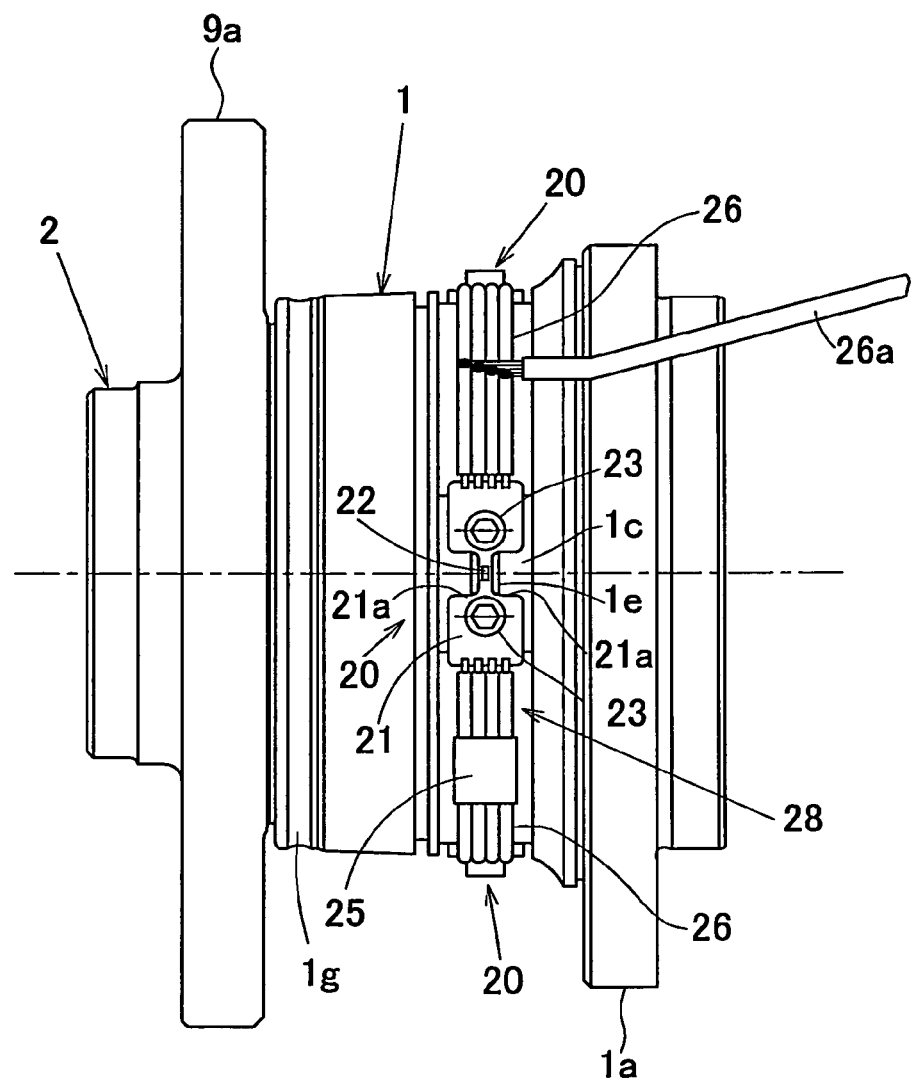
FIG. 58 is a side view showing the condition in which the protective covering in the sensor equipped wheel support bearing assembly is removed.
Figure 59A:
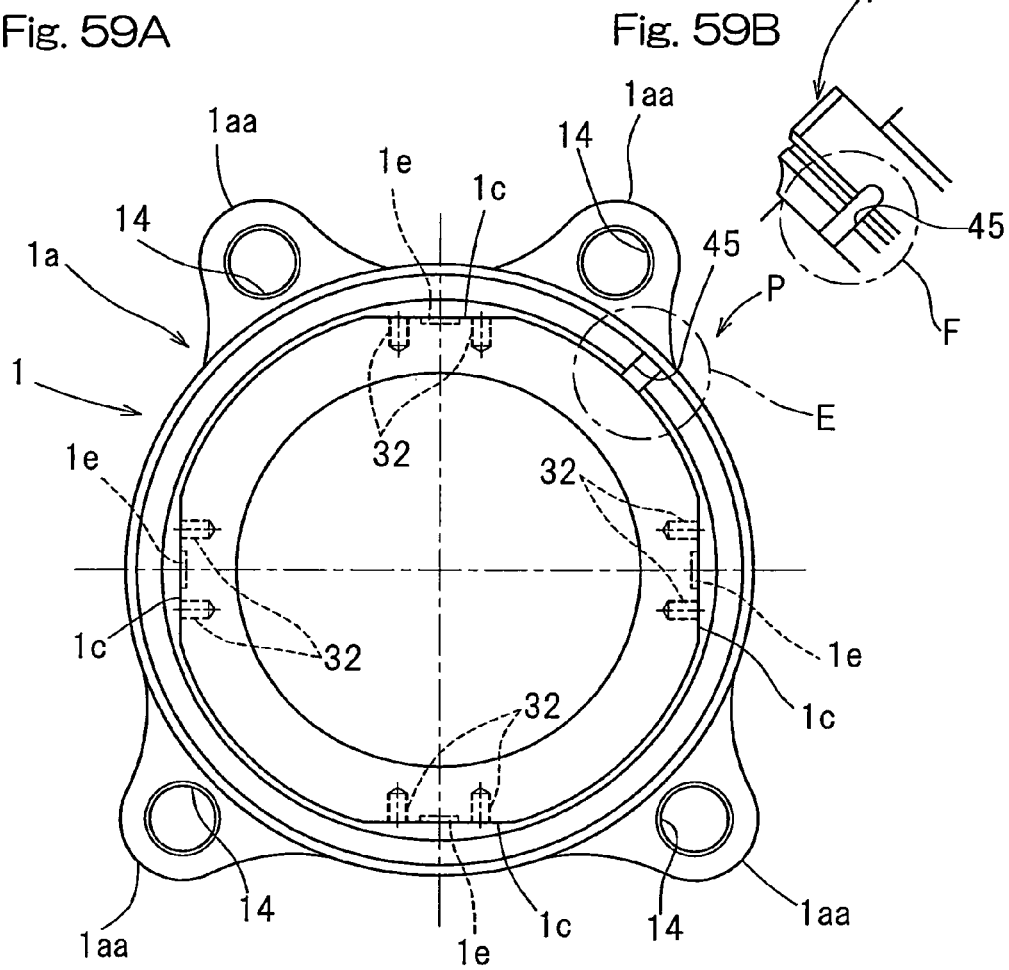
FIG. 59A is a sectional view showing the outer member in the sensor equipped wheel support bearing assembly as viewed from the outboard side.
Figure 59B:
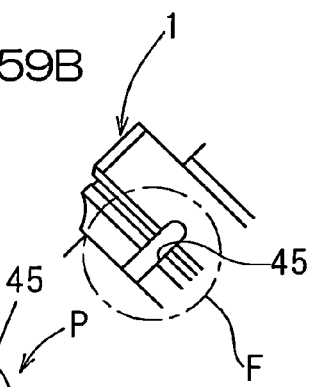
FIG. 59B is a fragmentary front elevational view showing a portion, indicated by E in FIG. 59A, as viewed along the arrow P.
Figure 60A:
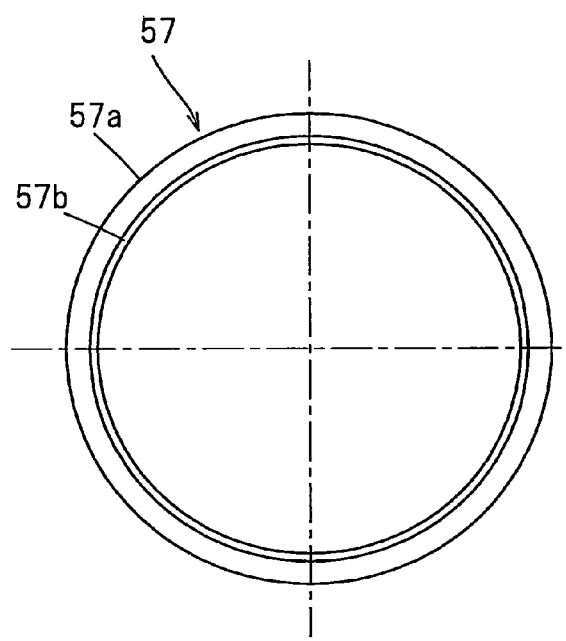
FIG. 60A is a front elevational view showing the protective covering employed in the sensor equipped wheel support bearing assembly.
Figure 60B:
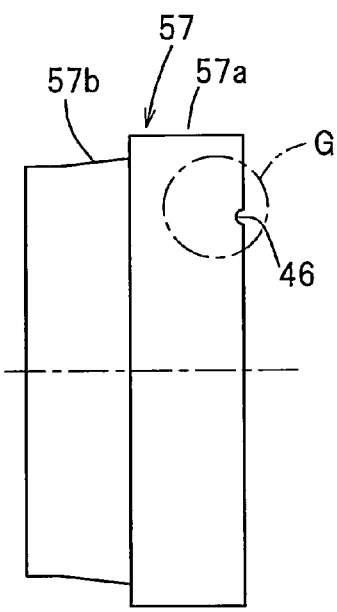
FIG. 60B is a side view of FIG. 60A.

In the practice of the sixth embodiment, the four sensor units 20 shown in FIG. 58 are of the structure substantially similar to those shown in FIG. 47 and described in connection with the fifth embodiment of the present invention and, therefore, the details thereof are not reiterated.

Figure 55:
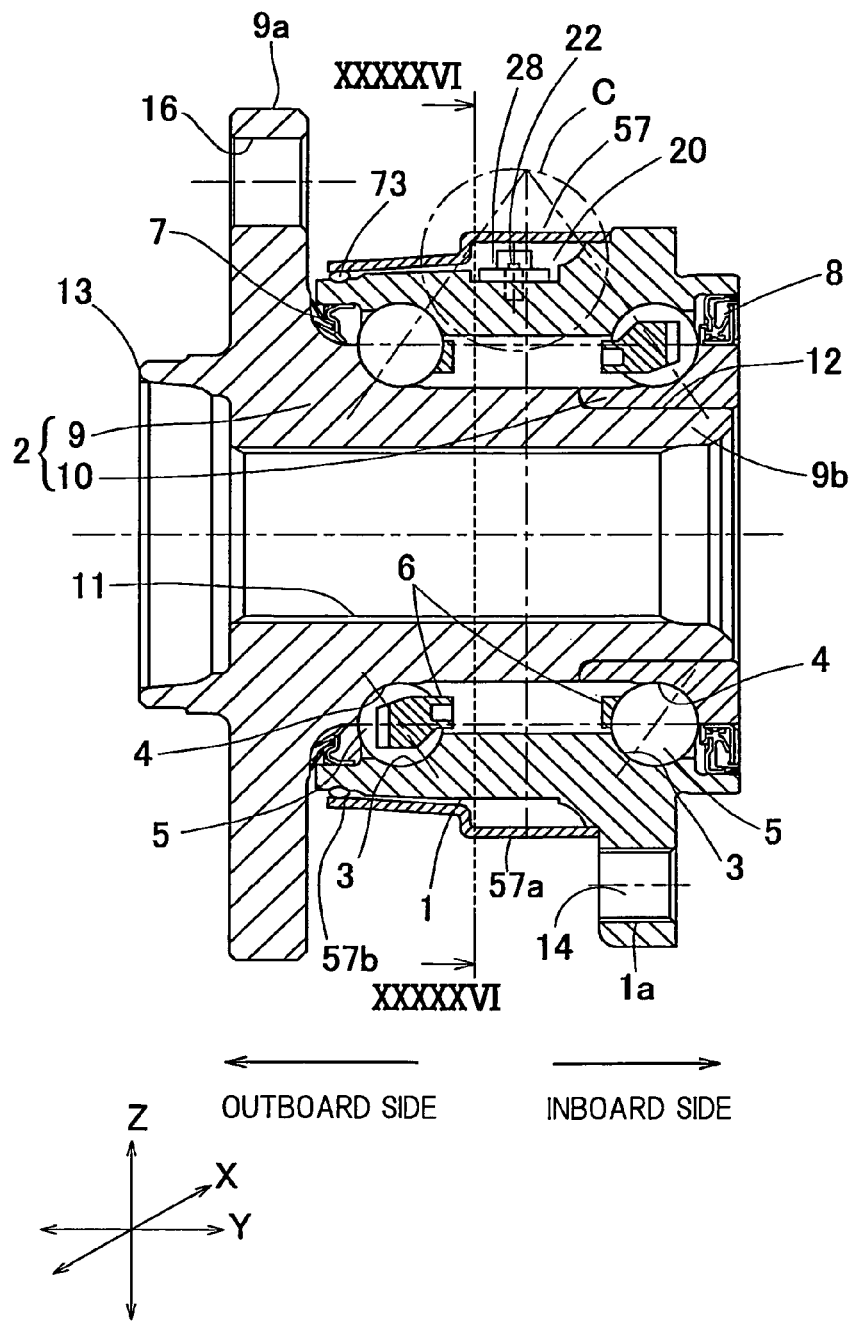
FIG. 55 is a sectional view showing the sensor equipped wheel support bearing assembly according to a sixth preferred embodiment of the present invention.

The sensor assembly 28 fitted to the outer diametric surface of the outer member 1 is covered by the protective covering 57 in such a manner as shown in FIG. 55. The protective covering 57 employed in the practice of the sixth embodiment is of a configuration in which an inboard portion of the protective covering 57 has an inner diameter enlarging towards the inboard side and represents a tubular shape having a large dimension in a direction axially thereof. Specifically, the protective covering 57 is of an axially stepped cylindrical configuration in which an inboard side half thereof defines a large diameter section 57a and an outboard side half thereof defines a reduced diameter section 57b. An inboard end of the protective covering 57 is mounted on the outer diametric surface of the outer member 1 while an outboard end of such protective covering 57 is fitted to the outer diametric surface of the outer member 1 through an O-ring 73, which is a sealing ring made of an elastic material, in a fashion coaxial with the outer member 1.

The reduced diameter section 57b of the protective covering 57 has its diameter so progressively reducing towards the outboard side, that is, is so tapered towards the outboard side, as to follow the outer diametric surface of the outer member 1 with a gap defined between it and the outer diametric surface of the outer member 1. On the other hand, the large diameter section 57a thereof defines a unit accommodating space between an inner peripheral surface of such large diameter section 57a and the outer peripheral surface of the outer member 1 for accommodating the sensor units 20. Material for the protective covering 57 is employed in the form of a metallic material such as, for example, stainless steel or the like or a resinous material such as, for example, PA66+GF.

A circumferentially extending mounting groove 1g for accommodating the O-ring 73 is defined in a portion of the outer diametric surface of the outer member 1 on the outboard side as best shown in FIG. 58, and the O-ring 73 is, as shown in FIG. 55, engaged in this mounting groove 1g to position the O-ring 73 with respect to the direction axially thereof, thereby assuredly sealing a gap between the outboard end of the protective covering 57 and the outer diametric surface of the outer member 1. The O-ring 73 is made of a rubber material such as, for example, nitryl rubber or silicone rubber. Accordingly, the sealability exhibited by the O-ring 73 is assured.

Also, since the sensor units 20 and the signal processing unit 25, both included in the sensor assembly 28, are fixed to the outer surface of the outer member 1 and inwardly of the protective covering 57, it is possible to avoid the possibility that those fixture would become unstable because of erosion brought about by the ambient environment. The inner space of the protective covering 57 may be filled with an elastic filling material such as, for example, a molding resin or urethane foam. In such case, because of the elastic filling material so filled, the electronic components including the sensor units 20, the signal processing unit 25 and the signal cable 26 can be protected from small stones, a muddy water, a salty water or the like from the outside.

Also, the entire outer diametric surface of the outer member 1 may be treated to have a rust proofing layer. In such case, it is possible to protect the outer diametric surface of the outer member 1 from rusting in contact with the muddy water or salty water and, therefore, it is possible to avoid the rusting, occurring in the outer diametric surface of the outer member 1, from being extended to the sensor assembly 28 then covered with the protective covering 57.

Figure 57:
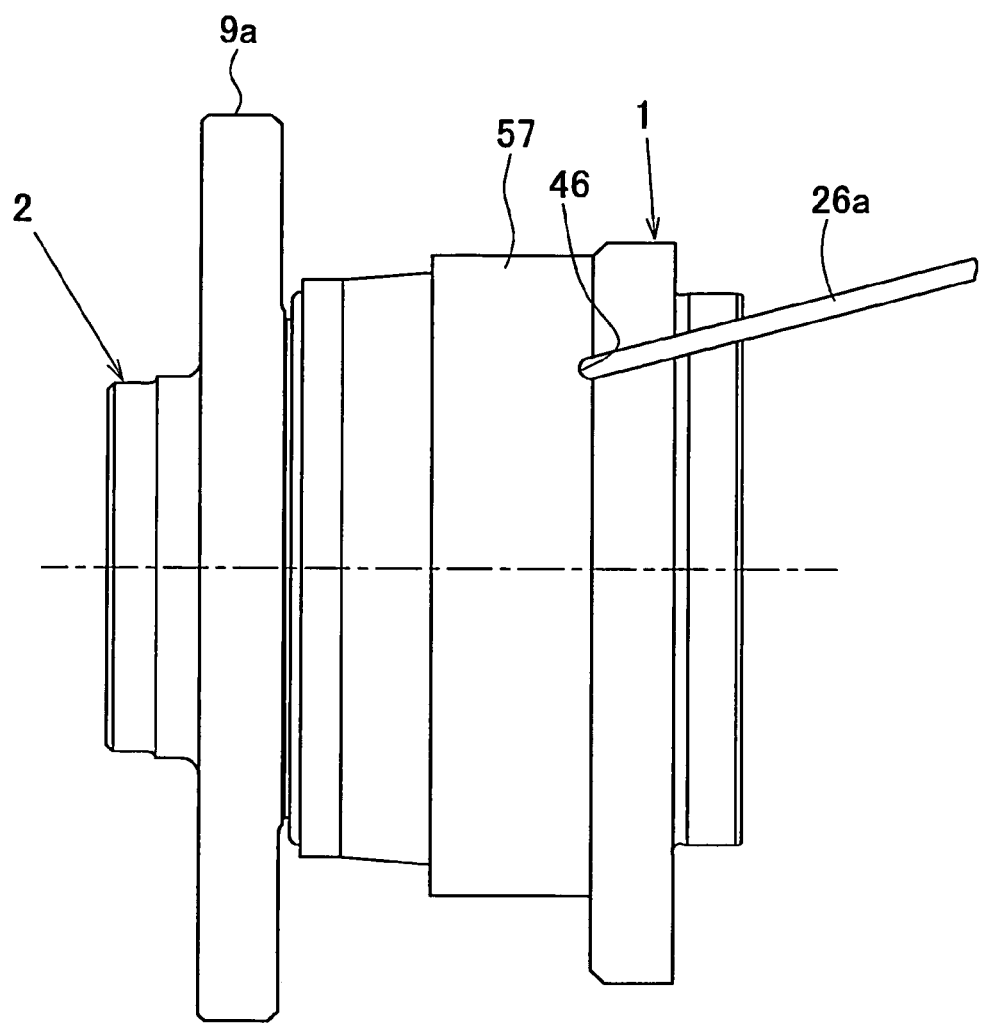
FIG. 57 is a side view of the sensor equipped wheel support bearing assembly.

The lead-out line 16a of the signal cable 26, through which the signal cable 26 in the sensor assembly 28 is drawn outwardly towards the automotive body structure, is drawn outwardly to the outside from one portion of the protective covering 57 as shown in FIG. 57. Specifically, as shown in respective portions of E and F in FIGS. 59A and 59B and a portion G of FIG. 60B, a circumferential portion of a stepped face in the outer diametric surface of the outer member 1, which faces the outboard side, and a portion of the inboard end of the protective covering 57, which faces such circumferential portion of the stepped face, are formed with respective cutouts 45 and 46 through which the signal cable lead-out line 26a is passed.

Figure 61A:
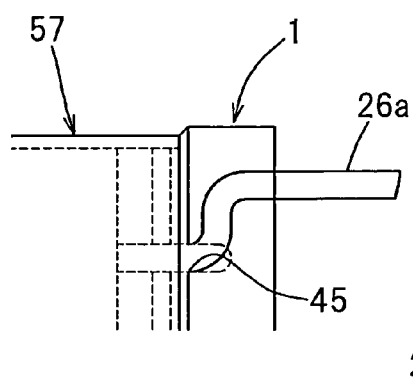
FIG. 61A is a top plan view showing a portion where a signal cable employed in the sensor equipped wheel support bearing assembly is drawn outwards.
Figure 61B:
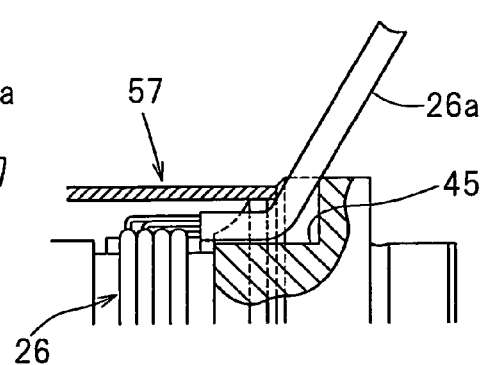
FIG. 61B is a side sectional view of FIG. 61A.

The cutout in this case may be formed only in the protective covering 57 or the outer diametric surface of the outer member 1 as shown in FIGS. 61A and 61B. As such, as shown in FIGS. 61A and 61B, the lead-out line 26a of the signal cable 26 is circumferentially positioned having been sandwiched in the cutouts 45 and 46. A portion or an opening where the signal cable lead-out line 26a is drawn outwardly from the cutouts 45 and 46, may be filled with a sealing material to thereby seal the site or the opening, where the signal cable lead-out line 26a can be drawn outwardly. By so doing, the sealability of the protective covering 57 can be further increased.

Assemblage of the sensor equipped wheel support bearing assembly according to the sixth embodiment described above is carried in the following manner. At the outset, in a condition in which the outer member 1 stands alone or the rolling elements 5 are assembled onto the outer member 1, the ring shaped sensor assembly 28 is fitted to (or mounted on) the outer diametric surface of the outer member 1 as shown in FIG. 58, following mounting of the O-ring 73 on the outer diametric surface of the outer member 1 so as to be engaged in the mounting groove 1g. Then, the tubular protective covering 57 is fitted to the outer diametric surface of the outer member 1 with an outboard end thereof press fitted onto the outer diametric surface of the outer member 1 until the inboard end thereof is mounted on the outer diametric surface of the outer member 1, and then the outboard end is fitted to the outer diametric surface of the outer member 1 through the O-ring 73, thereby allowing the sensor assembly 28 to be covered with the protective covering 57. Thereafter, the bearing assembly in its entirety is assembled.

With the sensor equipped wheel support bearing assembly so assembled in the manner described above, the sensor equipped wheel support bearing assembly, in which the sensor assembly 28 fitted to the outer member 1 is covered with the protective covering 57, can be easily assembled.

The manner of detecting the load with the sensor equipped wheel support bearing assembly of the structure hereinabove fully described will now be described. The basic operation is similar to that in the previously described first embodiment and, therefore, the details thereof are not reiterated. However, in the case of this sixth embodiment described above, the sensor assembly 28, in which the electronic components including the plural sensor units 20, the signal processing unit 25 for processing the respective output signals of the strain sensors 22 and the signal cable 26 for transmitting the processed output signal to the outside of the bearing assembly are connected in a ring shaped pattern, is fitted to the outer diametric surface of the outer member 1 in a fashion coaxial with the outer member 1 and is covered with the tubular protective covering 57 having its inner diameter enlarging towards the inboard side, and in addition, the inboard end portion of the protective covering 57 is mounted on the outer diametric surface of the outer member 1 and the outboard side end of the protective covering 57 is fitted to the outer diametric surface of the outer member 1 through the O-ring 73. Accordingly, the electronic components including the sensor units 20 can be protected from being damaged (damages caused by small stones bounced from the road surface during the travel of the automotive vehicle and/or corrosion caused by a muddy water or a salty water) under the influence of the ambient environment, allowing the load to be accurately detected for an extended period of time.

In the case of this sixth embodiment, in which the stationary member is the outer member 1, since the protective covering 57 is fitted to the outer diametric surface of the outer member 1, it is easy to fit the protective covering 57 thereto and the protection of the sensor assembly 28 with the protective covering 57 can readily be achieved.

Also, in this sixth embodiment described hereinabove, since the protective covering 57 is so configured as to have a stepped tubular shape having the inboard side large in diameter, press fitting of the protective covering 57 onto the outer diametric surface of the outer member 1 from the outboard side of the outer member 1 can readily be accomplished.

In addition, in this sixth embodiment hereinabove described, since as the material for the protective covering 57, the metallic material or the resinous material is employed, fitting onto the outer diametric surface of the outer member 1 can be accomplished with a high sealability. In other words, in the case where the material for the protective covering 57 is employed in the form of the metallic material, fitting of the protective covering 57 onto the outer diametric surface of the outer member 1 can be accomplished firmly and with a high sealability. Also, in the case where the resinous material is employed as the material for the protective covering 57, the protective covering 57 can readily be formed in the form of a molded article and the fitting of the protective covering 57 onto the outer diametric surface of the outer member 1 can be accomplished with a high sealability. Accordingly, the damages to the sensors under the influence of the ambient environment can be avoided assuredly.

If the axial positions of the contact fixing segments 21b of the strain generating member 21 of the sensor units 20 fixed to the outer diametric surface of the outer member 1 serving as the stationary member differ from each other, strains transmitted from the outer member 1 to the strain generating members 21 also differ from each other. In this sixth embodiment hereinabove described, the contact fixing segments 21b of the strain generating member 21 of the sensor units 20 are provided at the same positions in the axial direction and, therefore, those strains are apt to concentrate on the strain generating member 21, thus increasing the detecting sensitivity. Also, since the sensor units 20 are arranged in the outer member 1 in the same axial position, mere positioning of the protective covering 57 at that axial position makes it possible to cover the sensor assembly 28 made up of the electronic components including the sensor units 20 and, therefore, the protective covering 57 can be constructed compact.

Yet, in this sixth embodiment described hereinabove, since the strain generating member 21 of each of the sensor units 20 is in the form of a thin plate of a strip shape, when viewed from top, having the cutouts 21a defined in the opposite side portions thereof as best shown in FIG. 63, the strain occurring in the outer member 1 can be apt to be, after having been amplified, transmitted to the strain generating member 21 and, therefore, such strain can be detected by the corresponding strain sensor 22 with a high sensitivity, the hysteresis occurring in the output signal thereof can be reduced and the load can be estimated with a high accuracy. Also, the shape of the strain generating member 21 becomes simplified and can be made compact and at a low cost.

FIG. 64 illustrates a seventh preferred embodiment of the present invention. The sensor equipped wheel support bearing assembly according to the seventh embodiment is similar to that shown in and described with reference to FIGS. 55 to 63 in connection with the sixth embodiment, but differs therefrom in that not only is the outboard end portion of the protective covering 57 formed with an inwardly oriented flange 57c, but also the outer diametric surface of the outer member 1 serving as the stationary member is provided with a projection 60 extending in a direction circumferentially thereof and axially confronting the inwardly oriented flange 57c of the protective covering 57, with the O-ring 73A sandwiched between this projection 60 and the inwardly oriented flange 57c of the protective covering 57. Other structural features than those described above are similar to those shown in and described with reference to FIGS. 55 to 63 in connection with the sixth embodiment.

Where as hereinabove described, the O-ring 73A is sandwiched between the inwardly oriented flange 57c of the protective covering 57 and the circumferentially extending projection 60 in the outer diametric surface of the outer member 1, not only can the O-ring 73A be positioned with respect to the axial direction, but also an assured seal can be achieved between the outboard end of the protective covering 57 and the outer diametric surface of the outer member 1.

Figure 65:
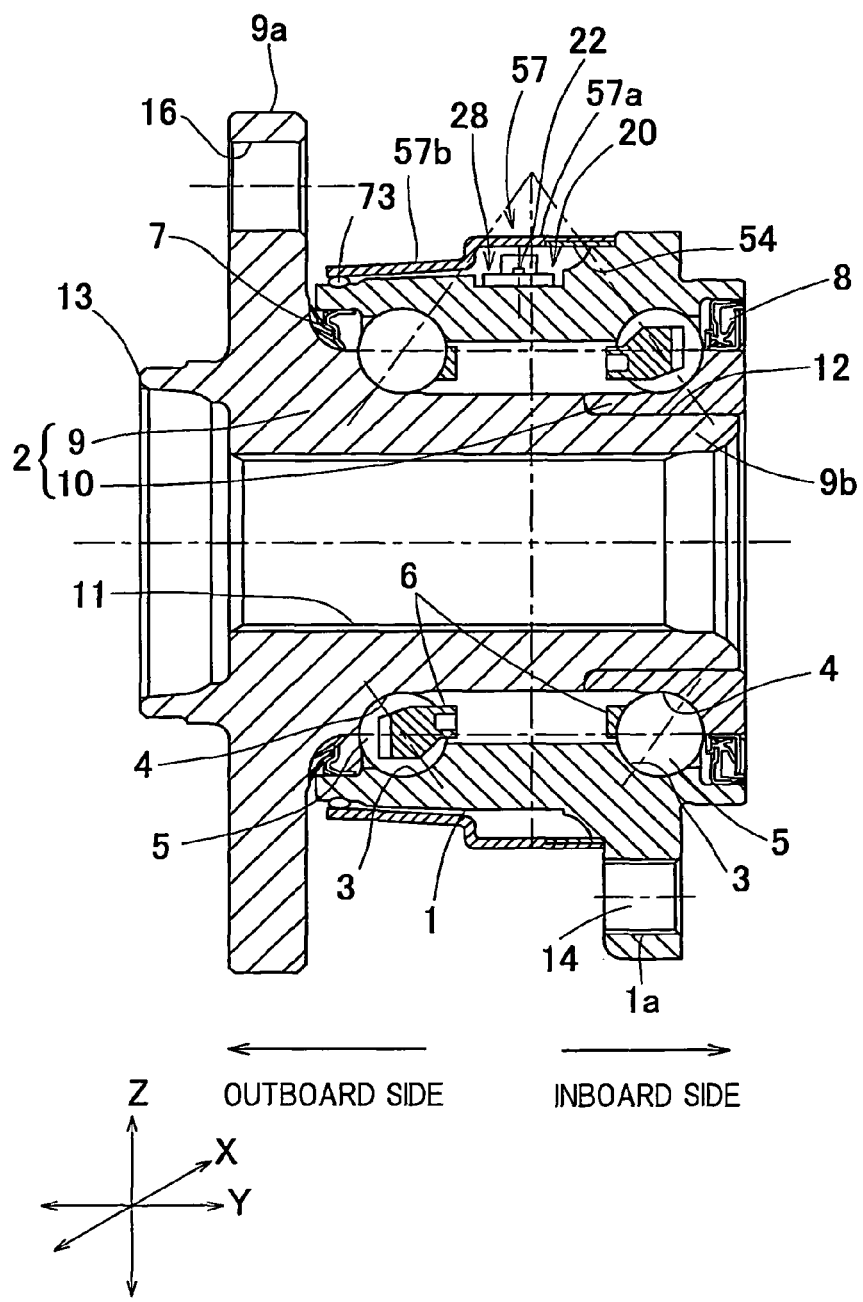
FIG. 65 is a sectional view showing the sensor equipped wheel support bearing assembly according to an eighth preferred embodiment of the present invention.
Figure 66:
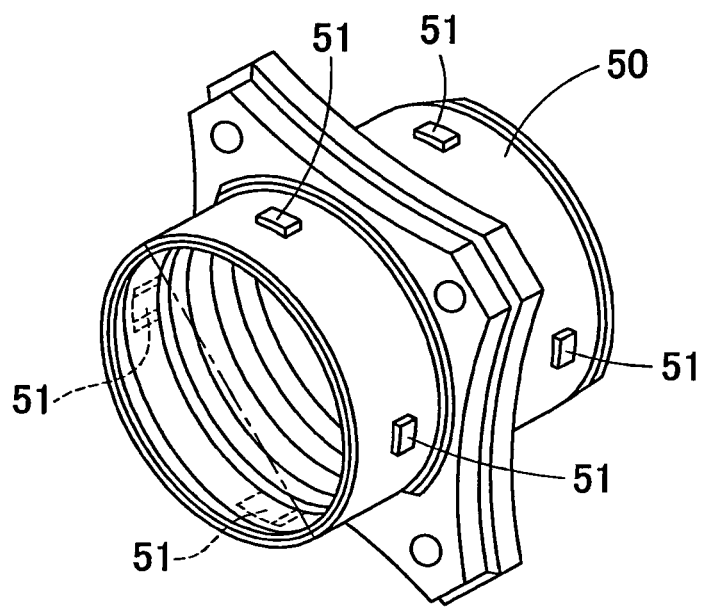
FIG. 66 is a perspective view showing the conventional example.

FIG. 65 illustrates an eighth preferred embodiment of the present invention. The sensor equipped wheel support bearing assembly according to this eighth embodiment is similar to that shown in and described with reference to FIGS. 55 to 63 in connection with the sixth embodiment, but differs therefrom in that the protective covering 57 in its entirety is made of a resinous material and a metallic material 54 is embedded in a portion of the inboard end of the protective covering 57 which is mounted on the outer diametric surface of the outer member 1. Other structural features than those described above are similar to those shown in and described with reference to FIGS. 55 to 63 in connection with the sixth embodiment.

Where the metallic material 54 is embedded in the inboard end of the protective covering 57 made of the resinous material, engagement with the outer diametric surface of the outer member 1 in the inboard end of the protective covering 57 can be made firmly and with a high sealability and the molding of the protective covering 57 can also be facilitated.

In describing the various preferred embodiments of the present invention, reference has been made to the outer member 1 functioning as the stationary member, but the present invention can be equally applied to the wheel support bearing assembly of a type in which the inner member functions as the stationary member. In such case, the sensor assembly 28 referred to hereinbefore is to be provided on a peripheral surface of the inner member.

Also, although each of the various embodiments has been described as applied to the wheel support bearing assembly of the third generation type, the present invention can be equally applicable to the wheel support bearing assembly of the first or second generation type, in which the bearing unit and the hub are members separate from each other, and also to the wheel support bearing assembly of the fourth generation type, in which a part of the inner member is constituted by an outer ring of a constant velocity universal joint. Also, the sensor equipped wheel support bearing assembly of the present invention can be applied to a wheel support bearing assembly for the support of a vehicle driven wheel and also to the wheel support bearing assembly of any generation type employing tapered rollers. In addition, the present invention can be applicable to the wheel support bearing assembly in which the outer member functions as a rotatable member. In such case, the sensor assembly may be provided on the outer periphery of the inner member.

Hereinafter, various modes of application of the embodiments of the present invention hereinbefore fully described will be described.

[Mode 1]

The sensor equipped wheel support bearing assembly according to this mode 1 is a wheel support bearing assembly for rotatably supporting a vehicle wheel relative to a vehicle body structure comprising:

an outer member having an inner periphery formed with double row rolling surfaces;

an inner member having an outer periphery formed with rolling surfaces held in face-to-face relation with the rolling surfaces in the outer member;

double row rolling elements interposed between the respective rolling surfaces in the outer and inner members; and a sensor assembly fitted to a peripheral surface of the stationary member in a fashion coaxial with the stationary member;

wherein the sensor assembly includes electronic components comprising;

a plurality of sensor units, each comprised of a strain generating member fixed to a peripheral surface of one of the outer and inner members, which works as a stationary member, in contact therewith and a sensor fitted to the strain generating member for detecting a strain induced in the strain generating member, a signal processing IC for processing an output signal from the sensor, a signal cable for transmitting the output signal so processed to the outside of the bearing assembly, and a flexible substrate having a wiring circuit for wiring among the sensor units, the signal processing IC and the signal cable; and wherein the electronic components are arranged inside an annular protective covering.

[Mode 2]

The sensor equipped wheel support bearing assembly according to this mode 2 is a wheel support bearing assembly for rotatably supporting a vehicle wheel relative to a vehicle body structure comprising:

an outer member having an inner periphery formed with double row rolling surfaces;

an inner member having an outer periphery formed with rolling surfaces held in face-to-face relation with the rolling surfaces in the outer member;

double row rolling elements interposed between the respective rolling surfaces in the outer and inner members; and a sensor assembly fitted through a sealing member to a peripheral surface of the stationary member in a fashion coaxial with the stationary member;

wherein the sensor assembly includes electronic components comprising;

a plurality of sensor units, each comprised of a strain generating member fixed to a peripheral surface of one of the outer and inner members, which works as a stationary member, in contact therewith and a sensor fitted to the strain generating member for detecting a strain induced in the strain generating member, a signal processing IC for processing an output signal from the sensor, and a signal cable for transmitting the output signal so processed to the outside of the bearing assembly; and wherein the electronic components are arranged inside an annular protective covering.

[Mode 3]

The sensor equipped wheel support bearing assembly according to this mode 3 is a wheel support bearing assembly for rotatably supporting a vehicle wheel relative to a vehicle body structure comprising:

an outer member having an inner periphery formed with double row rolling surfaces;

an inner member having an outer periphery formed with rolling surfaces held in face-to-face relation with the rolling surfaces in the outer member;

double row rolling elements interposed between the respective rolling surfaces in the outer and inner members; and a sensor assembly fitted to an outer peripheral surface of the stationary member in a fashion coaxial with the stationary member;

wherein the sensor assembly includes electronic components comprising;

a plurality of sensor units, each comprised of a strain generating member fixed to a peripheral surface of one of the outer and inner members, which works as a stationary member, in contact therewith and a sensor fitted to the strain generating member for detecting a strain induced in the strain generating member, a signal processing IC for processing an output signal from the sensor, and a signal cable for transmitting the output signal so processed to the outside of the bearing assembly;

wherein the electronic components are connected in a ring shaped pattern, and wherein the sensor assembly is covered with a ring shaped protective covering in the form of a molded article made of a rubber-like elastic element, with the protective covering being fastened by a band to thereby fit it to the outer peripheral surface of the stationary member.

[Mode 4]

The sensor equipped wheel support bearing assembly according to this mode 4 is a wheel support bearing assembly for rotatably supporting a vehicle wheel relative to a vehicle body structure comprising:

an outer member having an inner periphery formed with double row rolling surfaces;

an inner member having an outer periphery formed with rolling surfaces held in face-to-face relation with the rolling surfaces in the outer member;

double row rolling elements interposed between the respective rolling surfaces in the outer and inner members; and a sensor assembly fitted to an outer peripheral surface of the stationary member in a fashion coaxial with the stationary member;

wherein the sensor assembly includes electronic components comprising;

a plurality of sensor units fixed to a peripheral surface of one of the outer and inner members, which works as a stationary member, a signal processing IC for processing an output signal from the sensor unit, and a signal cable for transmitting the output signal so processed to the outside of the bearing assembly;

wherein the electronic components are connected in a ring shaped pattern, and wherein the sensor assembly is covered with a tubular protective covering having an inner diameter increasing towards an inboard side, and the tubular protective covering is fitted to the outer peripheral surface of the stationary member with an inboard end of the protective covering mounted on the outer peripheral surface of the stationary member and with an outboard end of the protective covering fitted to the outer peripheral surface of the stationary member through a sealing ring made of an elastic element.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 ... Outer member
2 ... Inner member
3, 4 ... Rolling surface
5 ... Rolling element
20 ... Sensor unit
21 ... Strain generating member
21a ... Cutout
22 ... Strain sensor
23 ... Bolt
25 ... Signal processing IC (Signal processing unit)
26 ... Signal cable
27, 57 ... Protective covering
28 ... Sensor assembly
33 ... Molding material
35 ... Flexible substrate
38 ... Band
40 ... Sealing member
41 ... Ring shaped core metal
41b ... Diametrically expanded bent portion
41a, 41c, 41d ... Chamfered portion
42 ... Ring shaped elastic segment
44 ... Surface treated layer
45 ... Cutout in the outer member
46 ... Cutout in the protective covering
73 ... O-ring

What is claimed is:

1. A sensor equipped wheel support bearing assembly for rotatably supporting a vehicle wheel relative to a vehicle body structure comprising:

an outer member having an inner periphery formed with double row rolling surfaces;

an inner member having an outer periphery formed with rolling surfaces held in face-to-face relation with the rolling surfaces in the outer member, one of the outer member and the inner member being a stationary member of the wheel support bearing assembly;

double row rolling elements interposed between the respective rolling surfaces in the outer and inner members; and a sensor assembly fitted to the peripheral surface of the stationary member in a fashion coaxial with the stationary member;

wherein the sensor assembly includes electronic components comprising;

a plurality of sensor units, each having a strain generating member fixed to a peripheral surface of the stationary member, in contact therewith and a sensor fitted to the strain generating member for detecting a strain induced in the strain generating member, a signal processing IC for processing an output signal from the sensor, and a signal cable for transmitting the output signal so processed to the outside of the bearing assembly, wherein the electric components are disposed inwardly of an annular protective covering to provide an annular sensor assembly, and wherein each of the strain generating members comprises a thin plate of a strip shaped configuration, when viewed from top, having a cutout formed at a lateral portion thereof, the cutout extending inwardly in a width direction of the strain generating member.

2. The sensor equipped wheel support bearing assembly as claimed in claim 1, in which the annular sensor assembly is of a structure splittable into two components in a direction circumferentially thereof.

3. The sensor equipped wheel support bearing assembly as claimed in claim 1, in which each of the sensor units is bolted to the stationary member.

4. The sensor equipped wheel support bearing assembly as claimed in claim 1, in which portions of the electronic components in the sensor assembly fitted to the stationary member, which are exposed from the protective covering, are sealed with a molding material.

5. The sensor equipped wheel support bearing assembly as claimed in claim 1, in which the plurality of sensor units are provided at the same positions in a direction axially of the stationary member.

6. The sensor equipped wheel support bearing assembly as claimed in claim 1, in which the peripheral surface of the stationary member is provided with a cylindrically ground surface area over the entire circumference thereof and portions of the cylindrically ground surface area, at which the strain generating members contacts, respectively, are rendered to be flat ground surface portions.

7. The sensor equipped wheel support bearing assembly as claimed in claim 1, in which the stationary member is the outer member and the sensor assembly is fitted to an outer diametric surface of the stationary member.

8. The sensor equipped wheel support bearing assembly as claimed in claim 7, in which the plurality of the sensor units are arranged on upper, lower, left and right surface portions of the stationary member, which correspond respectively to top, bottom left and right positions relative to a tire tread surface.

9. The sensor equipped wheel support bearing assembly as claimed in claim 1, wherein the electronic components further comprise a flexible substrate having a wiring circuit for wiring among the sensor units, the signal processing IC and the signal cable.

10. The sensor equipped wheel support bearing assembly as claimed in claim 1, further comprising a sealing member and in which the sensor assembly is fitted to the peripheral surface of the stationary member through the sealing member in a fashion coaxial with the stationary member.

11. The sensor equipped wheel support bearing assembly as claimed in claim 1, in which the annular protective covering is in the form of a molded article of a rubber-like elastic element and this annular protective covering is fitted to an outer peripheral surface of the stationary member by means of a band wrapped around and fastened to the protective covering.

12. The sensor equipped wheel support bearing assembly as claimed in claim 1, wherein each of the sensor units is bolted to the stationary member;
wherein the stationary member is the outer member and the sensor assembly is fitted to an outer diametric surface of the stationary member; and
wherein the sensor assembly is arranged inwardly of the annular protective covering.

13. A sensor equipped wheel support bearing assembly for rotatably supporting a vehicle wheel relative to a vehicle body structure comprising:
an outer member having an inner periphery formed with double row rolling surfaces;
an inner member having an outer periphery formed with rolling surfaces held in face-to-face relation with the rolling surfaces in the outer member, one of the outer member and the inner member being a stationary member of the wheel support bearing assembly;
double row rolling elements interposed between the respective rolling surfaces in the outer and inner members; and
a sensor assembly fitted to the peripheral surface of the stationary member in a fashion coaxial with the stationary member,
wherein the sensor assembly includes electronic components comprising;
a plurality of sensor units, each having a strain generating member fixed to a peripheral surface of the stationary member, in contact therewith and a sensor fitted to the strain generating member for detecting a strain induced in the strain generating member,
a signal processing IC for processing an output signal from the sensor, and
a signal cable for transmitting the output signal so processed to the outside of the bearing assembly,
wherein the electric components are disposed inwardly of an annular protective covering to provide an annular sensor assembly, and,
wherein the sensor assembly is fitted to the peripheral surface of the stationary member through the sealing member in a fashion coaxial with the stationary member the sealing member comprising an annular core metal following a peripheral surface of the protective covering and a pair of annular elastic segments jointed to opposite side edges of the core metal over the entire circumferences thereof from an inner diametric surface thereof to an outer diametric surface thereof.

14. A sensor equipped wheel support bearing assembly for rotatably supporting a vehicle wheel relative to a vehicle body structure comprising:
an outer member having an inner periphery formed with double row rolling surfaces;
an inner member having an outer periphery formed with rolling surfaces held in face-to-face relation with the rolling surfaces in the outer member, one of the outer member and the inner member being a stationary member of the wheel support bearing assembly;
double row rolling elements interposed between the respective rolling surfaces in the outer and inner members; and
a sensor assembly fitted to the peripheral surface of the stationary member in a fashion coaxial with the stationary member,
wherein the sensor assembly includes electronic components comprising;
a plurality of sensor units, each having a strain generating member fixed to a peripheral surface of the stationary member, in contact therewith and a sensor fitted to the strain generating member for detecting a strain induced in the strain generating member,
a signal processing IC for processing an output signal from the sensor, and
a signal cable for transmitting the output signal so processed to the outside of the bearing assembly,
wherein the electric components are disposed inwardly of an annular protective covering to provide an annular sensor assembly, and
wherein the annular protective covering has an inner diameter increasing towards an inboard side of the sensor assembly, the inboard end of the protective covering being mounted on an outer peripheral surface of the stationary member, the protective covering also having an outboard end fitted to the outer peripheral surface of the stationary member through a sealing ring of an elastic element.

15. The sensor equipped wheel support bearing assembly as claimed in claim 14, in which the protective covering is of a stepped cylindrical configuration with its inboard end having a large diameter.

* * * * *

UNITED STATES PATENT AND TRADEMARK OFFICE
CERTIFICATE OF CORRECTION

PATENT NO. : 8,596,146 B2  
APPLICATION NO. : 13/067053  
DATED : December 3, 2013  
INVENTOR(S) : Yujiro Ono et al.

Page 1 of 1

It is certified that error appears in the above-identified patent and that said Letters Patent is hereby corrected as shown below:

In the Claims

In Column 39, Lines 48-49, In Claim 13, delete "member" and insert -- member, --, therefor.

Signed and Sealed this  
First Day of April, 2014

Michelle K. Lee  
*Deputy Director of the United States Patent and Trademark Office*